(12) United States Patent
Takeuchi

(10) Patent No.: US 7,927,406 B2
(45) Date of Patent: Apr. 19, 2011

(54) WATER DROPLET GENERATING SYSTEM AND METHOD FOR GENERATING WATER DROPLET

(75) Inventor: Yukihisa Takeuchi, Chita-gun (JP)

(73) Assignee: Denso Corporation, Kariya (JP)

( * ) Notice: Subject to any disclaimer, the term of this patent is extended or adjusted under 35 U.S.C. 154(b) by 359 days.

(21) Appl. No.: 12/154,015

(22) Filed: May 19, 2008

(65) Prior Publication Data
US 2008/0295695 A1  Dec. 4, 2008

(30) Foreign Application Priority Data

Jun. 1, 2007 (JP) ................................. 2007-146618
Mar. 28, 2008 (JP) ................................. 2008-085688

(51) Int. Cl.
*B01D 53/02* (2006.01)
(52) U.S. Cl. ................ 96/108; 95/117; 95/121; 95/126; 62/91; 62/93; 62/150; 62/272; 62/285
(58) Field of Classification Search .................... 96/108; 95/117, 121, 126; 62/91, 93, 94, 150, 272, 62/285
See application file for complete search history.

(56) References Cited

U.S. PATENT DOCUMENTS

| | | |
|---|---|---|
| 5,382,558 A | 1/1995 | Inagaki et al. |
| 5,393,329 A | 2/1995 | Inagaki et al. |
| 5,508,081 A | 4/1996 | Inagaki et al. |
| 5,672,656 A | 9/1997 | Murayama et al. |
| 5,707,598 A | 1/1998 | Inagaki et al. |
| 5,750,085 A | 5/1998 | Yamada et al. |
| 5,768,910 A | 6/1998 | Inagaki et al. |
| 5,980,849 A | 11/1999 | Ogata et al. |
| 7,089,763 B2 | 8/2006 | Forsberg et al. |
| 2002/0187896 A1* | 12/2002 | Ryoo et al. ..................... 502/418 |
| 2007/0039345 A1 | 2/2007 | Forsberg et al. |

FOREIGN PATENT DOCUMENTS

| | | |
|---|---|---|
| JP | 06-024867 | 2/1994 |
| JP | 7-012379 | 1/1995 |
| JP | 07-224119 | 8/1995 |
| JP | 08-277105 | 10/1996 |
| JP | 09-178292 | 7/1997 |
| JP | 09-264633 | 10/1997 |

(Continued)

OTHER PUBLICATIONS

Translation of JP2006-130447 A, Yasuzawa, May 25, 2006.*

(Continued)

*Primary Examiner* — Robert J Hill, Jr.
*Assistant Examiner* — Christopher P Jones
(74) *Attorney, Agent, or Firm* — Harness, Dickey & Pierce, PLC

(57) ABSTRACT

The water droplet generating system includes a vessel, an opening/closing valve, a moisture absorbent member, and a condenser portion. The vessel has an opening portion. The opening/closing valve opens and closes the opening portion. The water absorbent member absorbs and releases water vapor depending on a change of humidity. The condenser portion is communicated with the inside of the vessel and cools water vapor released from the moisture absorbent member to be at a dew point of water vapor or less. When the opening portion is opened, the moisture absorbent member absorbs water vapor in atmosphere. When the opening portion is closed, the moisture absorbent member releases water vapor, and the condenser portion condenses water vapor, which is released from the moisture absorbent member, to generate a water droplet.

18 Claims, 29 Drawing Sheets

FOREIGN PATENT DOCUMENTS

| | | |
|---|---|---|
| JP | 09-294931 | 11/1997 |
| JP | 10-066462 | 3/1998 |
| JP | 10-087319 | 4/1998 |
| JP | 10-191777 | 7/1998 |
| JP | 11-011939 | 1/1999 |
| JP | 2001-219063 | 8/2001 |
| JP | 2002-339151 | 11/2002 |
| JP | 2004-115278 | 4/2004 |
| JP | 2004-181404 | 7/2004 |
| JP | 2004-183335 | 7/2004 |
| JP | 2004-261702 | 9/2004 |
| JP | 2005-518488 | 6/2005 |
| JP | 2006-009483 | 1/2006 |
| JP | 2006-027998 | 2/2006 |
| JP | 2006-027999 | 2/2006 |
| JP | 2006-130447 | 5/2006 |
| JP | 2006-272295 | 10/2006 |
| JP | 2006-316402 | 11/2006 |
| JP | 2007-082408 | 4/2007 |
| JP | 2007-236337 | 9/2007 |

OTHER PUBLICATIONS

Translation of JP2006-316402 A, Kai, Nov. 24, 2006.*
Office action dated Jul. 28, 2009 in corresponding Japanese Application No. 2008-085688.
Office action dated Feb. 12, 2010 in corresponding Chinese Application No. 200810109581.7.
Office Action dated Jan. 10, 2011, in corresponding Chinese Application No. 200810109581.7, with English translation thereof.

* cited by examiner

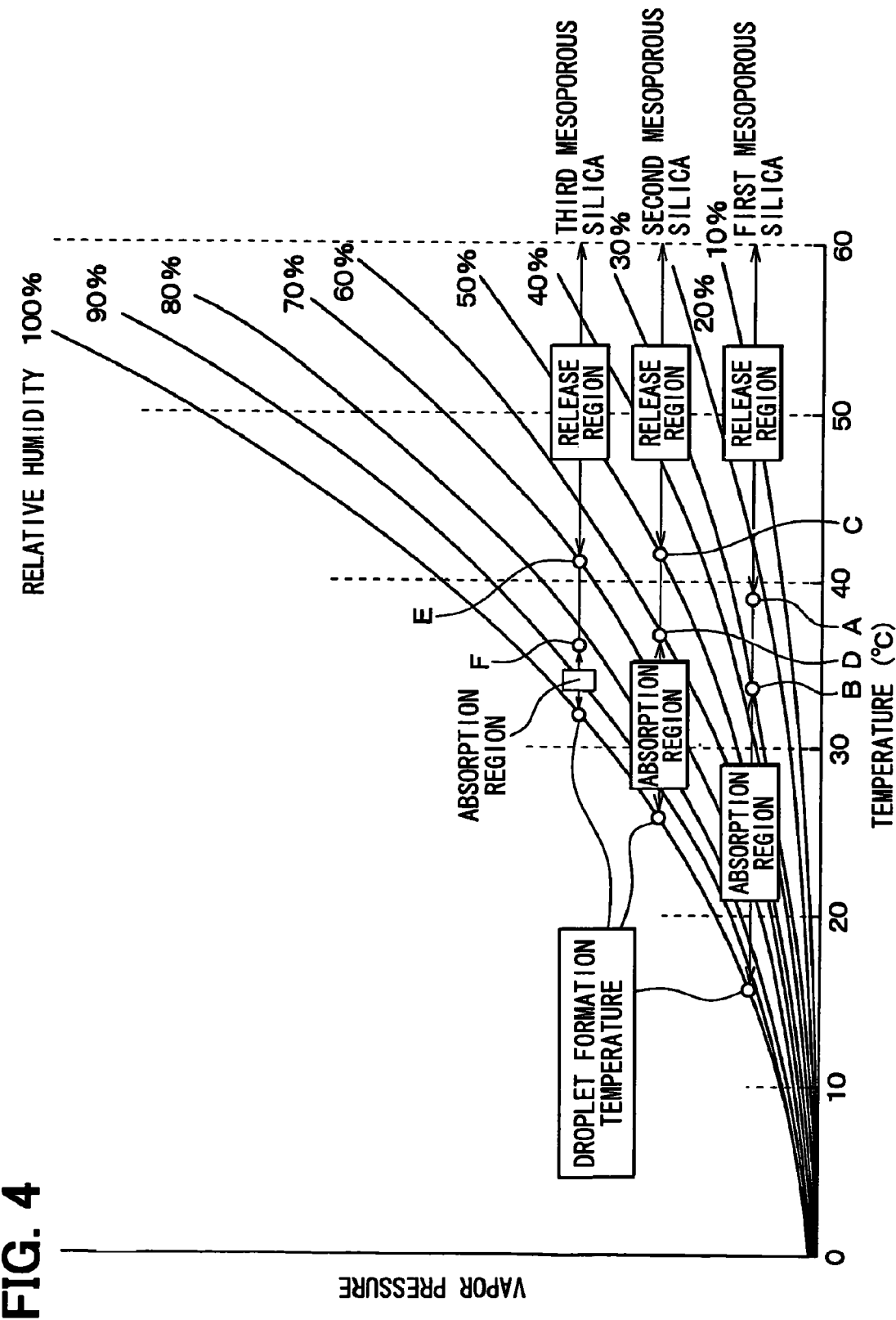

WATER DROPLET GENERATING SYSTEM AND METHOD FOR GENERATING WATER DROPLET

CROSS REFERENCE TO RELATED APPLICATION

This application is based on and incorporates herein by reference Japanese Patent Application No. 2007-146618 filed on Jun. 1, 2007 and Japanese Patent Application No. 2008-85688 filed on Mar. 28, 2008.

BACKGROUND OF THE INVENTION

1. Field of the Invention

The present invention relates to an apparatus for generating water droplets and a method for generating water droplets by trapping water vapor from the atmosphere.

2. Description of Related Art

Due to the influence of $CO_2$ emitted as a result of industrial activities, global environmental temperature has increased in recent years. Plant growing is effective for fixing $CO_2$ thus emitted. Although moisture is essential for plant growing, shortage of water becomes a problem with a rise in the global environmental temperature. In addition, depletion of water also makes it difficult to keep a water resource in urban areas and the like.

A method for generating water droplets from water vapor in the atmosphere is proposed in order to overcome such issues. For example, proposed is a method for preparing a highly viscous liquid by absorbing water vapor from the atmosphere with a deliquescent moisture absorbent (refer to JP-A-2004-181404). Also, proposed is a method for adjusting the temperature of a refrigerant of a refrigeration cycle to a dew point or less by a compressor and thereby cooling the atmosphere to be at a dew point or less to cause dew condensation of water vapor in, the atmosphere (refer to JP-T-2005-518488 and US2007/0039345 corresponding thereto). Moreover, proposed is a method for collecting solar energy to produce an ascending air current and collecting solar energy to produce water vapor from seawater, whereby the air containing water vapor is cooled into water droplets and rain is thus created artificially (refer to JP-A-2007-82408).

According to the constitution disclosed in JP-A-2004-181404, the liquid thus prepared contains the deliquescent material and moisture in the form of a chemically reacted compound so that pure water cannot be obtained. The liquid is therefore not suited for supply to plants or for use as drinking water. According to the constitution disclosed in JP-T-2005-518488, electric energy is required for driving the compressor, which has an adverse effect on reduction of $CO_2$ emissions. According the constitution disclosed in JP-A-2007-82408, large-scale mechanism is necessary for generating water droplets and at the same time, districts, to which the process can be applied, are limited because seawater is required.

SUMMARY OF THE INVENTION

With the above-described problems in view, an object of the present invention is to produce water droplets from the water vapor in atmosphere in various places on earth while saving power as much as possible.

To fulfill the object of the present invention, there is provided a water droplet generating system, which includes a vessel, an opening/closing valve, a moisture absorbent member, and a condenser portion. The vessel is placed in atmosphere, and has an opening portion. The opening/closing valve opens the opening portion when ambient temperature is lower than a predetermined temperature or when humidity is higher than a predetermined humidity. The opening/closing valve closes the opening portion when ambient temperature is higher than the predetermined temperature or when humidity is lower than the predetermined humidity. The moisture absorbent member is housed in the vessel, and is constructed to absorb and release water vapor depending on a change of humidity. The condenser portion is disposed to communicate with an inside of the vessel, and is constructed to cool water vapor, which is released form the moisture absorbent member, to be at a dew point of water vapor or less. When the opening/closing valve opens the opening portion, the moisture absorbent member absorbs water vapor in atmosphere. When the opening/closing valve closes the opening portion, the moisture absorbent member releases water vapor, and the condenser portion condenses water vapor, which is released from the moisture absorbent member, to generate a water droplet.

To fulfill the object of the present invention, there is also provided a method for generating a water droplet by using the above water droplet generating system. The opening portion is opened by the opening/closing valve such that water vapor in atmosphere is absorbed by the water absorbent member, when ambient temperature is lower than the predetermined temperature. The opening portion is closed by the opening/closing valve such that water vapor is released from the moisture absorbent member, and simultaneously the water vapor, which is released from the moisture absorbent member in the condenser portion, is condensed to generate the water droplet, when ambient temperature is higher than the predetermined temperature.

To fulfill the object of the present invention, there is also provided a water droplet generating system, which includes a vessel, a moisture absorbent member, a condenser portion, a water absorbent member, a water droplet collecting member, and a water reservoir. The vessel is placed in atmosphere, and has an opening portion. The moisture absorbent member is housed in the vessel, and is constructed to absorb and release water vapor depending on a change of humidity. The condenser portion is disposed to communicate with an inside of the vessel, and is constructed to cool water vapor, which is released from the moisture absorbent member, to be at a dew point of water vapor or less. The water absorbent member is housed in the vessel, and is constructed to absorb and release a water droplet in air depending on a change of temperature. The water droplet collecting member is placed below the water absorbent member, and collects the water droplet released from the water absorbent member. The water reservoir stores the water droplet, which is generated in the condenser portion, and the water droplet, which is collected by the water droplet collecting member.

BRIEF DESCRIPTION OF THE DRAWINGS

The invention, together with additional objectives, features and advantages thereof, will be best understood from the following description, the appended claims and the accompanying drawings in which:

FIG. 4 is a graph showing the relationship among temperature, relative humidity, and moisture absorption/release characteristics of a mesoporous silica;

DETAILED DESCRIPTION OF PREFERRED EMBODIMENTS

First Embodiment

Figure 1:
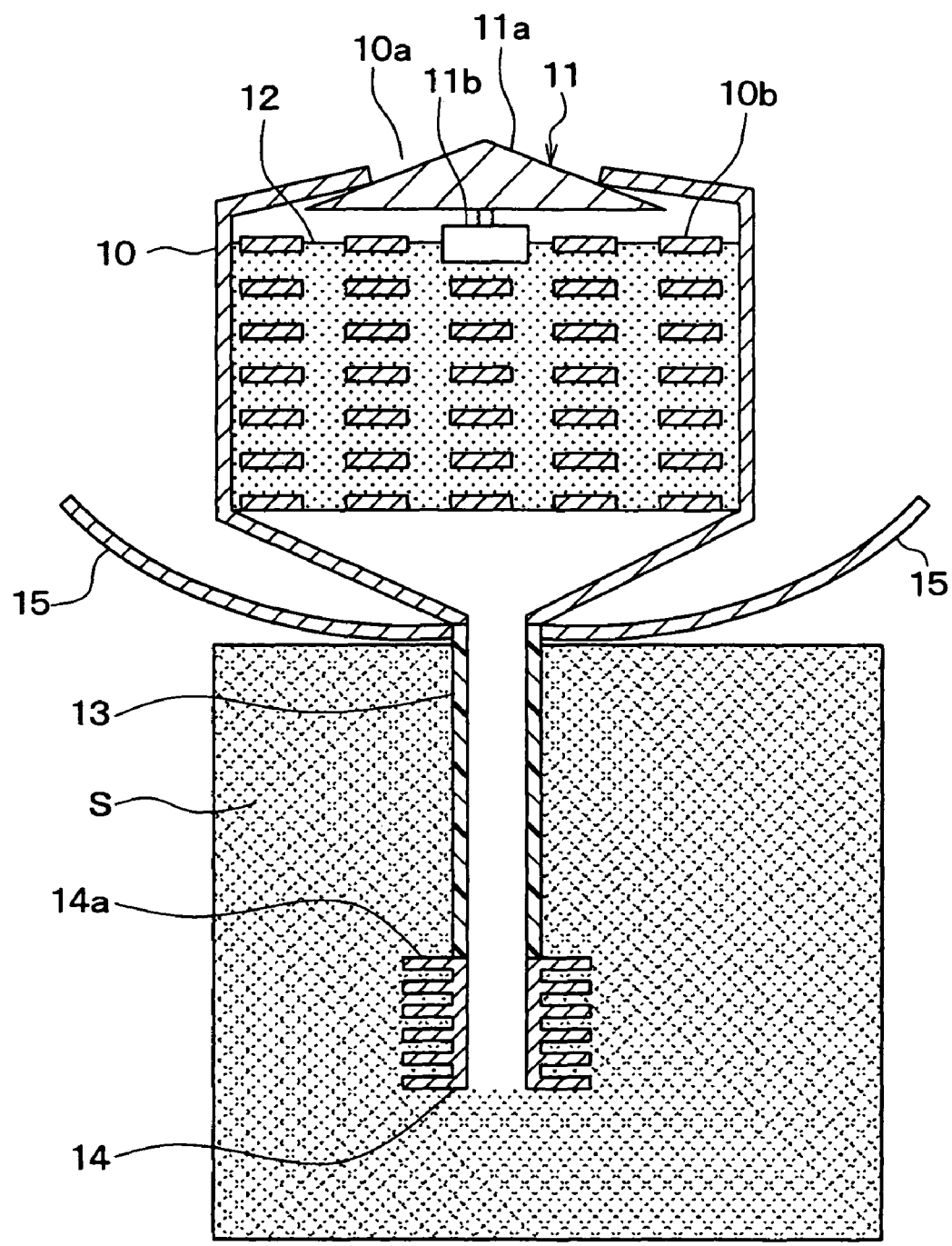
FIG. 1 is a schematic view illustrating a cross-sectional structure of a water droplet generating system according to a first embodiment.

The first embodiment of the present invention will hereinafter be described based on FIGS. 1 to 8. FIG. 1 is a schematic view illustrating the cross-sectional structure of a water droplet generating system (moisture condensing system) according to the present embodiment. As illustrated in FIG. 1, the water droplet generating system is equipped with a vessel 10 placed above a soil S. The vessel 10 has a substantially cylindrical shape and it has, at the upper portion thereof, an opening portion 10a for communicating an inner space of the vessel 10 with the atmosphere. The vessel 10 has an opening/closing valve 11 for opening and closing the opening portion 10a.

The opening/closing valve 11 is equipped with a valve element 11a which can be brought into contact with the opening portion 10a and a drive portion 11b for moving the valve element 11a in a direction of bringing the valve element 11a into contact with the opening portion 10a and in a direction of separating the valve element 11a from the opening portion 10a. The opening/closing valve 11 in the present embodiment is a known thermo valve. A wax (oxidized wax ester material), a volume of which changes due to a change of a temperature, is enclosed in the drive portion 11b and displacement of the valve element 11a occurs by the volume change of the wax. In other words, the opening/closing valve 11 in the present embodiment is configured to open and close the opening portion 10a by utilizing a volume change of the wax due to a temperature change without using an external driving power. It should be noted that an other thermally expandable resin material other than the wax, or a shape memory alloy may be used as the drive portion 11b actuated by a temperature change.

When the ambient temperature exceeds a predetermined opening/closing temperature, the opening portion 10a is closed by the opening/closing valve 11 and when the ambient temperature is less than the predetermined opening/closing temperature, the opening position 10a is opened by the opening/closing valve 11. The predetermined opening/closing temperature for opening and closing the opening portion 10a by the opening/closing valve 11 may be set between the maximum temperature and the minimum temperature of the ambient temperature in the environment where the water droplet generating system is used. The predetermined opening/closing temperature is selected as needed from a range of from 25 to 50° C. The predetermined opening/closing temperature for the opening/closing valve 11 can be selected as needed, depending on the kind of the wax. In the present embodiment, the predetermined opening/closing temperature is set at approximately 33° C.

A moisture absorbent member 12 capable of adsorbing or releasing moisture thereto or therefrom is filled in the vessel 10. The moisture absorbent member 12 can absorb water vapor contained in the air taken into the vessel 10, and also can release the moisture adsorbed to the member into the air as water vapor. The moisture absorbent member 12 will be described later in detail.

The vessel 10 is integrally provided with a heat transfer fin 10b inside the vessel 10 for transferring the heat of the vessel 10 itself to the moisture absorbent member 12. The vessel 10 and the heat transfer fin 10b are made of a material (such as aluminum or copper) having a high heat conductivity. The temperature of the vessel 10 changes with the ambient temperature or solar radiation and this temperature change is transferred to the moisture absorbent member 12.

For the vessel 10, a typical aluminum alloy casting is suitably used. In addition, materials having a high heat conductivity, such as brass, stainless steel, iron, carbon materials, ceramics materials (SiC, SiN, AlN, TiC, and the like), and a resin material mixed with metal fibers or metal powders, can be used. The outer surface of the vessel 10 is preferably blackened in order to enhance a temperature elevating effect due to solar radiation. The vessel 10, when it is made of a metal material, has preferably an inner surface and an outer surface subjected to anti-corrosive plating or coating.

The vessel 10 opens at the bottom portion thereof and a condenser portion 14 is connected to the vessel 10 via a communicating portion 13. The communicating portion 13 and the condenser portion 14 are hollow pipe-shaped members and are communicated with the inside of the vessel 10. Water vapor released from the moisture absorbent member 12 in the vessel 10 can pass through these portions. The condenser portion 14 is made of a material (such as aluminum, copper) having a high heat conductivity. The condenser portion 14 has, on the outer surface thereof, a heat transfer fin 14a for transferring heat of the soil S efficiently to water vapor passing inside of the condenser portion 14.

The condenser portion 14 is placed at a position where a temperature of water vapor released from the moisture absorbent member 12 falls to be below the dew point of the water vapor. In the present embodiment, the condenser portion 14 is placed in the soil S. The temperature in the ground is stable without being influenced by a change in the ambient temperature. In general, it is approximately from 20 to 35° C. at a position from 15 to 20 cm deep from the ground surface. In the present embodiment, the condenser portion 14 is installed at 20 cm deep from the ground surface. In addition, the condenser portion 14 is installed at a position where moisture is necessary, such as a place for growing plants.

The condenser portion 14 is preferably free from an influence of the temperature change of the vessel 10. The communicating portion 13 is therefore made of a material having low heat conductivity in order to minimize the heat transfer between the vessel 10 and the condenser portion 14. The communicating portion 13 is made of preferably a resin material, but if heat insulation between the vessel 10 and condenser portion 14 is maintained, use of stainless steel, aluminum or aluminum alloy is preferred. When a bellows-like pipe is used as the communicating portion 13, a contact area with water vapor can be increased and cooling efficiency of water vapor can be enhanced.

A reflector plate 15 for reflecting solar radiation to the vessel 10 is provided between the vessel 10 and the ground surface. A concave mirror made of a metal plate, for example, can be used as the reflector plate 15. It is possible to concentrate light onto the vessel 10 by placing the vessel 10 at a focus position of the concave mirror constituting the reflector plate 15.

The moisture absorbent member 12 will next be described. The moisture absorbent member 12 is preferably made of a material capable of absorbing moisture as much as possible and having absorption/release characteristics drastically responsive to a change in a relative humidity. The material having high durability is more preferred. In the present embodiment, a mesoporous silica is employed as the moisture absorbent member 12.

Figure 2:
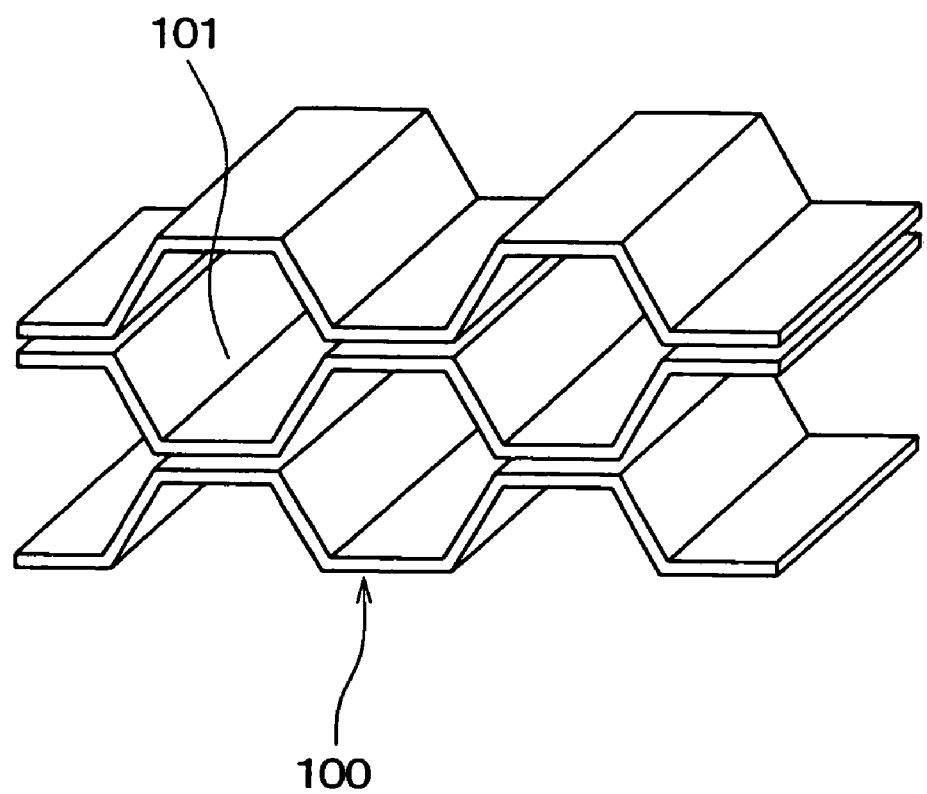
FIG. 2 is an enlarged view illustrating a molecular structure of a mesoporous silica constituting a water absorption member 12.

FIG. 2 is an enlarged view illustrating the molecular structure of a mesoporous silica (FSM: Folded Sheets Mesoporous Material) constituting the moisture absorbent member 12. As illustrated in FIG. 2, a mesoporous silica 100 has a three-dimensional honeycomb-shaped structure having therein an infinite number of pores 101. In the mesoporous silica 100 employed in the present embodiment, each pore 101 has a diameter ranging from 1 to 7 nm. The mesoporous silica 100 having such a structure has a large surface area due to the infinite number of pores 101 so that moisture amount absorbed by it is very large.

Such mesoporous silica 100 is formed by the method described, for example, in JP-A-H10-87319 (corresponding to U.S. Pat. No. 5,980,849). First, laminar silicic acid is prepared by reacting an acid and a clay mineral. Then, an alkali metal compound is reacted with the laminar silicic acid to form a corresponding laminar silicate. By reacting the laminar silicate with a surfactant (a template material), there is formed a mesoporous silica 100 made of a three-dimensional honeycomb-shaped silicate structure in which an infinite number of pores 101 have been formed.

The pore size of the mesoporous silica 100 can be changed by the number of carbon atoms of the surfactant to be reacted. More specifically, as the number of carbon atoms of the surfactant is greater, the pore size can be enlarged, while as the number of carbon atoms of the surfactant is smaller, the pore size can be decreased. In addition, when variations in the number of carbon atoms of the surfactant are smaller, variations in the pore size of the mesoporous silica can be reduced.

The mesoporous silica can have improved durability by the addition of an aluminum ion to the pore wall of the mesoporous silica. The mesoporous silica having such a structure can retain 80% or more of its initial absorption/release characteristics after about 10000 cycles of use.

The mesoporous silica having a pore wall added with an aluminum ion can be prepared in the following manner. First, after calcination of a mesoporous silica (at from 500 to 700° C.), it is dipped in an aqueous solution of aluminum chloride (about 0.1 mol of aluminum chloride is added), followed by calcination again (at from 500 to 700° C.). During the formation of a laminar silicate by reacting laminar silicic acid with an alkali metal compound, about 0.1 mol of aluminum chloride or aluminum nitrate is added to the solution, whereby aluminum is mixed in the crystal wall. By calcination (at from 500 to 700° C.), the mesoporous silica having good durability can be obtained.

Figure 3:
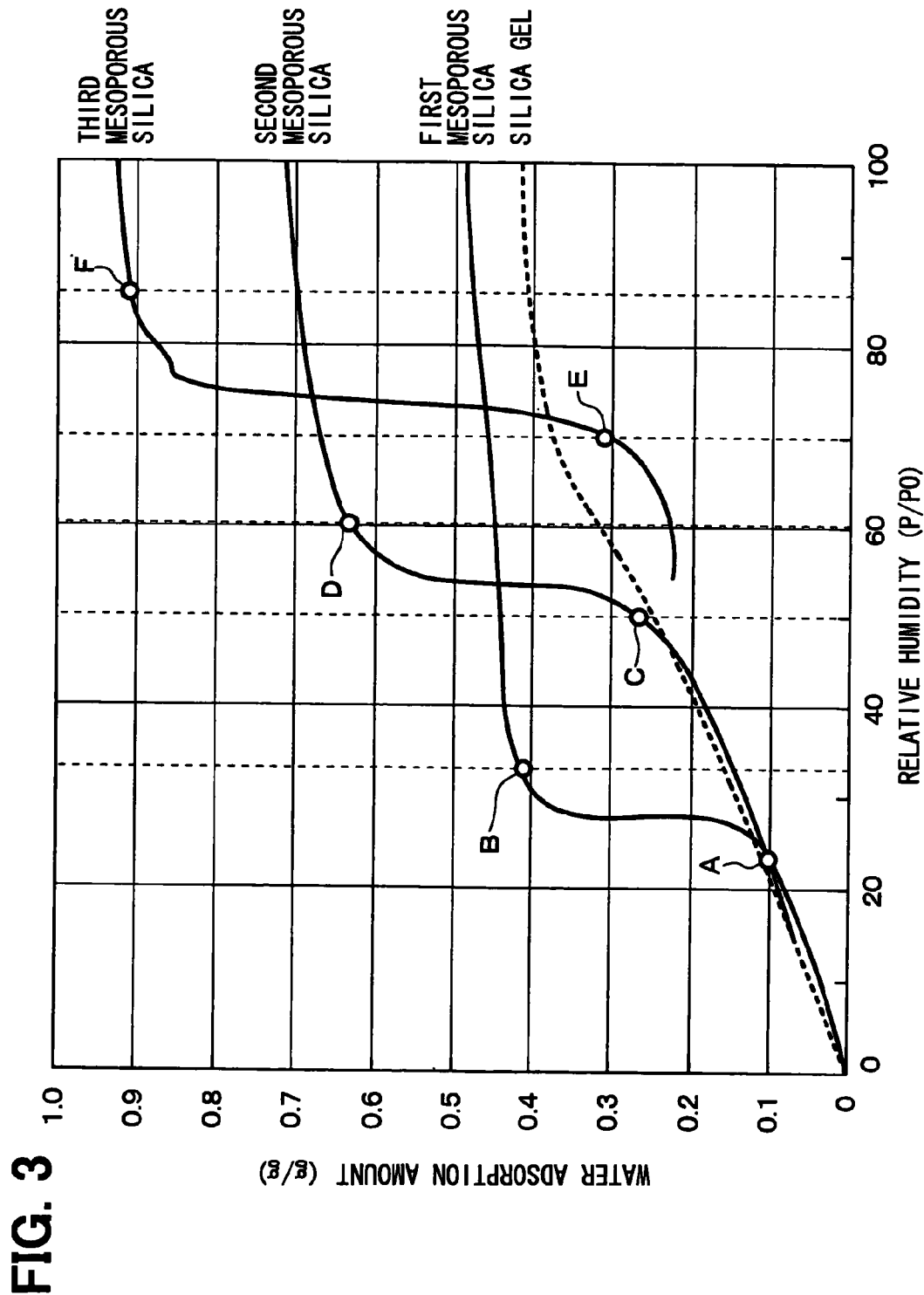
FIG. 3 is a graph showing moisture absorption/release characteristics of a mesoporous silica when a relative humidity is changed.

Moisture absorption/release characteristics of a mesoporous silica to be used as the moisture absorbent member 12 will next be described. FIG. 3 illustrates moisture absorption/release characteristics of mesoporous silica when a relative humidity is changed. In FIG. 3, moisture absorption/release characteristics of silica gel are also illustrated for comparison with three mesoporous silicas different in pore size. The three mesoporous silicas shown in FIG. 3 are a first mesoporous silica having a pore size of 1.6 nm, a second mesoporous silica having a pore size of 2.45 nm, and a third mesoporous silica having a pore size of 4 nm. The first mesoporous silica is prepared using a surfactant having 10 carbon atoms; the second mesoporous silica is prepared using a surfactant having 16 carbon atoms, and the third mesoporous silica is prepared using a surfactant having from 20 to 40 carbon atoms.

It has been understood from FIG. 3 that compared with silica gel, the mesoporous silica absorbs a larger amount of moisture and at the same time, absorption/release characteristics change drastically in response to a change in relative humidity. This means that the mesoporous silica can absorb and release a large amount of moisture even by a slight change in relative humidity. A relative humidity range within which a moisture absorption amount of the mesoporous silica changes drastically will hereinafter be called "moisture absorption amount change region".

There is a correlation between the pore size of a mesoporous silica and moisture absorption/release characteristics of the mesoporous silica. In FIG. 3, the moisture absorption amount of the first mesoporous silica shows a drastic change within a range of from point A to point B and the moisture absorption amount change region resides within a relative humidity of from 22 to 33%; the moisture absorption amount of the second mesoporous silica shows a drastic change within a range of from point C to point D and the moisture absorption amount change region resides within a relative humidity of from 50 to 60%; and the moisture absorption amount of the third mesoporous silica shows a drastic change within a range of from point E to point F and the moisture absorption amount change region resides within a relative humidity of from 70 to 85%. Thus, the moisture absorption amount change region is on the side of a lower relative humidity when the mesoporous silica has a smaller pore size and it is on the side of a higher relative humidity when the mesoporous silica has a larger pore size. In addition, the mesoporous silica having a greater pore size has a larger moisture absorption amount. Moreover, as the pore-size distribution range is smaller, the moisture absorption amount change region of the mesoporous silica becomes narrower.

The moisture absorption/release characteristics of the mesoporous silica can be selected as needed, depending on the environment under which the water droplet generating system is used. More specifically, a change of a humidity in a day preferably includes at least the moisture absorption amount change region. For example, in the desert, the air is dry and relative humidity is low so that the moisture absorption amount change region of the mesoporous silica preferably falls within a range of relative humidity of from 20 to 60%. Under the environment where temperature and humidity are both high, the moisture absorption amount change region of the mesoporous silica preferably falls within a range of relative humidity of from 40 to 90%. In the temperate area, the moisture absorption amount change region of the mesoporous silica preferably falls within a range of relative humidity of from 20 to 80%, while in the cold area where relative humidity is low, the moisture absorption amount change region of the mesoporous silica preferably falls within a range of relative humidity of from 10 to 60%.

FIG. 4 is a graph showing the relationship among temperature, relative humidity, and moisture absorption/release characteristics of mesoporous silicas. In FIG. 4, first, second, and third mesoporous silicas and Points A to F correspond to those of FIG. 3.

As illustrated in FIG. 4, with a rise in temperature, the relative humidity is reduced, while with a reduction in temperature, the relative humidity rises. Due to such a change in relative humidity with a temperature change, the mesoporous silica can absorb and release moisture.

Referring to FIG. 4, when the first mesoporous silica is used at a temperature range of from 15 to 60° C., for example, it releases absorbed water vapor at a temperature equal to or greater than point A and absorbs water vapor at a temperature not greater than point B. A region between the points A and B is a transition region where switching between moisture absorption and release occurs. When the second mesoporous silica is used at a temperature range of from 25 to 60° C., for example, it releases absorbed water vapor at a temperature equal to or greater than point C and absorbs water vapor at a temperature not greater than point D. A region between the points C and D is a transition region where switching between moisture absorption and release occurs. When the third mesoporous silica is used at a temperature range of from 32 to 60° C., for example, it releases absorbed water vapor at a temperature equal to or greater than point E and absorbs water vapor at a temperature not greater than point F. A region between the points E and F is a transition region where switching of moisture absorption and release occurs. In FIG. 4, the temperature corresponding to relative humidity of 100% is a droplet formation temperature (dew point). At a temperature lower than the droplet formation temperature, water vapor contained in the air condenses.

The moisture absorption amount and release amount of the mesoporous silica will next be described. The description will be made with the first mesoporous silica and the second mesoporous silica as examples.

As described above, when the humidity is 33% or greater, the first mesoporous silica absorbs water vapor from the atmosphere, while when the humidity is 22% or less, it releases water vapor to the atmosphere. As shown in FIG. 3, the absorption amount of water vapor by the first mesoporous silica is greater by at least 0.3 g per gram of the first mesoporous silica at a relative humidity of 33% or greater compared with that at a relative humidity of 22% or less. More specifically, at a relative humidity of 100%, a saturated moisture absorption amount of the first mesoporous silica is about 0.48 g per gram thereof, while a saturated moisture absorption amount at a relative humidity of 33% is about 0.41 g per gram of the first mesoporous silica. On the other hand, at a relative humidity of 23%, a saturated moisture absorption amount is about 0.10 g per gram, while at a relative humidity as low as 10%, a saturated moisture absorption amount is about 0.03 g per gram.

A moisture release amount when a relative humidity is changed from 100% to 10% is 0.45 g (=0.48 g–0.03 g) per gram and a moisture release amount when a relative humidity is changed from 33% to 23% is 0.31 g (=0.41 g–0.10 g) per gram. Thus, the first mesoporous silica exhibits excellent moisture absorption/release performance relative to a change amount in relative humidity when it is used in a relative humidity range from 22 to 33%.

As described above, when the humidity is 60% or greater, the second mesoporous silica absorbs water vapor from the atmosphere, while when the humidity is 50% or less, it releases water vapor to the atmosphere. As shown in FIG. 3, the absorption amount of water vapor by the second mesoporous silica is greater by at least 0.35 g per gram of the second mesoporous silica at a relative humidity of 60% or greater compared with that at a relative humidity of 50% or less. More specifically, at a relative humidity of 100%, a saturated moisture absorption amount of the second mesoporous silica is about 0.72 g per gram, while a saturated moisture absorption amount at a relative humidity of 60% is about 0.63 g per gram. On the other hand, at a relative humidity of 50%, a saturated moisture absorption amount is about 0.27 g per gram, while at a relative humidity of 20%, a saturated moisture absorption amount is about 0.09 g per gram.

A moisture release amount when a relative humidity is changed from 100% to 20% is 0.68 g (=0.72 g–0.09 g) per gram and a moisture release amount when a relative humidity is changed from 60% to 50% is 0.36 g (=0.63 g–0.27 g) per gram. Thus, the second mesoporous silica exhibits excellent moisture absorption/release performance relative to a change amount in relative humidity when it is used within a relative humidity range from 50 to 60%.

The moisture absorbent member 12 will next be described based on FIGS. 5A to 5C and FIGS. 6A and 6B. FIGS. 5A to 5C and FIGS. 6A and 6B illustrate absorbent members 12 different from each other in shape. For the moisture absorbent member 12, mesoporous silicas having the same pore size may be used or multiple kinds of mesoporous silicas, which are different in pore size, may be used. When the multiple kinds of mesoporous silicas different in pore size are used, the moisture absorbent member 12 is able to have multiple moisture absorption/release characteristics. In the present embodiment, the above-described second mesoporous silica (having a pore size of 2.45 nm) is employed. Carbon powders for improving heat conductivity and accelerating moisture adsorption, or metal powders (copper, aluminum) for improving heat conductivity may be mixed with the mesoporous silica.

Figure 5A:
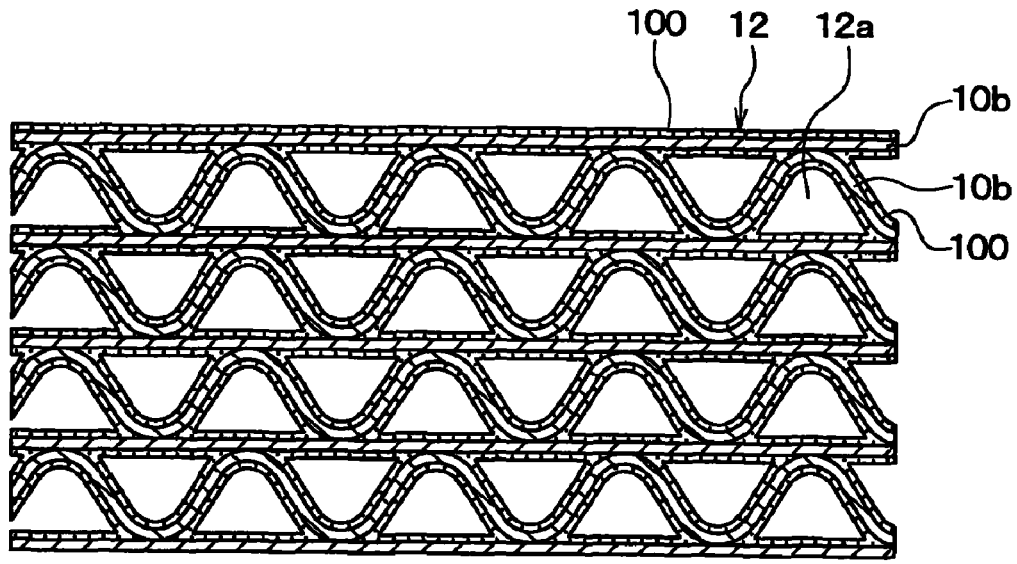
FIG. 5A is a schematic view illustrating the structure of a water absorption member 12.
Figure 5B:
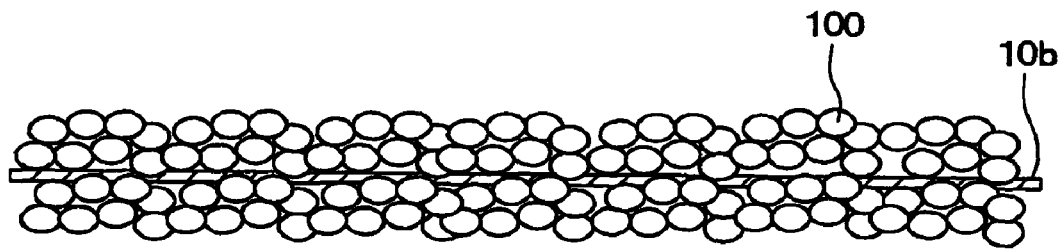
FIG. 5B is another schematic view illustrating the structure of the water absorption member 12.
Figure 5C:
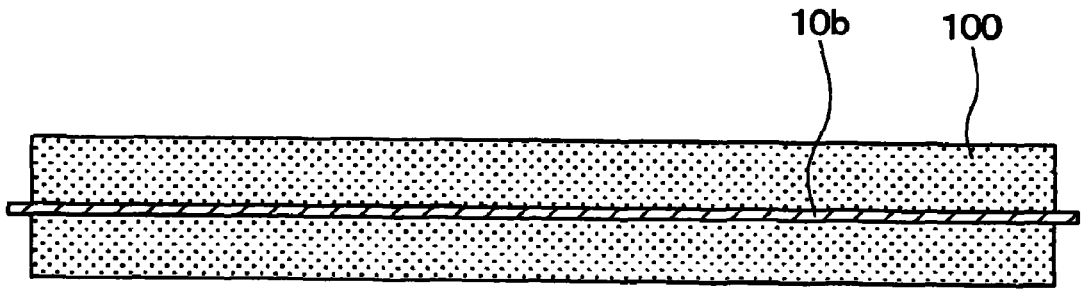
FIG. 5C is a further schematic view illustrating the structure of a water absorption member 12.

FIG. 5A illustrates an example in which mesoporous silica 100 is attached to the surface of the heat transfer fin 10b. In a case, where the mesoporous silica 100 is attached to the surface of the heat transfer fin 10b as above, calcination may be conducted in a state, where the particles of the mesoporous silica 100 having a relatively large pore size are placed on the surface of the heat transfer fin 10b with spaces therebetween as illustrated in FIG. 5B. Alternatively, calcination may be conducted in a state, where the particles of the mesoporous silica 100 having a relatively small pore size are placed on the surface of the heat transfer fin 10b without a space as illustrated in FIG. 5C.

Figure 6A:
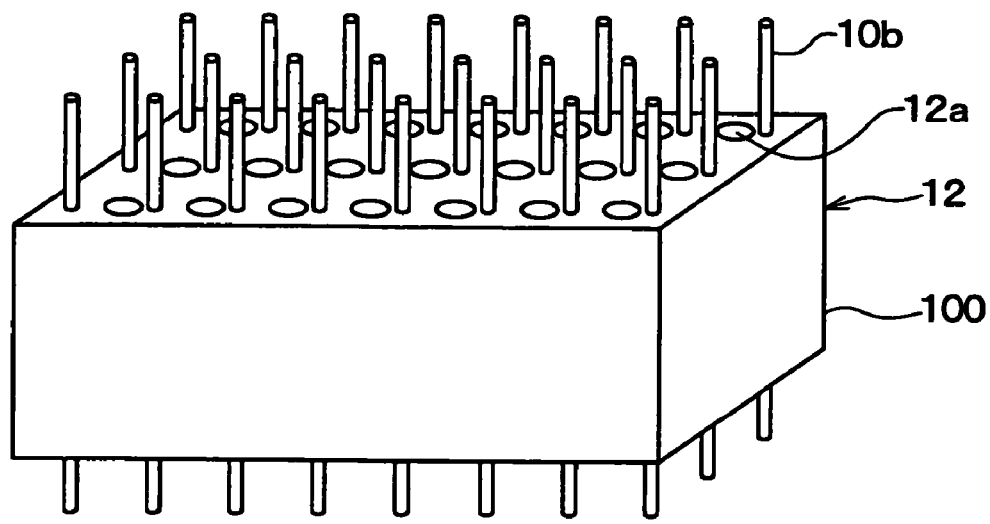
FIG. 6A is a schematic view illustrating the structure of another water absorption member 12.

FIG. 6A illustrates an example of the moisture absorbent member 12 prepared by mixing aluminum powders with powers of the mesoporous silica 100 and molding the resulting mixture into a block. The moisture absorbent member 12 in block form has through-holes 12a that enables air to pass therethrough, and at the same time, is constructed to permit penetration of a plurality of the heat transfer fins 10b through the absorbent member 12.

Figure 6B:
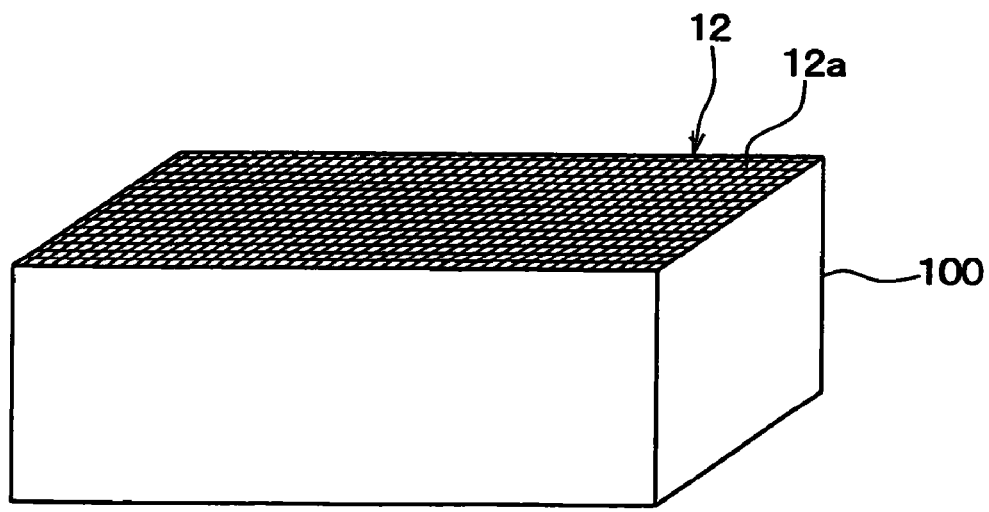
FIG. 6B is another schematic view illustrating the structure of the another water absorption member 12.

FIG. 6B illustrates an example of the moisture absorbent member 12 prepared by mixing carbon powders with the powders of the mesoporous silica 100 and molding the resulting mixture into a monolith (honeycomb). Since the moisture absorbent member 12 in monolithic form has many through-holes 12a therein, it can have an enlarged surface area and therefore has improved moisture adsorption efficiency.

The operation of the water droplet generating system according to the present embodiment will next be described. The water droplet generating system according to the present embodiment is constructed so that moisture in the atmosphere is absorbed by making use of a humidity change caused by a daily temperature difference and at the same time, water vapor is condensed by making use of a difference between ambient temperature and earth temperature.

Figure 7A:
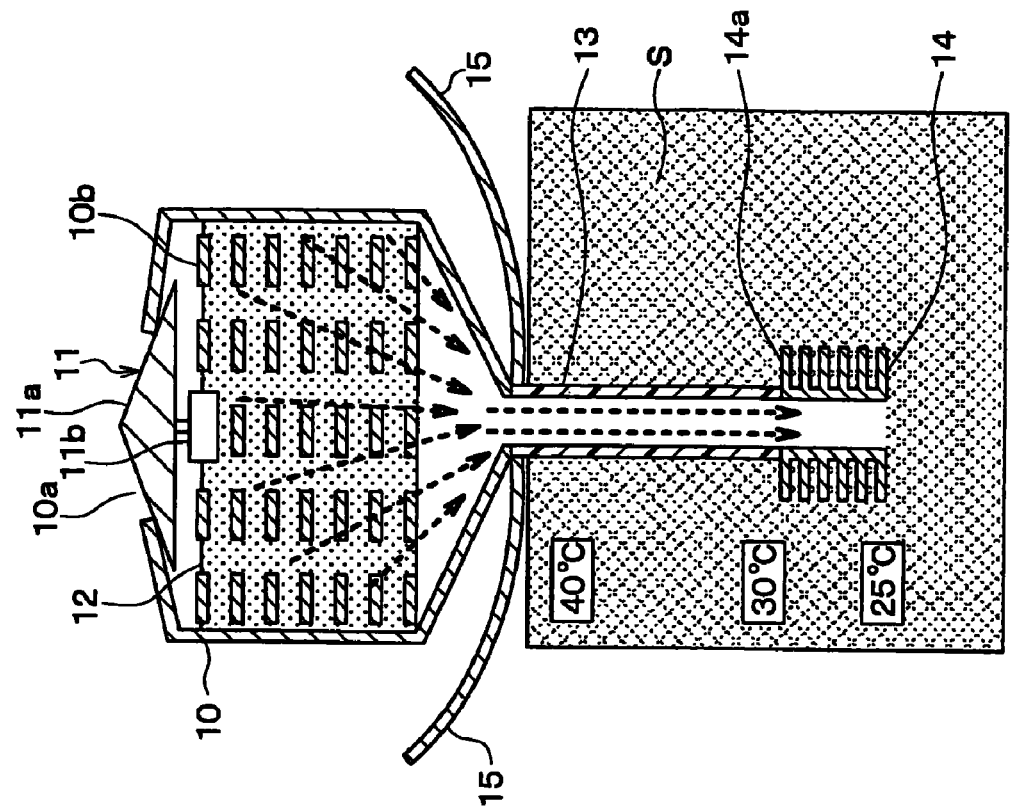
FIG. 7A is a schematic view illustrating a certain state of the water droplet generating system.
Figure 7B:
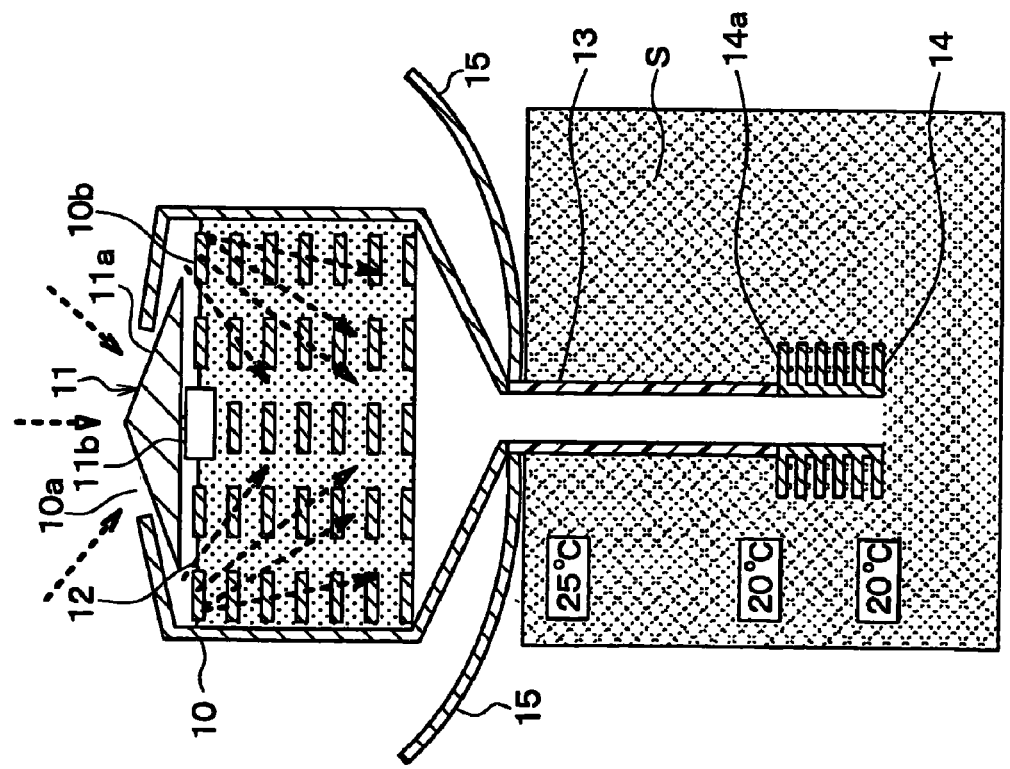
FIG. 7B is a schematic view illustrating another state of the water droplet generating system.

The operation of the water droplet generating system according to the present embodiment will next be described. The description here is limited to the case where the second mesoporous silica (having a pore size of 2.45 nm) is used for the moisture absorbent member 12. FIGS. 7A and 7B illustrate a change in state of the water droplet generating system.

Figure 8:
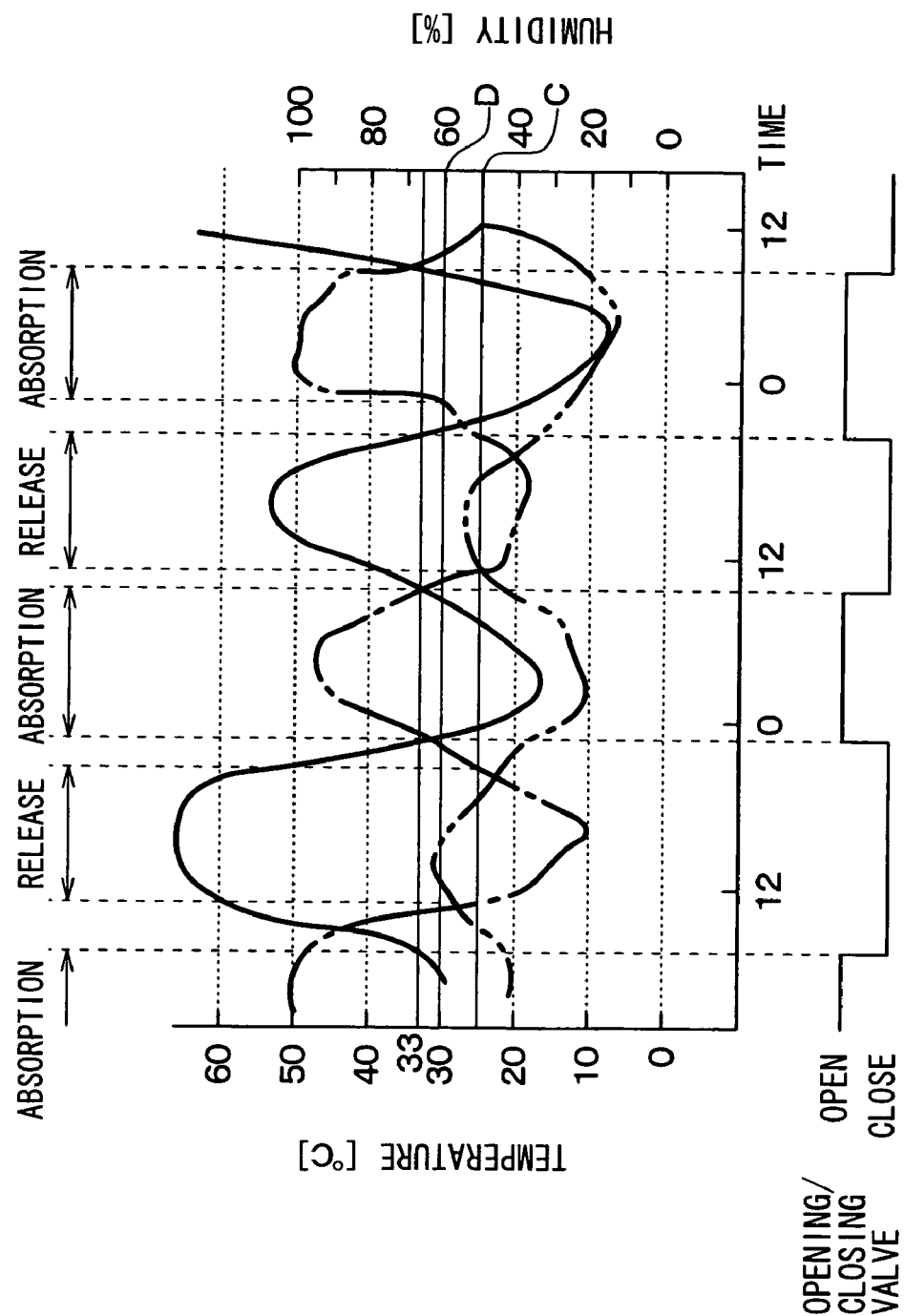
FIG. 8 is a time-series graph showing the relationship among temperature, humidity, and absorption/release of moisture by the water absorption member 12 in the water droplet generating system according to the first embodiment.

In FIG. 7A, the ambient temperature is 30° C., while in FIG. 7B, the ambient temperature is 60° C. FIG. 8 is a time series graph showing the relationship among temperature, humidity, and moisture absorption/release by the moisture absorbent member 12. In FIG. 8, the solid line, the dashed and single-dotted line, and the dashed and double-dotted line show an ambient temperature, a relative humidity, and a temperature at a position 20 cm deep in the ground where the condenser portion 14 is placed, respectively.

When, during early evening into night, the ambient temperature drops below 33° C., that is, an opening/closing temperature for opening and closing the opening/closing valve 11, the opening/closing valve 11 opens as illustrated in FIG. 7A. The inside of the vessel 10 is then communicated with the atmosphere and the relative humidity outside the vessel 10 becomes equal to that inside of the vessel 10. As illustrated in FIG. 8, the relative humidity rises with a reduction in the ambient temperature. When the relative humidity exceeds 60%, the moisture absorbent member 12 absorbs water vapor in the air introduced into the vessel 10. It is to be noted that when the ambient temperature is 30° C., the earth surface temperature and the temperature at a position 20 cm deep therefrom are assumed to be about 25° C. and about 20° C., respectively.

When during daytime, the ambient temperature, which heats the vessel 10, exceeds 33° C., that is, an opening/closing temperature of the opening/closing valve 11, the opening/closing valve 11 closes as illustrated in FIG. 7B, whereby the communication between the inside and the outside of the vessel 10 is blocked. As illustrated in FIG. 8, a rise in the temperature inside the vessel 10 occurs with an increase in the ambient temperature, which leads to a reduction in a relative humidity inside the vessel 10. When the relative humidity falls below 50%, the moisture absorbent member 12 releases water absorbed therein into the air as water vapor. Because the opening/closing valve 11 is closed, the vessel 10 is saturated with the waver vapor released from the moisture absorbent member 12. The air containing the water vapor in the vessel 10 is supplied to the condenser portion 14 via the communicating portion 13.

The temperature in the ground is lower than the ambient temperature and when the ambient temperature is 60° C., the earth surface temperature and the temperature at a position 20 cm deep from the surface are about 40° C. and about 25° C., respectively. The water vapor transferred to the condenser portion 14 is cooled to a temperature not greater than the dew point thereof and is condensed into water droplets. The water droplets thus formed are made of clean and fresh water. The water droplets thus generated in the condenser portion 14 are diffused in the soil S and used for growing plants.

Moisture can be generated continuously in the water droplet generating system by repeating the absorption and release of moisture as described above. This enables continuous supply of moisture to plants and saving of labor in watering plants.

According to the water droplet generating system in the present embodiment, the opening/closing valve 11 opens and closes depending on a change of a temperature in a day so that the moisture absorbent member 12 can absorb and release moisture by a humidity change based on a change in the ambient temperature. Without an external power, water droplets can be generated from water vapor collected from the atmosphere by making use of a temperature change in the nature.

When the water droplet generating system of the present embodiment is used at a place exposed to a large temperature change in a day, a difference between a water amount absorbable and a water amount releasable by the moisture absorbent member 12 becomes large so that a large amount of water droplets can be generated and therefore the apparatus achieves a great effect. It is therefore preferred to use the water droplet generating system at a place exposed to sun light. When the place is, though not exposed to sun light, exposed to a temperature change in a day and the temperature in the ground falls below the dew point of the water vapor released from the moisture absorbent member 12, the apparatus of the present invention can be used.

The reflector plate 15 installed below the vessel 10 can concentrate sunlight onto the outer surface of the vessel 10 so that the temperature of the vessel 10 can be raised efficiently. This enables an efficient reduction of a relative humidity in the vessel 10 and efficient release of moisture from the moisture absorbent member 12.

The water droplet generating system according to the present embodiment can bring about a great effect when used at a place on earth where water is not easily available. For example, even in the desert where a rainfall is low, use of the water droplet generating system of the present embodiment contributes to stable supply of water droplets. Plants do not wither and grow steadily so that the apparatus is effective for greening of deserts.

At places (for example, Middle America, or inland China) where agricultural crops (such as corn, wheat and cotton) are grown with groundwater pumped up, use of the water droplet generating system of the present embodiment can increase yields of the agricultural crops, because moisture can be supplied to the agricultural crops without pumping up the groundwater. In addition, water pumped up deep underground has a high salt content and is not suited for supply to agricultural crops. The water droplet generating system of the present embodiment can overcome such a problem.

The environment, such as jungle where a humidity level is high, has typically both a dry season and a wet season. In such an environment, a reduction in rainfall during the dry season sometimes retards the growth of plants. Use of the water droplet generating system of the present embodiment therefore enables stable supply of water droplets and acceleration of the growth of many plants.

Second Embodiment

The second embodiment of the present invention will next be described. Here, only a difference from the first embodiment will be described.

Figure 9:
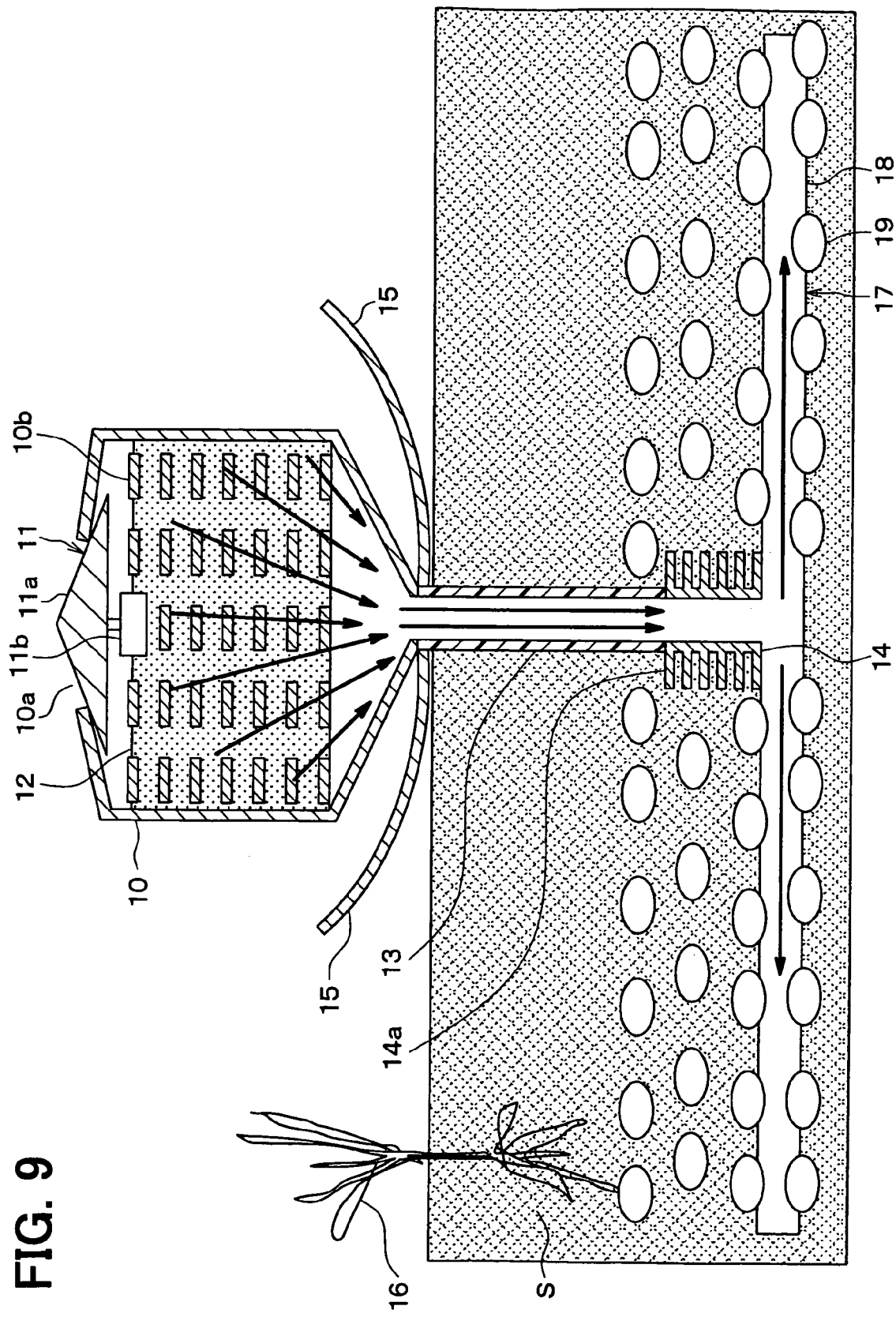
FIG. 9 is a schematic view illustrating a water droplet generating system according to a second embodiment.

FIG. 9 is a schematic view illustrating the water droplet generating system according to the present embodiment. As illustrated in FIG. 9, the water droplet generating system of the present embodiment has a moisture delivery member 17 for transporting moisture to a plant 16. The moisture delivery member 17 is placed horizontally in the soil S and is connected to the bottom end of the condenser portion 14. The moisture delivery member 17 delivers moisture to the vicinity of the root of the plant 16 to be supplied with moisture.

The moisture delivery member 17 is made of a hydrophilic material 18 for transferring moisture and a water absorbing material 19 for retaining moisture therein. FIG. 9 illustrates the moisture delivery member 17 obtained by attaching the water absorbing materials 19 to the surface of the hydrophilic material 18 in string form. The hydrophilic material 18 and the water absorbing materials 19 are preferably decomposed and absorbed in the soil S when left for a long period of time. It is preferred to place, in the soil S, the water absorbing materials 19 around the moisture delivery member 17 in order to retain rainwater when it rains.

As the hydrophilic material 18, a string made of plant fibers such as hemp or cotton is preferred. The string composed mainly of plant fibers has minute spaces between fine fibers so that it can soak up and transfer moisture therethrough by capillary action. The water absorbing material 19 is preferably a material capable of absorbing moisture at a temperature lower than a predetermined temperature and releasing moisture at a temperature higher than the predetermined temperature. The water absorbing material 19 is preferably neutral and "Thermo Gel" (trade name; product of KOHJIN) can be used for example. The predetermined temperature may be set at a temperature (for example, 30° C.) at which plants require moisture. This means that when the temperature exceeds the temperature at which plants require moisture, moisture is released from the water absorbing material.

By placing the moisture delivery member 17 having such a structure, it is possible to deliver moisture certainly even to the root of the plant 16 which is apart from the condenser portion 14. The condenser portion 14 is placed about 20 cm deep from the ground surface. For the plant 16 with a short root, it is possible to supply moisture, which has been generated in the condenser portion 14, close to the ground surface by installing the moisture delivery member 17 near the ground surface.

In the present embodiment, the moisture delivery member 17 is formed by attaching the water absorbing material 19 to the surface of the hydrophilic material 18 in string form. In another mode, the hydrophilic material 18 and the water absorbing material 19 may be mixed into a string. For example, the hydrophilic material 18 in string form is impregnated with the water absorbing material 19 in powder or liquid form. Alternatively, the moisture delivery member 17 is obtained in string form by using the water absorbing material 19 as a main component.

In the constitution of the present second embodiment, the hydrophilic material 18 may be replaced by a pipe-like member having a wall surface subjected to hydrophilic treatment. Such a pipe-like member can transport moisture. The pipe-like member may be obtained by forming many through-holes permitting passage of moisture in the wall surface and attaching the water absorbing material 19 to the outer surface of the member. According to such a structure, water droplets generated in the condenser portion 14 transfer inside the pipe-like member and retained by the water absorbing material 19. When the pipe-like member is made of a material having high heat conductivity, heat accumulated in the condenser portion 14 can be diffused in the soil by the pipe-like member.

Third Embodiment

The third embodiment of the present invention will next be described. The third embodiment is different from the first embodiment in the constitution of the opening/closing valve 11. Only a difference from the above-described embodiments will hereinafter be described.

Figure 10:
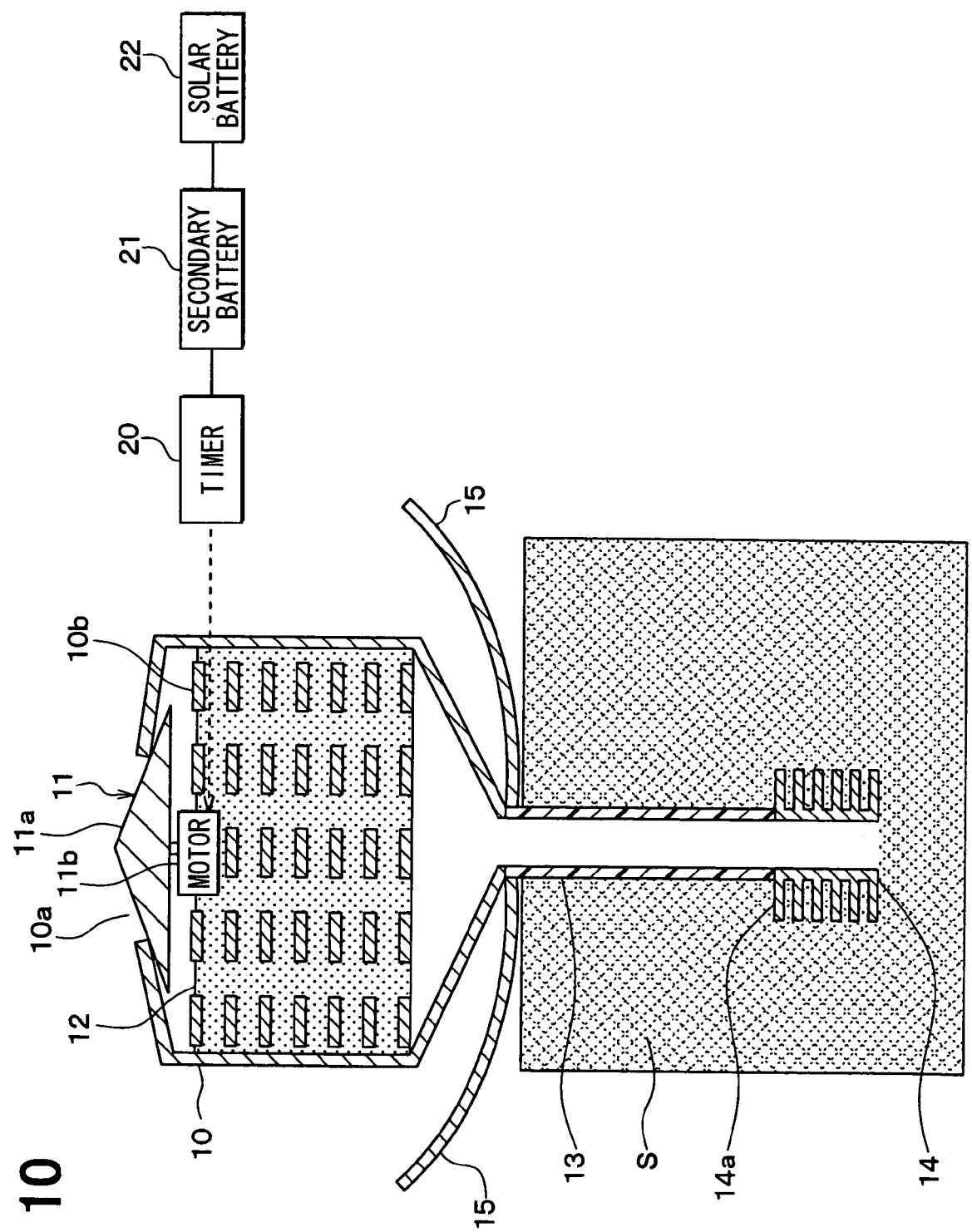
FIG. 10 is a schematic view illustrating a water droplet generating system according to a third embodiment.

FIG. 10 is a schematic view of a water droplet generating system according to the present embodiment. As illustrated in FIG. 10, the drive portion 11b of the water droplet generating system of the present embodiment has a motor for actuating the valve 11a. The water droplet generating system is equipped further with a timer circuit 20 for actuating the drive portion 11b, a secondary battery 21, and a solar battery 22. The secondary battery 21 is charged with the power generated by the solar battery 22. The power supply from the secondary battery 21 to the drive portion 11b is controlled by the timer circuit 20. In short, the opening/closing timing of the opening/closing valve 11 is controlled by the timer circuit 20.

In the present embodiment, a predetermined opening time for opening the opening/closing valve 11 and a predetermined closing time for closing the opening/closing valve 11 are set in advance and the opening/closing valve 11 is opened and closed every day at a predetermined time. The predetermined opening time can be set flexibly in a time period, during which temperature rises in a day, and it is set at 10:00 (10:00 a.m.) in the present embodiment. The predetermined closing time can be set flexibly a time period, during which temperature falls in the day, and it is set at 19:00 (7:00 p.m.) in the present embodiment.

Figure 11:
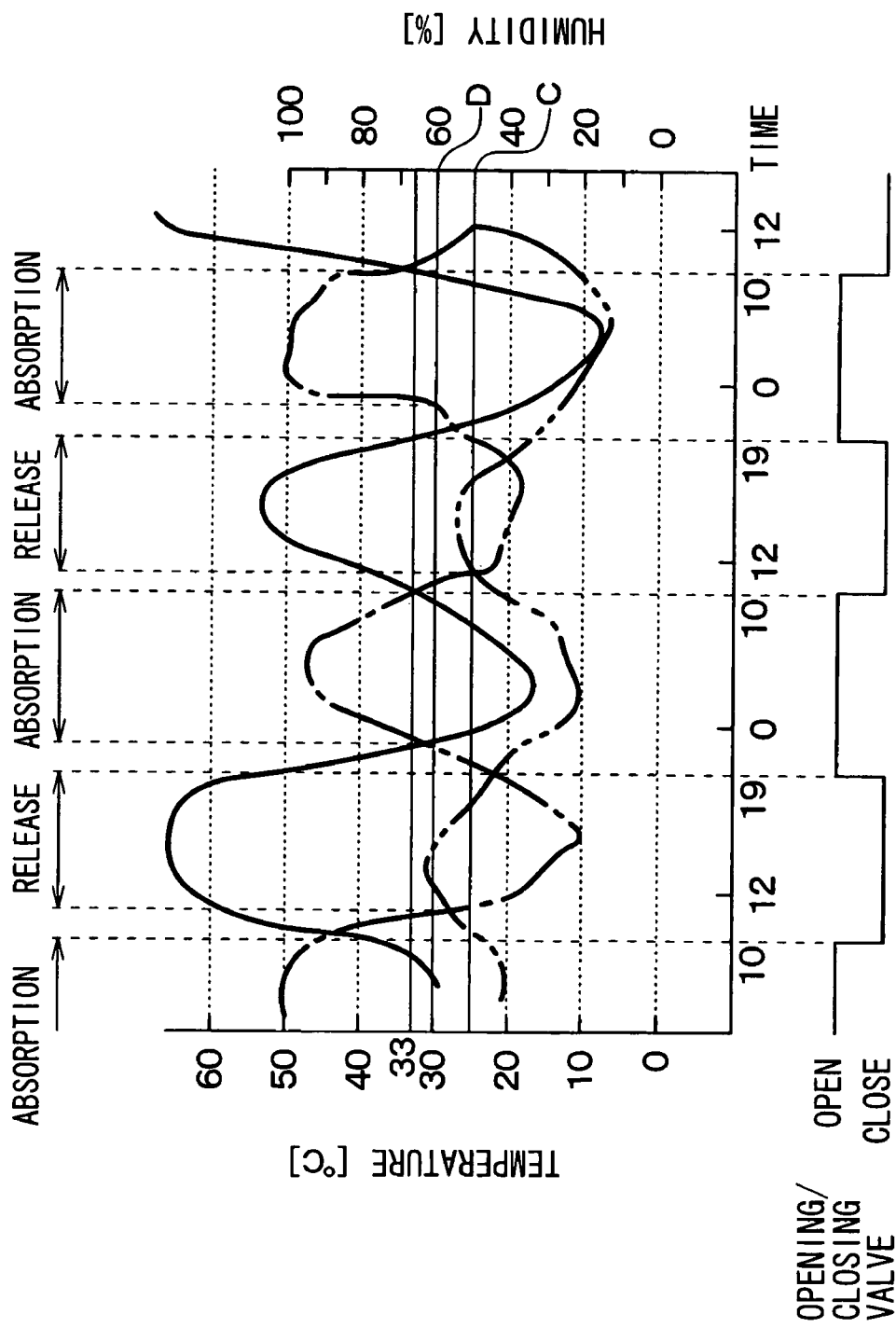
FIG. 11 is a time-series graph showing the relationship among temperature, humidity, and absorption/release of moisture by a water absorption member 12 in the water droplet generating system according to the third embodiment.

FIG. 11 is a time series graph showing the relationship among temperature, humidity and absorption/release of moisture by the moisture absorbent member 12. In FIG. 11, the solid line, the dashed and single-dotted line, and the dashed and double-dotted line show an ambient temperature, a relative humidity, and a temperature at a position 20 cm deep from the ground surface where the condenser portion 14 is placed, respectively.

The constitution of the third embodiment can also bring about similar effects to those of the first embodiment, because the opening/closing valve 11 can be opened and closed in conjunction with a change in the ambient temperature.

From the constitution of the third embodiment, the timer circuit 20 and the secondary battery 21 can be omitted and power generated at the solar battery 22 can be supplied directly to the drive portion 11b. Since there is a proportional relationship between a change in the ambient temperature and output of the solar battery 22 so that the opening/closing valve 11 can be opened and closed depending on a change in the ambient temperature. In the above case, because power is supplied to the drive portion 11b only during a limited period for receiving sunshine, it is only necessary to close the opening/closing valve 11 when power is supplied to the drive portion 11b.

Fourth Embodiment

The fourth embodiment of the present invention will next be described. Only a difference from the above-described embodiments will hereinafter be described.

Figure 12:
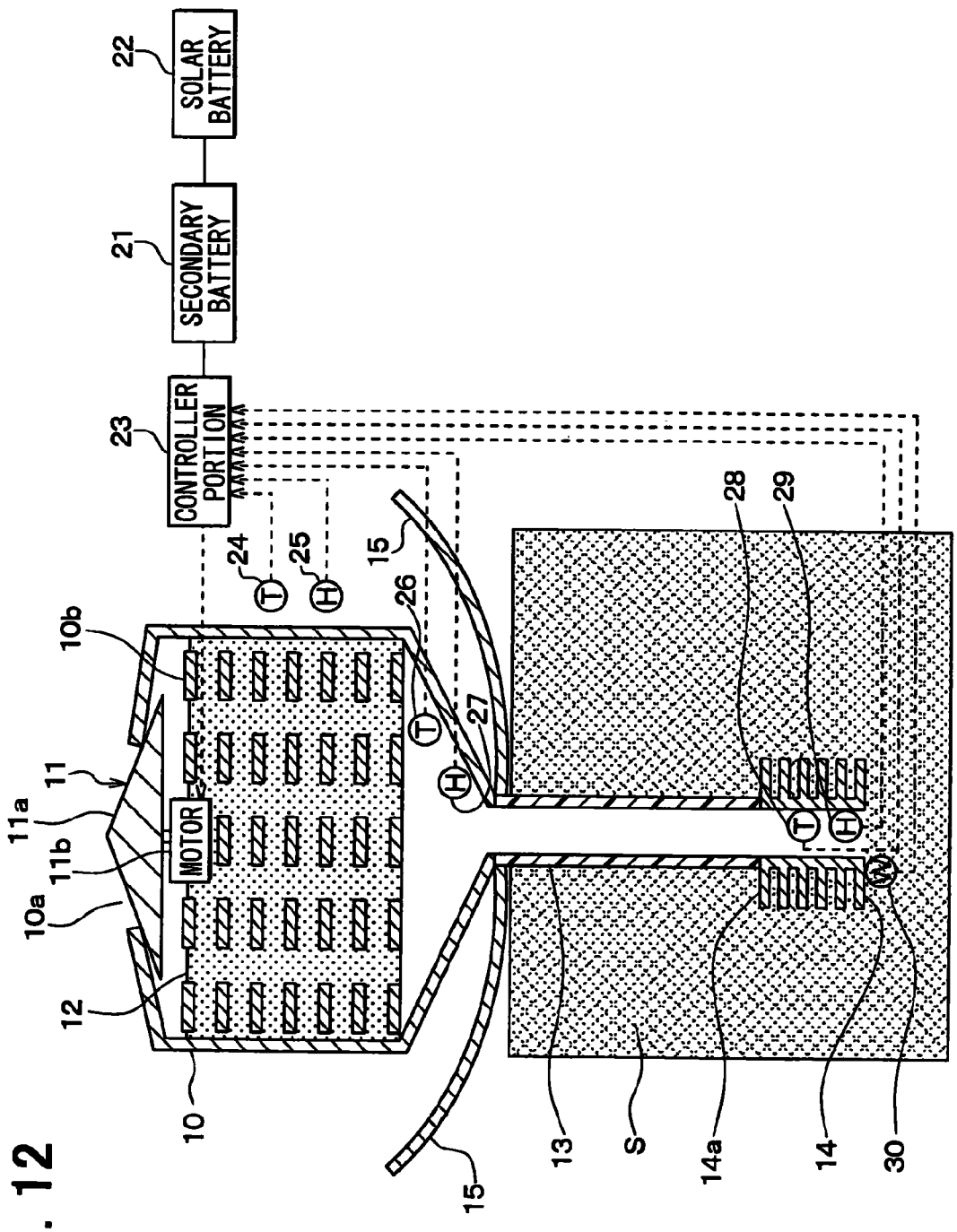
FIG. 12 is a schematic view illustrating a water droplet generating system according to a fourth embodiment.

FIG. 12 is a schematic view illustrating the water droplet generating system of the present embodiment. As illustrated in FIG. 12, the water droplet generating system of the present embodiment has a controller portion 23 instead of the timer circuit 20 of the third embodiment. The controller portion 23 has a known microcomputer composed of CPU, ROM, RAM and the like and a peripheral circuit thereof.

In addition, the water droplet generating system of the present embodiment has a first temperature sensor 24 for detecting an ambient temperature, a first humidity sensor 25 for detecting the humidity in the atmosphere, a second temperature sensor 26 for detecting the temperature in the vessel 10, a second humidity sensor 27 for detecting the humidity in the vessel 10, a third temperature sensor 28 for detecting the temperature in the condenser portion 14, a third humidity sensor for detecting the humidity in the condenser portion 14, and a water droplet sensor 30 for detecting generation of water droplets in the condenser portion 14.

Detection signals of the temperature sensors 24, 26, and 28, the humidity sensors 25, 27, and 29, and the water droplet sensor 30 are input into the controller portion 23. The controller portion 23 carries out arithmetic processing in accordance with a control program stored in ROM and outputs control signals to the drive portion 11b.

Such a constitution enables the controller portion 23 to carry out the opening/closing control of the opening/closing valve 11 based on the ambient temperature detected by the first temperature sensor 24. The opening and closing of the opening/closing valve 11 can be carried out based on not only the ambient temperature but also a change in the atmospherical humidity, and the controller portion 23 can carry out the opening/closing control based on the humidity detected by the first humidity sensor 25. More specifically, the controller portion 23 may be constructed to open the opening portion 10a of the vessel 10 by the opening/closing valve 11 when the humidity detected by the first humidity sensor 25 is higher than a predetermined humidity and close the opening portion 10a of the vessel 10 by the opening/closing valve 11, when the humidity detected by the first humidity sensor 25 is lower than the predetermined humidity.

Moreover, the controller portion 23 can calculate the dew point in the atmosphere from the values detected by the first temperature sensor 24 and the first humidity sensor 25; can calculate the dew point in the vessel 10 from the values detected by the second temperature sensor 26 and the second humidity sensor 27; and can calculate the dew point in the condenser portion 14 from the values detected by the third temperature sensor 28 and the third humidity sensor 29. The optimum control can be carried out by controlling the opening and closing of the opening/closing valve 11 based on the comparison, for example, between the dew point in the vessel 10 and the dew point in the condenser portion 14. Moreover, it is possible to grasp whether or not water droplets are generated based on the value detected by the water droplet sensor 30. By controlling the opening and closing of the opening/closing valve 11 based on the value detected by the water droplet sensor 30, water droplets can be generated without fail.

Fifth Embodiment

The fifth embodiment of the present invention will next be described. The fifth embodiment is different from the above-described embodiments in the constitution of the opening/closing valve 11. Only a difference from the above-described embodiments will hereinafter be described.

Figure 13:
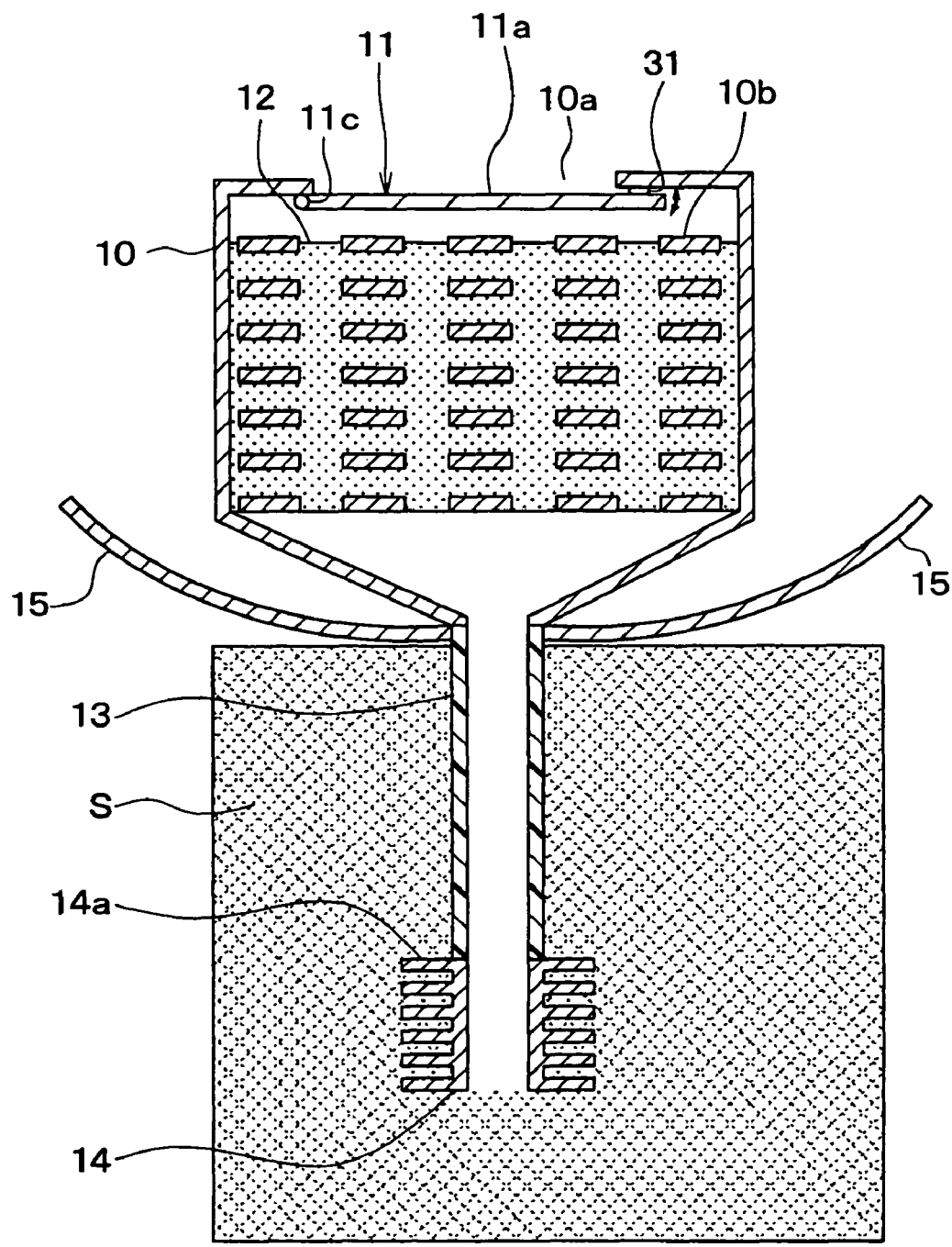
FIG. 13 is a schematic view illustrating a water droplet generating system according to a fifth embodiment.

FIG. 13 is a schematic view illustrating the water droplet generating system according to the present embodiment. As illustrated in FIG. 13, a valve element 11a of the opening/closing valve 11 of the present embodiment is formed as a known plate door. The valve element 11a in plate form is pivotable about a rotating shaft 11c. Although not illustrated in FIG. 13, the apparatus in the fifth embodiment is, similar to the apparatus of the third embodiment, equipped with a drive portion 11b made of a motor, a timer circuit 20, a secondary battery 21, and a solar battery 22. The valve element 11a is rotated and driven by the drive portion 11b. A sealing portion 31 is disposed to a surrounding portion, which is located around the opening portion 10a, and with which the valve element 11a contacts.

The constitution of the fifth embodiment can also bring about similar effects to those available by the above-described embodiments.

Sixth Embodiment

The sixth embodiment of the present invention will next be described. The sixth embodiment is different from the first embodiment in the constitution of the opening/closing valve 11. Only a difference from the above-described embodiments will hereinafter be described.

Figure 14:
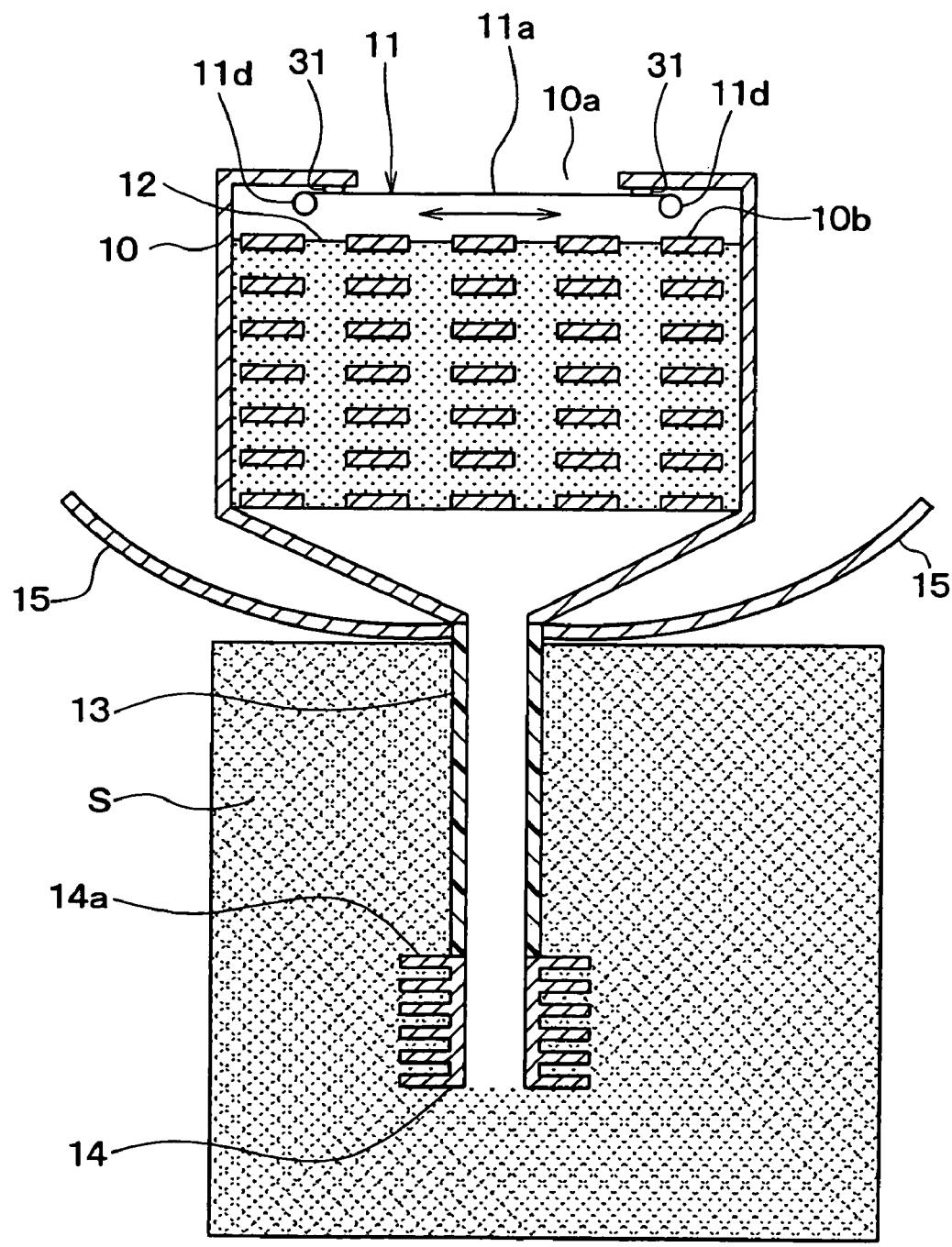
FIG. 14 is a schematic view illustrating a water droplet generating system according to a sixth embodiment.

FIG. 14 is a schematic view illustrating the water droplet generating system of the present embodiment. As illustrated in FIG. 14, a valve element 11a of the opening/closing valve 11 of the present embodiment is formed as a known film slide door. The valve element 11a in film form has, on both ends thereof, a take-up shaft lid for taking up the valve element 11a. Although not illustrated in FIG. 14, the apparatus is, similar to the apparatus of the third embodiment, equipped with a drive portion 11b made of a motor, a timer circuit 20, a secondary battery 21, and a solar battery 22. The take-up shaft lid is rotated and driven by the drive portion 11b, whereby the film-like valve element 11a is actuated. A sealing portion 31 is disposed to a surrounding portion, which is located around the opening portion 10a, and with which the valve element 11a contacts.

Seventh Embodiment

The seventh embodiment of the present invention will next be described. Only difference from the above-described embodiments will hereinafter be described.

Figure 15:
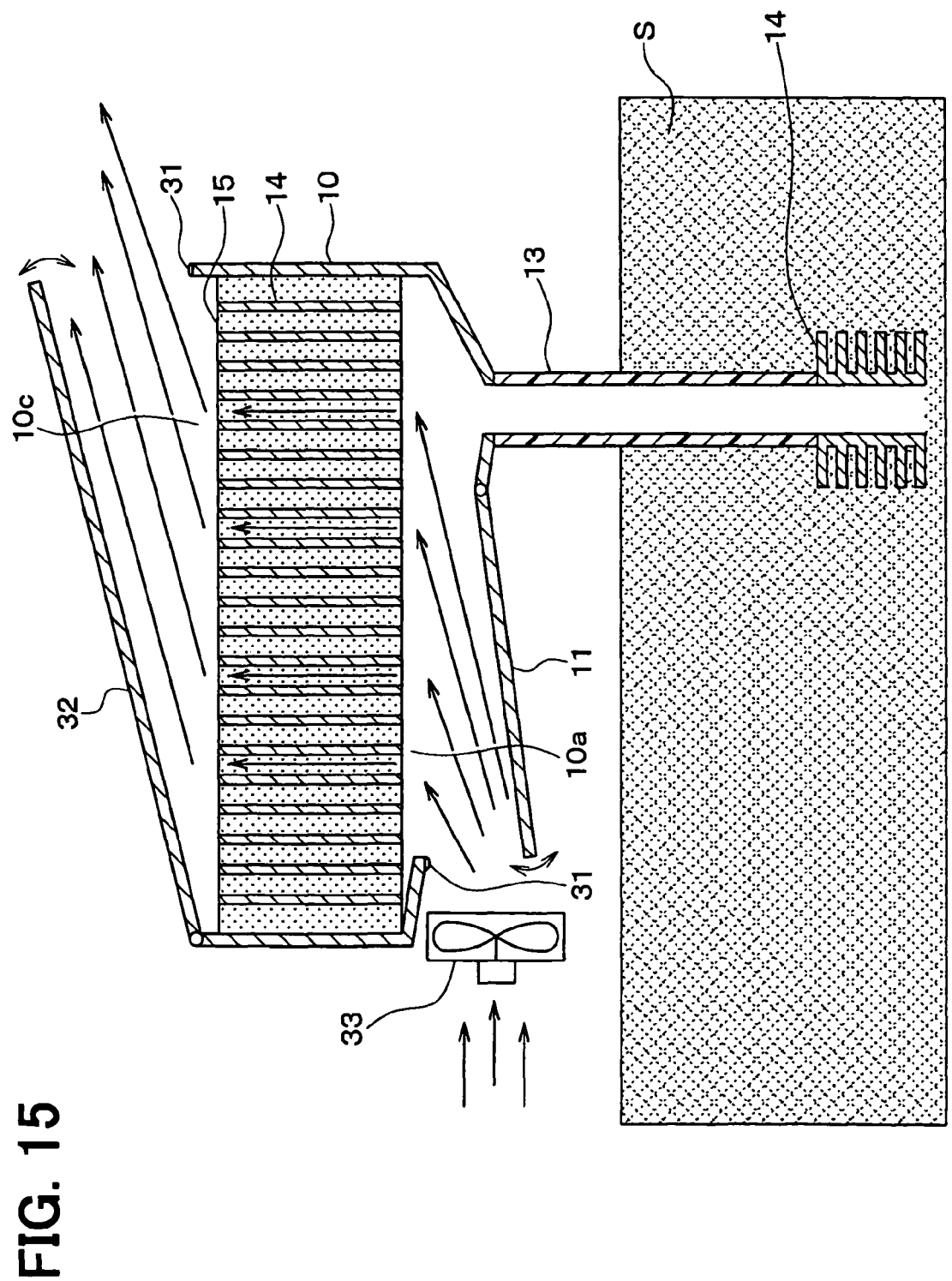
FIG. 15 is a schematic view illustrating a water droplet generating system according to a seventh embodiment.

FIG. 15 is a schematic view illustrating the water droplet generating system of the present embodiment. As illustrated in FIG. 15, the vessel 10 of the present embodiment has, on the bottom end and the upper end thereof, a first opening portion 10a and a second opening portion 10c, respectively. The first opening portion 10a is opened and closed by a first opening/closing valve 11, while the second opening portion 10c is opened and closed by a second opening/closing valve 32. The two opening/closing valves 11 and 32 of the present embodiment are, similar to the fifth embodiment, constructed as a plate door actuated by a drive portion not illustrated. A blower fan 33 for sending air toward the first opening portion 10a is disposed in the vicinity of the first opening portion 10a. The first opening/closing valve 11 and the second opening/closing valve 32 are constructed so that they are opened and closed simultaneously.

The blower fan 33 operates when the first opening/closing valve 11 and the second opening/closing valve 32 are opened. This makes it possible to introduce the atmosphere into the vessel 10 through the first opening portion 10a disposed below the vessel 10. After the atmosphere passes through the moisture absorbent member 12, it is discharged out of the vessel 10 through the second opening portion 10c disposed above the vessel 10.

The above-described constitution enables forced introduction of the atmosphere into the vessel 10 by the blower fan 33 and passage of a large amount of the air through the moisture absorbent member 12. As a result, compared with the above-described embodiments in which the atmosphere is introduced into the vessel 10 by natural circulation, a moisture amount absorbed by the moisture absorbent member 12 can be increased. It is presumed that near the ground surface, the ambient temperature is low and the relative humidity is high. By introducing the atmosphere from the lower portion of the vessel 10 as in the present embodiment, air having a relatively high humidity can be introduced and a moisture absorption efficiency in the moisture absorbent member 12 can be improved.

Eighth Embodiment

The eighth embodiment of the present invention will next be described. Only a difference from the above-described embodiments will hereinafter be described.

Figure 16:
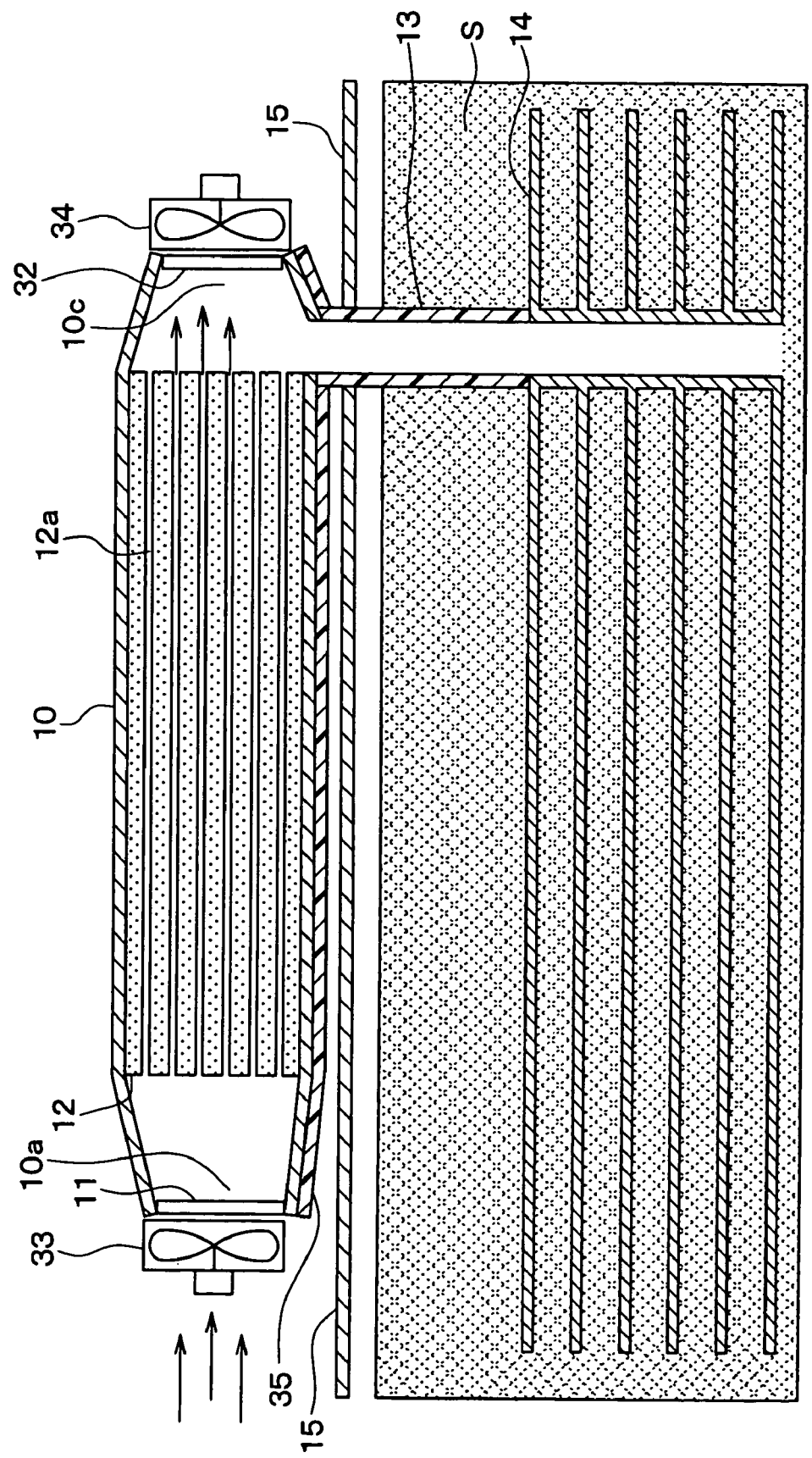
FIG. 16 is a schematic view illustrating a water droplet generating system according to an eighth embodiment.

FIG. 16 is a schematic view of a water droplet generating system of the present embodiment. As illustrated in FIG. 16, the water droplet generating system of the present embodiment has a first opening portion 10a on one end (left side of FIG. 16) of the vessel 10 in the horizontal direction thereof and a second opening portion 10c on the other end (right side of FIG. 16) of the vessel 10 in the horizontal direction thereof. A first blower fan 33 is disposed upstream of the moisture absorbent member 12 in the vessel 10 in the air-flow direction, and a second blower fan 34 is disposed downstream of the moisture absorbent member 12 in the vessel 10 in the air-flow direction. The first opening portion 10a is opened and closed by the first opening/closing valve 11 and the second opening portion 10c is opened and closed by the second opening/closing valve 32. As these opening/closing valves 11 and 32, a plate door or film slide door is usable. A space downstream of the moisture absorbent member 12 in the vessel 10 in the air-flow direction is connected to the communicating portion 13 and the condenser portion 14. The vessel 10 of the present embodiment is different from that of the seventh embodiment and such a constitution enables passage of the air, which has been introduced into the vessel 10, in the vessel 10 in the horizontal direction.

A reflector plate 15 is placed between the vessel 10 and the ground surface in order to reflect sunlight to the vessel 10. A heat insulator 35 is disposed on the lower side of the external surface of the vessel 10. The heat insulator 35 may be made of a material having low heat conductivity and a resin material can be used for example.

The constitution as described above enables, similar to the constitution in the seventh embodiment, forced introduction of the atmosphere into the vessel 10 by the blower fan 33 and much air can be passed through the moisture absorbent member 12. This leads to an increase in the amount of moisture absorbed by the moisture absorbent member 12. Since the ambient temperature may be low near the ground surface, disposal of the heat insulator 35 on the lower surface of the vessel 10 can prevent heat release from the vessel 10 and confine the heat in the vessel 10.

Ninth Embodiment

The ninth embodiment of the present invention will next be described. Only a difference from the above-described embodiments will hereinafter be described.

Figure 17:
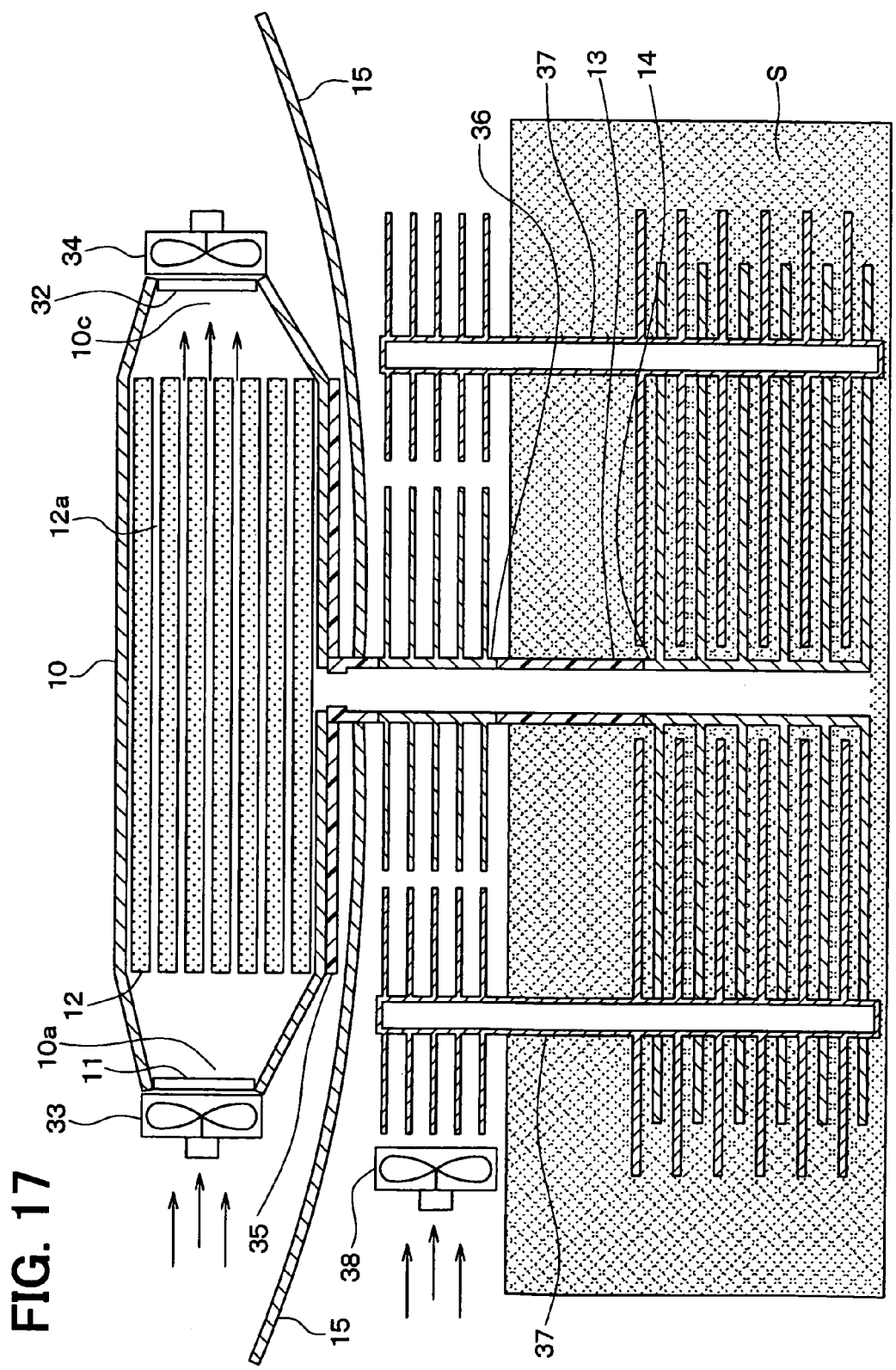
FIG. 17 is a schematic view illustrating a water droplet generating system according to a ninth embodiment.

FIG. 17 is a schematic view illustrating the water droplet generating system of the present embodiment. As illustrated in FIG. 17, the water droplet generating system of the present embodiment is different from that of the eighth embodiment shown in FIG. 16 in that it is equipped with a first radiator portion 36, a second radiator portion 37, and a third blower fan 38.

The first radiator portion 36 is placed at the communicating portion 13 between the vessel 10 and the ground surface. The first radiator portion 36 has a heat transfer fin extending outside and is constructed so that heat exchange is performed between the atmosphere and the water vapor passing through the communicating portion 13. The first radiator portion 36 is placed so as to be thermally blocked from the vessel 10.

The second radiator portion 37 is placed in the vicinity of the condenser portion 14. The second radiator portion 37 is formed as a heat pipe. It has a heat transfer fin extending to the atmosphere and the soil S in the vicinity of the condenser portion 14 and is constructed so that heat exchange is performed between the soil S in the vicinity of the condenser portion 14 and the atmosphere.

The third blower fan 38 is constructed to send air to the heat transfer fins of the first radiator portion 36 and the second radiator portion 37 between the vessel 10 and the ground surface. The third blower fan 38 may be operated during a time zone when the air containing water vapor is supplied to the condenser portion 14 and the temperature of the soil S rises. In other words, the third blower fan 38 may be operated in a time zone when the first opening/closing valve 11 and the second opening/closing valve 32 are closed as a result of an increase in the ambient temperature.

The apparatus of the present embodiment having the above-described constitution can bring about similar effects to those of the eighth embodiment. In the constitution of the ninth embodiment, water vapor passing through the communicating portion 13 is cooled due to the first radiator portion 36. This accelerates conversion of water vapor into water droplets and can prevent a temperature rise of the soil S which will otherwise be caused by water vapor. In addition, the second radiator portion 37 contributes to release, to the atmosphere, of heat accumulated in the soil S in the vicinity of the condenser portion 14 and can prevent a temperature rise of the soil S in the vicinity of the condenser portion 14. Moreover, the third blower fan 38 can cool the first radiator portion 36 and the second radiator portion 37 and effectively prevent a temperature rise of the soil S.

Tenth Embodiment

The tenth embodiment of the present invention will next be described. Only difference from the above-described embodiments will hereinafter be described.

Figure 18:
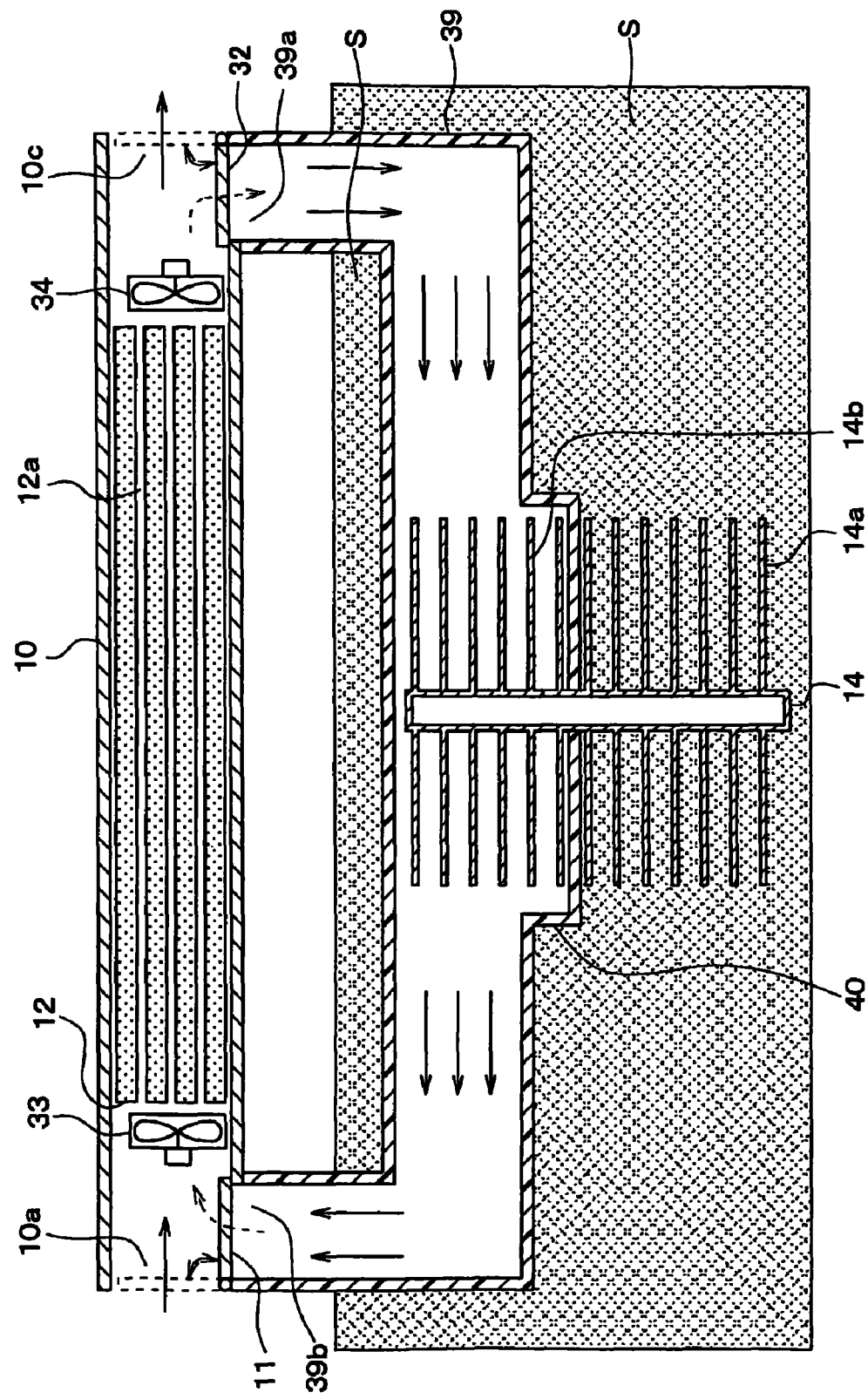
FIG. 18 is a schematic view illustrating a water droplet generating system according to a tenth embodiment.

FIG. 18 is a schematic view illustrating a water droplet generating system of the present embodiment. As illustrated in FIG. 18, the water droplet generating system of the present embodiment has a circulation channel which connects the air-flow upstream side and the air-flow downstream side of the moisture absorbent member 12 in the vessel 10. The circulation channel 39 is made of, for example, a pipe-like member made of a resin. In the circulation channel 39, a connection portion with the air-flow downstream side of the moisture absorbent member 12 in the vessel 10 is an inlet portion 39a and a connection portion with the air-flow upstream side of the moisture absorbent member 12 in the vessel 10 is an outlet portion 39b. The circulation channel 39 except the inlet portion 39a and the outlet portion 39b is placed in the soil S.

The first opening/closing valve 11 and the second opening/closing valve 32 are formed as a plate door. When the first opening/closing valve 11 is arranged to be horizontal, the first opening/closing valve 11 opens the first opening portion 10a and at the same time, closes the outlet portion 39b of the circulation channel 39. When the first opening/closing valve 11 is arranged to be perpendicular, the first opening/closing valve 11 closes the first opening portion 10a and at the same time, opens the outlet portion 39b of the circulation channel 39. Similarly, when the second opening/closing valve 32 is arranged to be horizontal, the second opening/closing valve 32 opens the second opening portion 10c and at the same time, closes the inlet portion 39a of the circulation channel 39. When the second opening/closing valve 32 is arranged to be perpendicular, the second opening/closing valve 32 closes the second opening portion 10c and at the same time, opens the inlet portion 39a of the circulation channel 39.

The condenser portion 14 of the present embodiment is formed as a heat pipe. The condenser portion 14 has a first heat transfer fin 14 in the soil S and a second heat transfer fin 14b in the circulation channel 39 and it is constructed so that heat exchange is performed between the soil S and water vapor running through the circulation channel 39. A water reservoir 40 is formed at the lower portion of the circulation channel 39 where the condenser portion 14 is disposed. The water reservoir 40 is formed by making a part of the circulation channel 39 project downward.

The operation of the water droplet generating system having the above constitution will next be described. The blower fans 33 and 34 can be operated constantly.

When moisture is absorbed by the moisture absorbent member 12, the first opening/closing valve 11 opens the first opening portion 10a, and at the same time closes the outlet portion 39b of the circulation channel 39, and the second opening/closing valve 32 opens the second opening portion 10c, and at the same time closes the inlet portion 39a of the circulation channel 39. By the above, the atmosphere can be introduced into the vessel 10, caused to pass through the vessel 10, and then discharged outside. Water vapor in the air can therefore be absorbed in the moisture absorbent member 12.

When moisture is released from the moisture absorbent member 12, the first opening/closing valve 11 closes the opening portion 10a and at the same time, opens the outlet portion 39b of the circulation channel 39 and the second opening/closing valve 32 closes the second opening portion 10c and at the same time opens the inlet portion 39a of the circulation channel 39. This blocks the communication between the inside and outside of the vessel 10 and communicates the inside of the vessel 10 with the circulation channel 39. A closed loop for circulating air between the vessel 10 and the circulation channel 39 is thus formed.

In the vessel 10, moisture absorbed by the moisture absorbent member 12 is released as water vapor and air containing water vapor enters from the inlet portion 39a to the circulation channel 39. The water vapor is cooled to a dew point thereof or less in the condenser portion 14 and condensed on the surface of the second heat transfer fin 14b of the condenser portion 14. Water droplets drop downward from the second heat transfer fin 14b of the condenser portion 14 and stored in the water reservoir 40. Moisture stored in the water reservoir 40 is pumped up and can be used for water sprinkling to plants. Moreover, water stored in the water reservoir 40 can also be used as drinking water or the like, because it is clean and fresh.

The air, which has passed through the condenser portion 14, reenters in the vessel 10 through the outlet portion 39b of the circulation channel 39. Because the temperature in the vessel 10 becomes higher than that in the circulation channel 39 disposed in the soil S, the temperature of the air, which reenters into the vessel 10, is increased and the relative humidity of the air is reduced. Therefore, the reentering air is dehumidified. Release of water vapor from the moisture absorbent member 12 can therefore be accelerated.

As described above, since the vessel 10 and the circulation channel 39 constitute a closed loop, the dehumidified air can be supplied to the vessel 10, release of moisture from the moisture absorbent member 12 can be accelerated, and water droplets can be generated effectively.

When the water stored in the water reservoir 40 is used as drinking water, it is especially effective when the water droplet generating system is used in a place where drinking water is not easy available. For example, in a region surrounded by ocean, much energy may be required to get drinking water, but by using the water droplet generating system of the present embodiment, drinking water can be secured stably and water for domestic use can be secured at low cost.

When water for domestic use is obtained by clarifying river water, it costs much to clarify water and supply the resulting water to a place distant from the river. Use of the water droplet generating system of the present embodiment eliminates the need for clarification of water and, because the apparatus can be installed in each home, eliminates the need for transport from a distant place so that water for domestic use is available at a relatively low cost. This is also valid for procurement of water in urban areas where water for domestic use is obtained from river water. In urban areas, it is not easy to find a place where the temperature of water vapor released from the moisture absorbent member 12 falls below its dew point. In such a case, the condenser portion 14 is preferably disposed deep in the ground.

In high altitudes, it is the common practice to store rain water and use it as water for domestic use. It does not always rain stably so that drinking water is stably available in high altitudes by using the water droplet generating system of the present embodiment.

Even in a district where drinking water is not easily available because of a high salt content in the underground water, use of the water droplet generating system of the present embodiment can provide clean drinking water having no salt content.

Eleventh Embodiment

The eleventh embodiment of the present invention will next be described.

Figure 19:
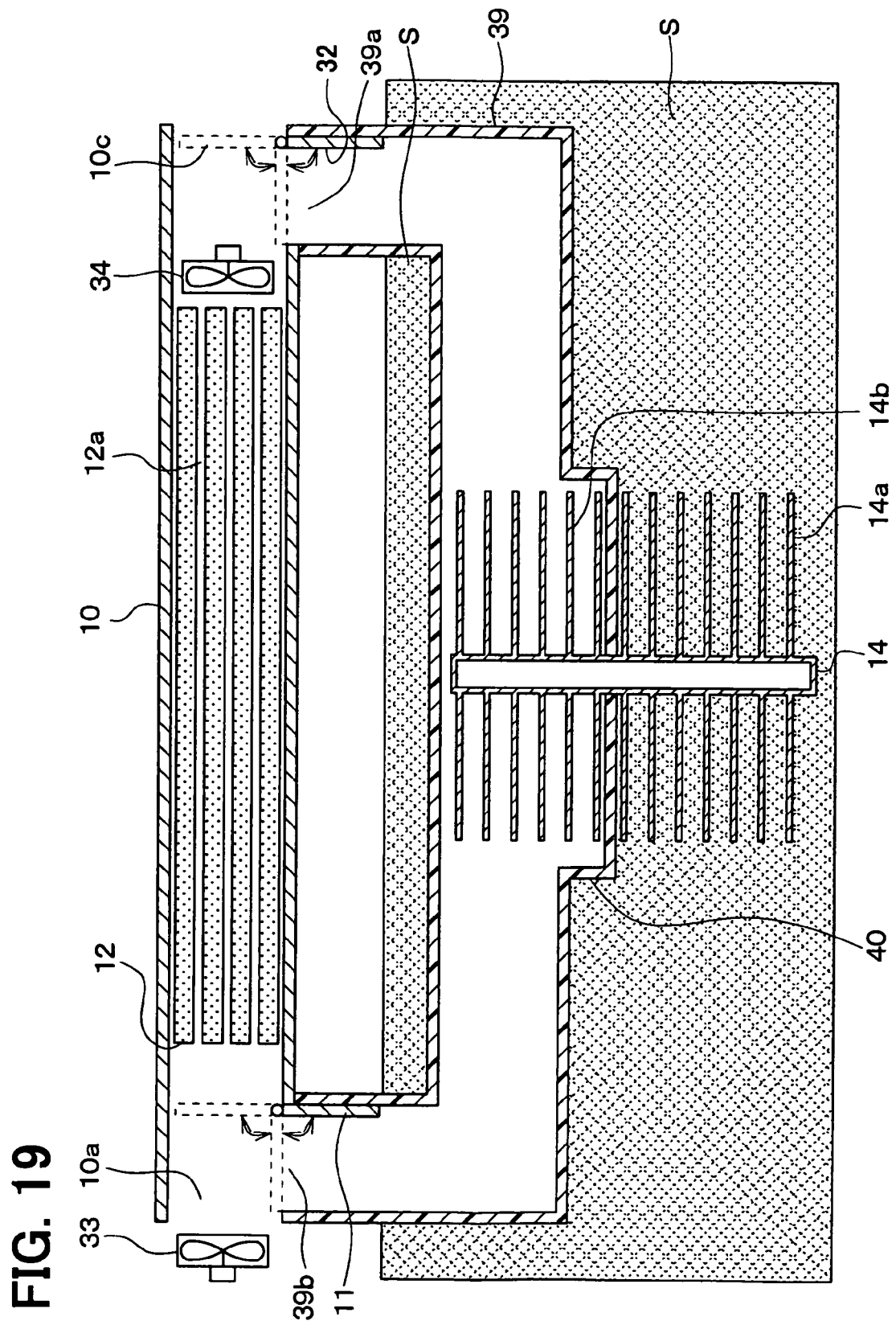
FIG. 19 is a schematic view illustrating a water droplet generating system according to an eleventh embodiment.

FIG. 19 is a schematic view illustrating a water droplet generating system of the present embodiment. As illustrated in FIG. 19, the water droplet generating system of the present embodiment is different from the water droplet generating system of the tenth embodiment in the constitutions of the first blower fan 33, the first opening/closing valve 11, and the second opening/closing valve 32.

The first blower fan 33 is disposed on the upstream side of the outlet portion 39b of the circulation channel 39 in the vessel 10. The first opening/closing valve 11 opens the outlet portion 39b of the circulation channel 39 and closes the upstream side of the moisture absorbent member 12 in the vessel 10; closes the outlet portion 39b of the circulation channel 39 and opens the upstream side of the moisture absorbent member 12 in the vessel 10; and opens both the outlet portion 39b of the circulation channel 39 and the upstream side of the moisture absorbent member 12 in the vessel 10. Thus, the above-described three states are created. The second opening/closing valve 32 opens the inlet portion 39a of the circulation channel 39 and closes the second opening portion 10c of the vessel 10; closes the inlet portion 39a of the circulation channel 39 and opens the second opening portion 10c of the vessel 10; and opens both the inlet portion 39b of the circulation channel 39 and the second opening portion 10c of the vessel 10. Thus, the above-described three states are created.

Figure 20A:
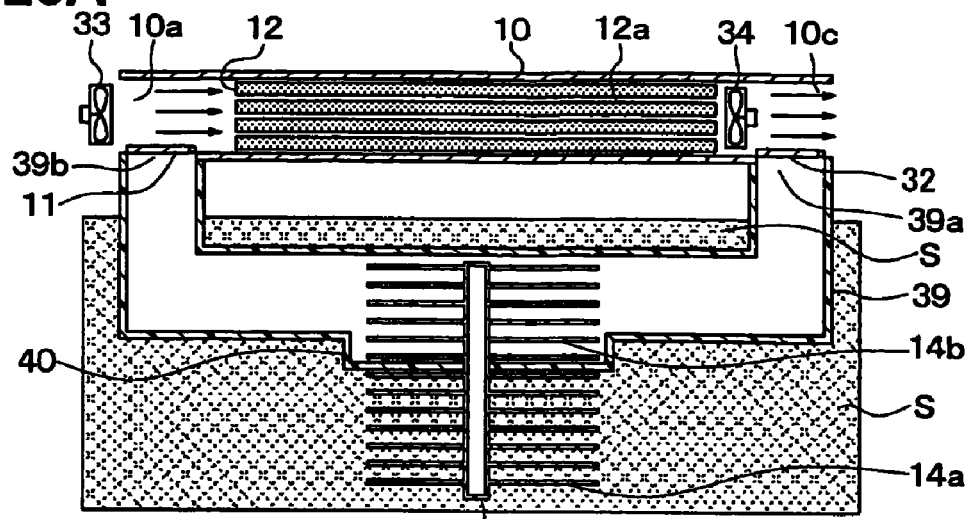
FIG. 20A is a schematic view illustrating a state of an air flow channel in the water droplet generating system of the eleventh embodiment.
Figure 20B:
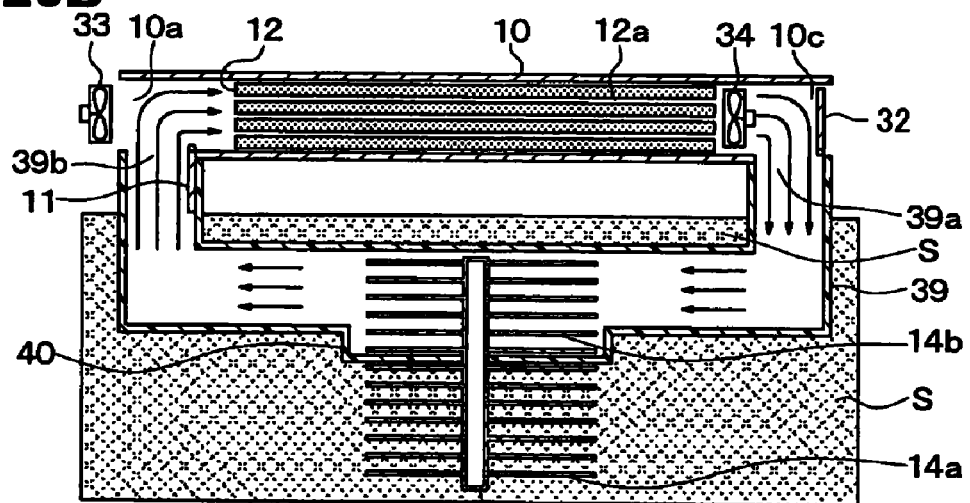
FIG. 20B is a schematic view illustrating another state of the air flow channel in the water droplet generating system of the eleventh embodiment.
Figure 20C:
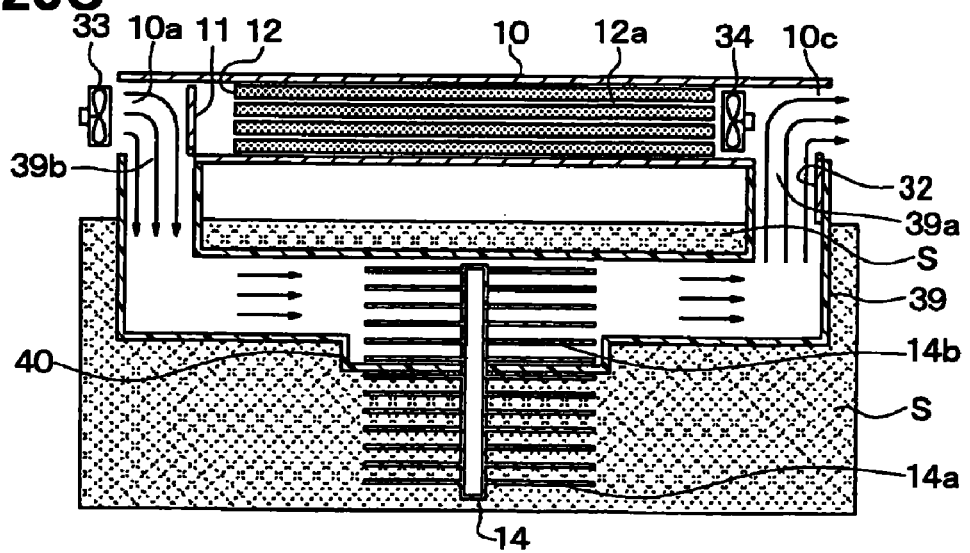
FIG. 20C is a schematic view illustrating a further another state of the air flow channel in the water droplet generating system of the eleventh embodiment.

FIGS. 20A to 20C illustrate different states of an air flow channel, respectively. FIG. 20A illustrates the air flow channel when the water vapor in the atmosphere is absorbed by the moisture absorbent member 12. In the state illustrated in FIG. 20A, the first blower fan 33 and the second blower fan 34 are working. The first opening/closing valve 11 closes the outlet portion 39b of the circulation channel 39 and opens the upstream side of the moisture absorbent member 12 in the vessel 10. The second opening/closing valve 32 closes the inlet portion 39a of the circulation channel 39 and opens the second opening portion 10c in the vessel 10. In this state, the atmosphere passes only in the vessel 10. This enables the water vapor contained in the atmosphere to be absorbed in the moisture absorbent member 12.

FIG. 20B illustrates the air flow channel when moisture is released from the moisture absorbent member 12. In the state illustrated in FIG. 2B, the first blower fan 33 is at rest while the second blower fan 34 is working. The first opening/closing valve 11 opens the outlet portion 39b of the circulation channel 39 and upstream side of the moisture absorbent member 12 of the vessel 10 and the second opening/closing valve 32 opens the inlet portion 39a of the circulation channel 39 and closes the second opening portion 10c of the vessel 10. In this state, the vessel 10 and the circulation channel 30 constitute a closed loop in which the air passes and water vapor released from the moisture absorbent member 12 condenses in the condenser portion 14, whereby water droplets are generated.

FIG. 20C illustrates an air flow channel when the atmosphere has high humidity. For example, the atmosphere is so highly humid to generate night dew and the moisture absorbent member 12 cannot absorb moisture further because it reaches the upper limit. In the state shown in FIG. 20C, the first blower fan 33 is working, while the second blower fan 34 is at rest. The first opening/closing valve 11 opens the outlet portion 39b of the circulation channel 39 and closes the upstream side of the moisture absorbent member 12 of the vessel 10. The second opening/closing valve 32 opens both the inlet portion 39a of the circulation channel 39 and the second opening portion 10c of the vessel 10. In this state, the air entering in the vessel 10 is supplied to the circulation channel 39 without being supplied to the moisture absorbent member 12. At this time, the air flow direction in the circulation channel 39 is opposite to that shown in FIG. 20B. The air enters from the outlet portion 39b and enters from the inlet portion 39a. Water vapor contained in the high humidity atmosphere supplied to the circulation channel 39 condenses in the condenser portion 14 and water droplets are generated.

According to the constitution of this eleventh embodiment, water droplets are generated by making use of absorption and release of moisture by the moisture absorbent member 12 and in addition, when the moisture absorption amount of the moisture absorbent member 12 reaches the upper limit under high humidity condition, the water vapor contained in the atmosphere is condensed and water droplets are generated directly from the atmosphere without the aid of the moisture absorbent member 12.

Twelfth Embodiment

The twelfth embodiment of the present invention will next be described.

Figure 21:
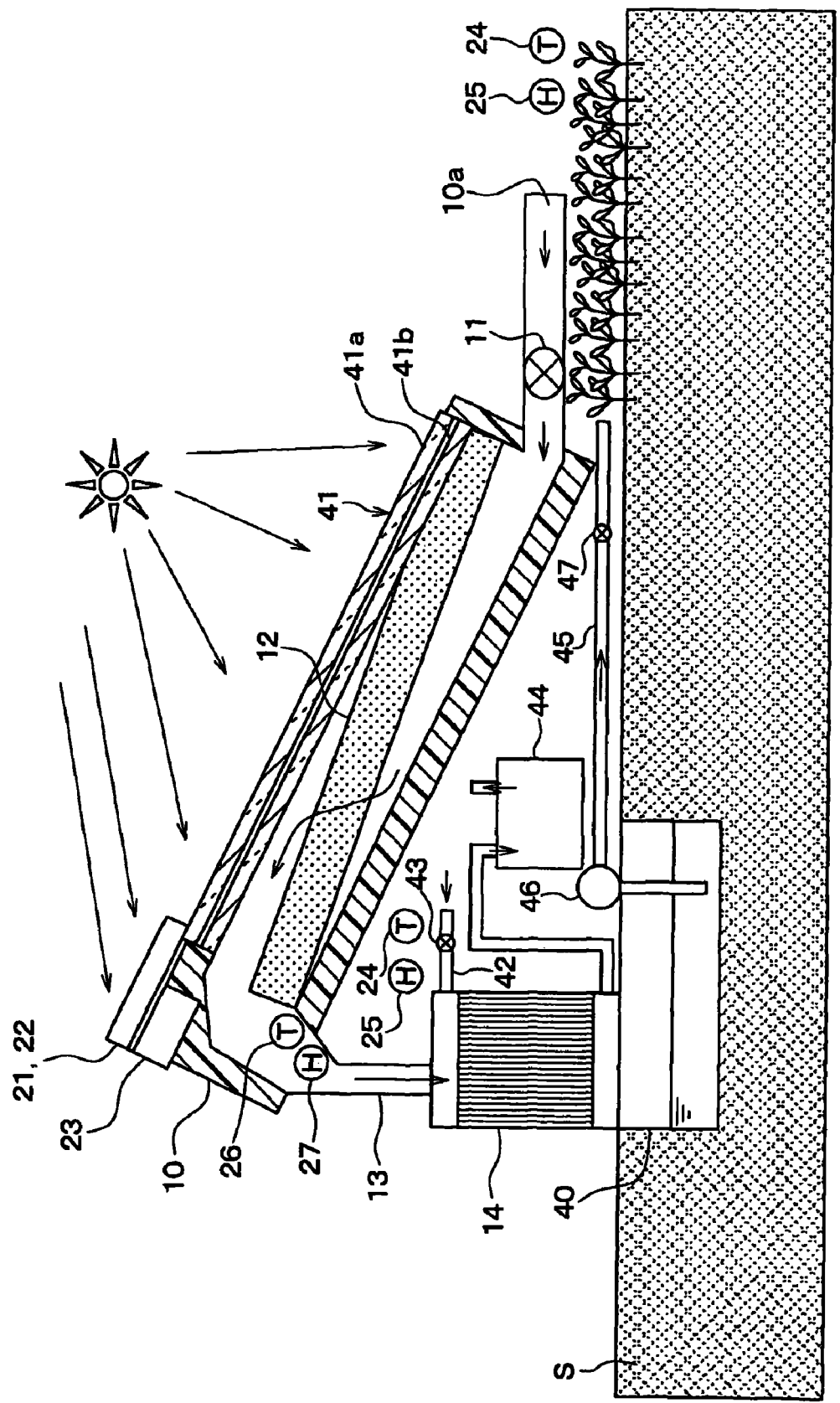
FIG. 21 is a schematic view illustrating a water droplet generating system according to a twelfth embodiment.

FIG. 21 is a schematic view illustrating the water droplet generating system according to the present embodiment. The vessel 10 of the present embodiment is a flat rectangular parallelepiped in shape, and the area of each of the upper surface and the lower surface is greater than the area of the side surface. The vessel 10 has, on the upper surface thereof, an upper-side member 41 having translucency. The vessel 10 has, inside thereof, a moisture absorbent member 12 slightly inclined to the upper-side member 41. The vessel 10 is inclined relative to the ground surface. The vessel 10 is preferably placed so that the upper-side member 41 can receive sunlight efficiently. An opening portion 10a is placed on the lower side of the inclined vessel 10. The present embodiment permits the atmosphere, which has been introduced into the vessel 10 through the opening portion 10a, to pass through the vessel 10 in a direction from the bottom to the top of the moisture absorbent member 12. The humidity in the vicinity of the ground surface is presumed to be higher than that above the ground surface so that the opening portion 10a of the vessel 10 is preferably placed in the vicinity of the ground surface. In addition, the humidity in the vicinity of a plant is presumed to be relatively high so that the opening portion 10*a* is preferably placed in the vicinity of the plant.

The upper-side member 41 has two plate-like members 41*a* and 41*b* placed in parallel to each other with a space therebetween. The plate-like members 41*a* and 41*b* are each made of a transparent material so that sunlight can be supplied to the moisture absorbent member 12 via the upper-side member 41. Examples of the transparent material constituting the plate-like members 41*a* and 41*b* include glass, quartz, sapphire, acrylic, polycarbonate, and nylon.

Figure 22:
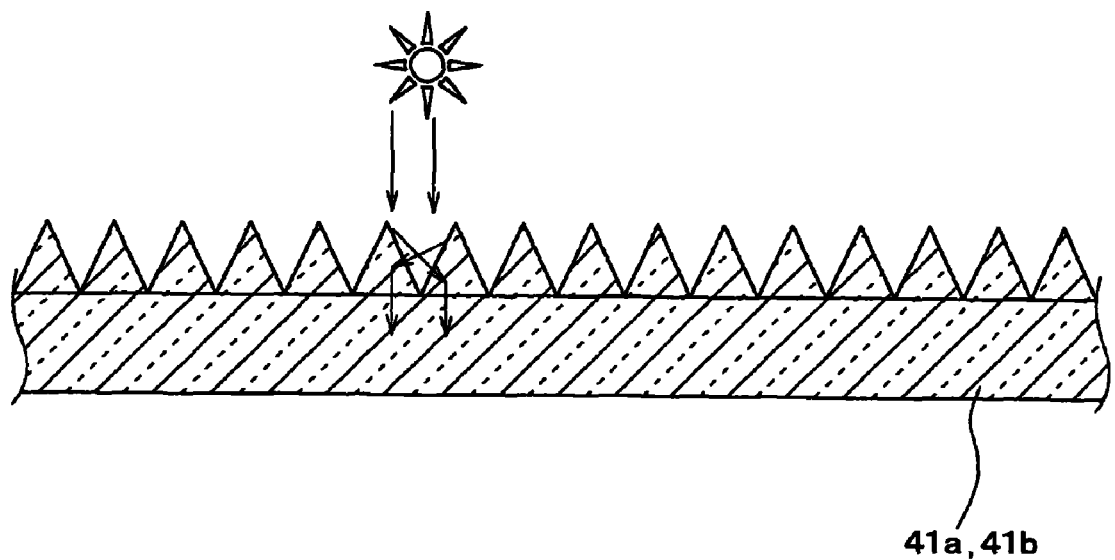
FIG. 22 is a cross-sectional view of a plate-like member constituting an upper-side member.

FIG. 22 is a cross-sectional view of the plate-like members 41*a* and 41*b*. As illustrated in FIG. 22, the plate-like members 41*a* and 41*b* have a surface processed to efficiently introduce sunlight into the vessel 10. More specifically, the plate-like members 41*a* and 41*b* have, on the surfaces thereof, many projections and recesses having a triangle cross-sectional shape, and each of the projections and recesses is formed by an angle such that incident sunlight is reflected into the vessel 10. The vessel 10 is made of a heat insulating material and at the same time, a space between the plate-like members 41*a* and 41*b* defines a hermetically-sealed dead-air layer. As a result, the temperature of the moisture absorbent member 12 can be raised efficiently by utilizing solar energy and at night or so when the humidity is high, the moisture absorbed by the moisture absorbent member 12 can be released efficiently.

In addition, by attaching carbon particles for accelerating absorption of sunlight to the surface of the moisture absorbent member 12, it is possible to efficiently absorb sunlight and efficiently release water vapor absorbed by the member. Examples of the carbon particles to be attached to the surface of the moisture absorbent member 12 include graphite, amorphous carbon, carbon fiber, carbon nanotube, fullerene, diamond-like carbon, charcoal, and cokes. The carbon particles are attached to the surface of the particles of the moisture absorbent member 12 by mechanofusion, that is, a method for mechanically pressing carbon particles against the surface of the particles of the moisture absorbent member 12, thereby attaching them to the surface. Alternatively, the carbon particles can be attached to the surface of the particles of the moisture absorbent member 12 by suspending the particles of the moisture absorbent member 12 in a liquid containing carbon particles and then drying. The carbon particles are not limited insofar as they have a sunlight absorbing property and carbon particles in any form such as those in the form of powdery fine particles or fibers are usable. In the present embodiment, the carbon particles having a particle size of from about 0.0001 to 0.5 mm are used.

The particles of the moisture absorbent member 12 are bonded to each other by point bonding and this structure facilitates air passage. A binder for point bonding of the particles of the moisture absorbent member 12 may employ an adhesive obtained by fusing epoxy powder around the melting point or another adhesive obtained by mixing the above resulting adhesive with carbon. The air flow resistance of the moisture absorbent member 12 is determined by the particle size of the binder. In a case, where the binder has a large particle size, the interparticle distance of the moisture absorbent member 12 becomes large and the air flow resistance is reduced. In a case, where the binder has a small particle size, on the other hand, the interparticle distance of the moisture absorbent member 12 becomes small and the air flow resistance increases.

When the particles of the moisture absorbent member 12 are close to each other, the air flow resistance of the moisture absorbent member 12 becomes large. As a result, it is difficult to keep a uniform moisture adsorption property of the moisture absorbent member 12 and at the same time, a large power is required to introduce the atmosphere into the moisture absorbent member 12. When the interparticle distance of the moisture absorbent member 12 is large, on the other hand, the air flow resistance is reduced, but it leads to a reduction in the contact time between the moisture absorbent member 12 and air. As a result, the moisture absorbent member 12 cannot absorb water vapor sufficiently. It is therefore important to keep an appropriate distance between particles of the moisture absorbent member 12. In the present embodiment, the particle size of the moisture absorbent member 12 is adjusted to approximately from 0.1 to 5 mm and the particle size of the binder is adjusted to approximately from 0.01 to 1 mm.

Referring to FIG. 21 again, the condenser portion 14 of the present embodiment is installed on the ground and it serves as a heat exchanger capable of heat-exchanging the atmosphere with the water vapor released from the moisture absorbent member 12. The condenser portion 14 is desirably located at a place where the temperature becomes low. In the present embodiment, the condenser portion 14 is located below the vessel 10.

An air introduction channel 42 for introducing air into the condenser portion 14 is disposed between the condenser portion 14 and the vessel 10. The air introduction channel 42 is placed in order to supply high-humidity atmosphere into the condenser portion 14 when the atmosphere has high humidity (for example, has a relative humidity of from 90 to 95% or greater), for example, when mist appears or at a rainy time. It is therefore desired to dispose the air introduction channel 42 at a position (near the ground surface, in shade, or in the vicinity of plants) where the humidity becomes relatively high.

The air introduction channel 42 has an opening/closing valve 43 and the opening and closing of the air introduction channel 42 is controlled by the controller portion 23. The controller portion 23 controls opening and closing of the opening/closing valve 43 based on the humidity detected by a first humidity sensor 25 for measuring the humidity in the vicinity of the air introduction channel 42. More specifically, the controller portion 23 may be constructed to open the opening/closing valve 43 when the humidity detected by the first humidity sensor 25 is higher than a predetermined humidity (for example, relative humidity of 95%) and close the opening/closing valve 43 when the humidity detected by the first humidity sensor 25 is lower than the predetermined humidity (for example, relative humidity of 95%). It is also possible to open the opening/closing valve 43 when the ambient temperature falls below a dew point, and close the opening/closing valve 43 when the ambient temperature exceeds the dew point. The dew point can be determined as a temperature at which the water vapor pressure, which has been calculated based on an ambient temperature detected by the first temperature sensor 24 and a humidity detected by the first humidity sensor 25, is a saturated water vapor pressure.

Moisture in the air supplied to the condenser portion 14 is cooled in the condenser portion 14 and becomes water droplets. The water droplets are stored in the water reservoir 40. When high humidity air is cooled in the condenser portion 14, supercooling of water vapor is apt to occur. By having a starting point on the air distribution surface of the condenser portion 14 for converting the super-cooled water vapor into water droplets, water droplets can be generated efficiently.

The starting point can be formed as a nano-size protrusion having a hydrophobic function. Water drops are easily formed when super-cooled water vapor is brought into contact with the end of the protrusion. Such a protrusion can be formed by covering the surface of a brucite-type cobalt hydroxide film with lauric acid in the following manner. First, a tube constituting the air distribution surface of the condenser portion 14 is immersed for 24 hours in a solution obtained by charging urea in cobalt chloride and keeping the resulting solution at 60° C. to cause precipitation of a brucite-type cobalt hydroxide film on the surface. Then, the tube is immersed in an aqueous solution of sodium laurate at 60° C. for 5 hours to cover the film with lauric acid. Thus, a protrusion can be formed on the air circulation surface of the condenser portion 14. The protrusion can also be formed by covering the air distribution surface of the condenser portion 14 with a carbon nanotube. The carbon nanotube can be formed by arc discharge or CVD.

A hydrophobic film formed on the air distribution surface of the condenser portion 14 can also be used as the starting point. As the hydrophobic film, usable is a film of silver iodide having a capacity of converting super-cooled water vapor into water droplets at an accelerated rate. The film of silver iodide is desirably formed at the tip of the protrusion.

Between the condenser portion 14 and the water reservoir 40, a pump 44 for suctioning the air which has passed through the condenser portion 14 is placed. By operating the pump 44 while opening the opening portion 10a of the vessel 10, the atmosphere can be introduced into the vessel 10. By operating the pump 44 while opening the air introduction channel 42, the atmosphere can be introduced into the condenser portion 14 via the air introduction channel 42. The flow rate of the pump 44 is controlled by the controller portion 23. When humidity is high, for example, on a rainy night, it is necessary to introduce, into the water droplet generating system, the atmosphere as much as possible so that the air flow rate by the pump 44 is increased. When moisture is released from the moisture absorbent member 12 in the day time when humidity is low, it is not necessary to introduce the atmosphere into the water droplet generating system so that the air flow rate by the pump 44 is reduced.

The water reservoir 40 has a water supply channel 45 for supplying plants with water stored in the water reservoir 40. The water supply channel 45 has a pump 46 for feeding water of the water reservoir 40 and an opening/closing valve 46 for opening and closing the channel. Water stored in the water reservoir 40 is supplied to the root of the plants for growing the plants.

According to the apparatus of the present embodiment as described above, the transparent upper-side member 41 disposed on the upper surface of the vessel 10 enables an efficient temperature rise of the moisture absorbent member 12 by sunlight and efficient release of moisture from the moisture absorbent member 12. In addition, carbon particles attached to the moisture absorbent member 12 enable efficient absorption of sunlight. Moreover, by providing the upper-side member 41 with a heat insulating layer and forming the vessel 10 from a heat insulating material, the influence of the ambient temperature can be minimized and the temperature of the moisture absorbent member 12 can be elevated efficiently by sunlight.

In addition, the apparatus can produce water droplets directly from the high humidity air by having the air introduction channel 42 for directly introducing high-humidity air into the condenser portion 14 from the outside.

Thirteenth Embodiment

The thirteenth embodiment of the present invention will next be described. The water droplet generating system of the present embodiment is constructed so that water droplets generated by it are used as drinking water. Only a difference from the twelfth embodiment will hereinafter be described.

Figure 23:
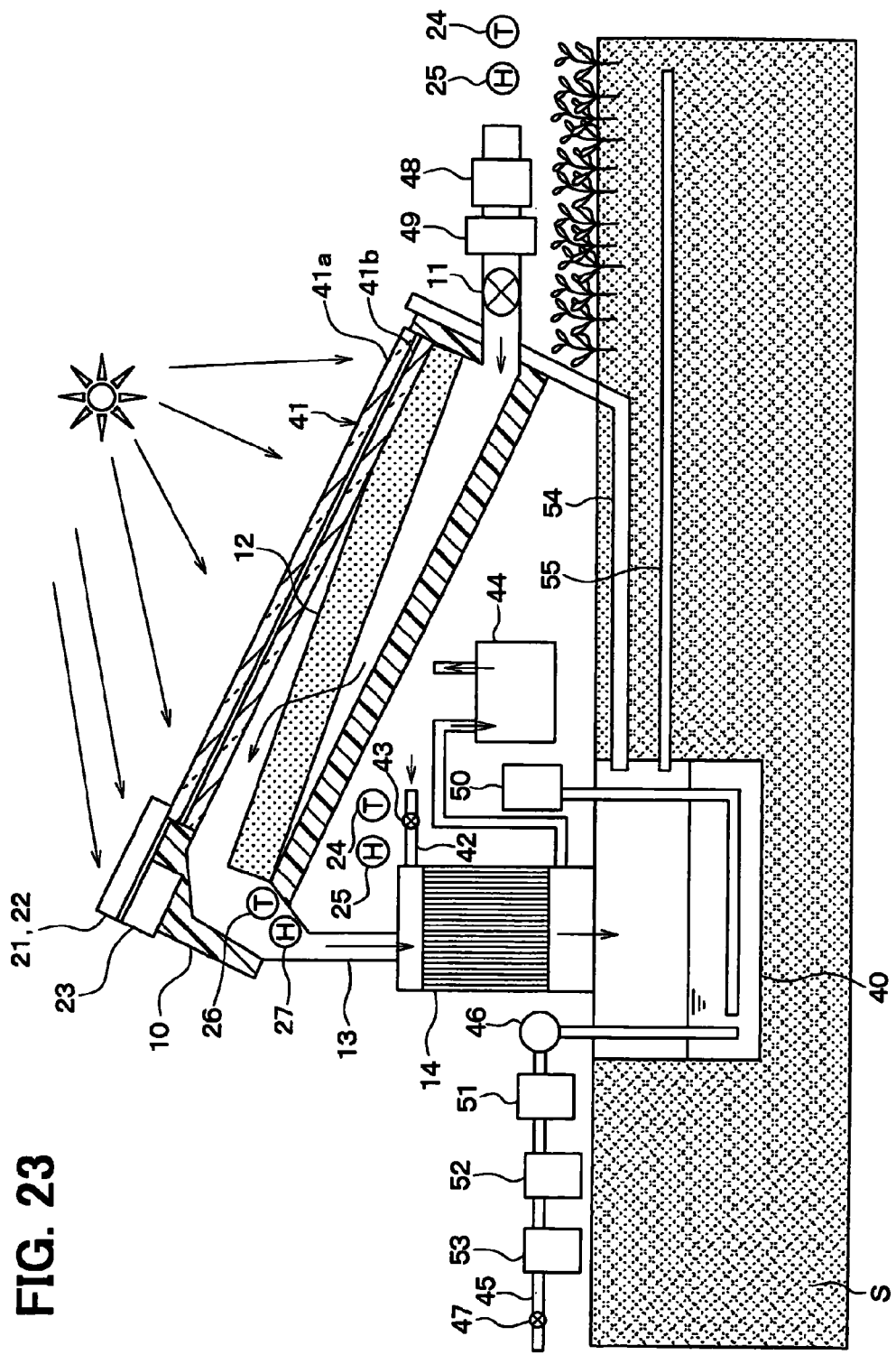
FIG. 23 is a schematic view illustrating a water droplet generating system according to a thirteenth embodiment.

FIG. 23 is a schematic view illustrating the water droplet generating system of the present embodiment. As illustrated in FIG. 23, in the apparatus of the present embodiment, the opening portion 10a of the vessel 10 is equipped with a microfilter 48 for removing impurities from the atmosphere and an odor-component removing filter 49. The microfilter 48 adsorbs thereto dust in the air, while the odor-component removing filter 49 adsorbs thereto a component emitting an offensive odor. A water reservoir 40 is equipped with an ozone generator 50 capable of generating ozone in the water reservoir 40. The water reservoir 40 has an antimicrobial-impregnated inner wall surface. A water supply channel 45 is equipped with an ozone generator 51 capable of generating ozone in the water supply channel 45 and an UV generator 52 capable of irradiating UV rays in the water supply channel 45. Water stored in the water reservoir 40 can be sterilized by these apparatuses 50, 51, and 52. Moreover, the water supply channel 45 has a microfilter 53 for removing fine foreign matter contained in water, because water stored in the water reservoir 40 may contain impurities. The apparatus of the present embodiment can therefore supply clarified water suited for drinking. The microfilter 48, the odor component removing filter 49, and the microfilter 53 are desirably replaced as needed.

Furthermore, the apparatus of the present embodiment is equipped with a first rainwater introduction channel 54 for introducing rainwater, which has fallen on the upper surface of the vessel 10, into the water reservoir 40 and a second rainwater introduction channel 55 for introducing rainwater, which has penetrated into the ground, into the water reservoir 40. The first rainwater introduction channel 54 can be formed as a pipe-like member for carrying rainwater, which has fallen onto the upper surface of the vessel 10, to the water reservoir 40. In this case, it is desired to have a gutter for collecting rainwater, which has fallen onto the upper surface of the vessel 10, on the lower side of the obliquely arranged vessel 10. As the second rainwater introduction channel 55, a hydrophilic material in string form (for example, plant fibers such as hemp or cotton) can be used. Rainwater can be collected efficiently by it and water can be stored in the water reservoir 40.

Fourteenth Embodiment

The fourteenth embodiment of the present invention will next be described.

Figure 24:
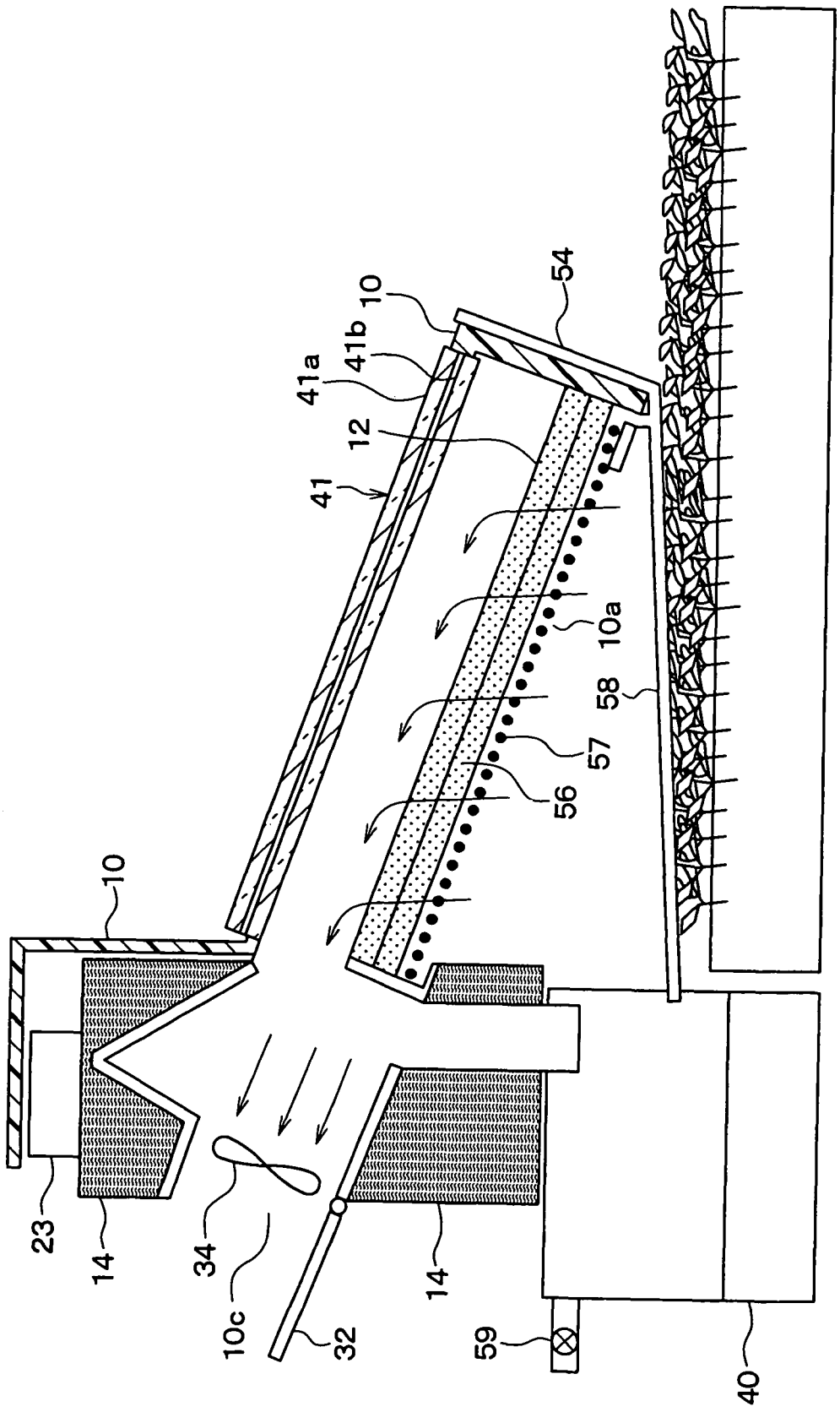
FIG. 24 is a schematic view illustrating a water droplet generating system according to a fourteenth embodiment.

FIG. 24 is a schematic view illustrating a water droplet generating system of the present embodiment. As illustrated in FIG. 24, the vessel 10 of the present embodiment is a flat rectangular parallelepiped and the area of each of the upper surface and the lower surface is greater than the area of the side surface. The lower surface of the vessel 10 is formed as an opening portion 10a.

In the present embodiment, the vessel 10 has, near the opening portion 10 thereof, a moisture absorbent member 12 and a water absorbent member 56. The wet member 12 and the water absorbent member 56 are arranged in parallel with the upper and lower surfaces of the vessel 10. In the example illustrated in FIG. 24, the moisture absorbent member 12 and the water absorbent member 56 are stacked one after another. In the present embodiment, the water absorbent member 56 lies below the moisture absorbent member 12. The moisture absorbent member 12 is similar to that in the above-described embodiments and is constructed to absorb water vapor from the air. The water absorbent member 56 is constructed to absorb fine water droplets in mist form which are present in the air under high humidity environment such as rainy or cloudy day. The water absorbent member 56 has a property of absorbing or releasing water droplets in the air, depending on a temperature change. At temperatures lower than a predetermined temperature (for example, 30° C.), the water absorbent member 56 can absorb moisture, while at temperatures higher than a predetermined temperature (for example, 30° C.), the water absorbent member 56 can release moisture.

As the water absorbent member 56, a material obtained by polymerizing N-isopropylacrylamide, sodium acrylate, and diacetone acrylic amide as disclosed in JP-A-7-224119 (corresponding to U.S. Pat. No. 5,672,656) is usable. The material has a large water absorption capacity and it undergoes volume expansion, absorbing water of about 100 times in volume. As the water absorbent member 56, a material obtained by crosslinking a nonionic water-soluble ethylenically unsaturated monomer with an anionic water-soluble ethylenically unsaturated monomer as disclosed in JP-A-H10-191777 can also be used.

The water absorbent member 56 can be used in the form supported on the surface of a cordierite monolithic carrier or the water absorbent member 56 itself may be used in the monolithic form. It is preferred to have a starting point for liquefying super-cooled water vapor, which has been described in the above twelfth embodiment, on the surface of the water absorbent member 56.

Release of moisture from the water absorbent member 56 requires about 10 cal/g of energy and release of moisture from the first water absorbent member 56 requires about 530 cal/g of energy so that moisture is released first from the water absorbent member 56 with a temperature rise. Then, after a further temperature increase, moisture is released from the moisture absorbent member 12. The moisture absorbent member 12 releases moisture from the upper surface side thereof. Moisture released from the moisture absorbent member 12 is supplied to the condenser portion 14 as water vapor and becomes water droplets in the condenser portion 14. The condenser portion 14 in the present embodiment is, similar to that in the above-described twelfth or thirteenth embodiment, formed as a heat exchanger capable of exchanging heat between the atmosphere and water vapor released from the moisture absorbent member 12. Moisture released from the water absorbent member 56 drops in the lower part of the vessel 10 as water droplets.

The water absorbent member 56 has, in the lower part thereof, a net-like water droplet collecting member 57 for collecting water droplets released from the water absorbent member 56 and a water introduction channel 58 for supplying the water reservoir 40 with water collected by the water droplet collecting member 57. The water introduction channel 58 joins a first rainwater introduction channel 54 for introducing rainwater, which has fallen to the upper surface of the vessel 10, into the water reservoir 40. The water droplet collecting member 57 has a mesh large enough to permit fine droplets in the air to pass therethrough and at the same time small enough to collect water droplets released from the water absorbent member 56. The water droplets released from the water absorbent member 56 are collected by the water droplet collecting member 57 and fed to the water reservoir 40 through the water introduction channel 58.

The vessel 10 has an opening/closing valve 32 and a blower fan 34 on the air-flow downstream side of the moisture absorbent member 12 and the water absorbent member 56. When moisture is absorbed by the moisture absorbent member 12 and the water absorbent member 56, the blower fan 34 is operated while opening the opening/closing valve 32. When moisture is released from the moisture absorbent member 12 and the water absorbent member 56, the operation of the blower fan 34 is stopped while closing the opening/closing valve 32. The water reservoir 40 has an air vent valve 59. When the opening/closing valve 32 is closed, the air vent valve 59 is opened and air, which is introduced into the water reservoir 40 together with water vapor, is released to the exterior via the air vent valve 59.

Since the apparatus has such a constitution, water vapor in the air can be absorbed by the moisture absorbent member 12 and, when humidity is higher, water droplets in the air can be absorbed by the water absorbent member 56. Water droplets can therefore be generated efficiently from moisture contained in the air over a wide humidity range. In addition, since the whole lower portion of the vessel 10 serves as the opening portion 10a, an opening area of the opening portion 10a can be enlarged. As a result, a large amount of the atmosphere can be passed through the moisture absorbent member 12 and the water absorbent member 56 and water vapor or water droplets in the air can be absorbed efficiently by the moisture absorbent member 12 and the water absorbent member 56.

Fifteenth Embodiment

The fifteenth embodiment of the present invention will next be described.

Figure 25:
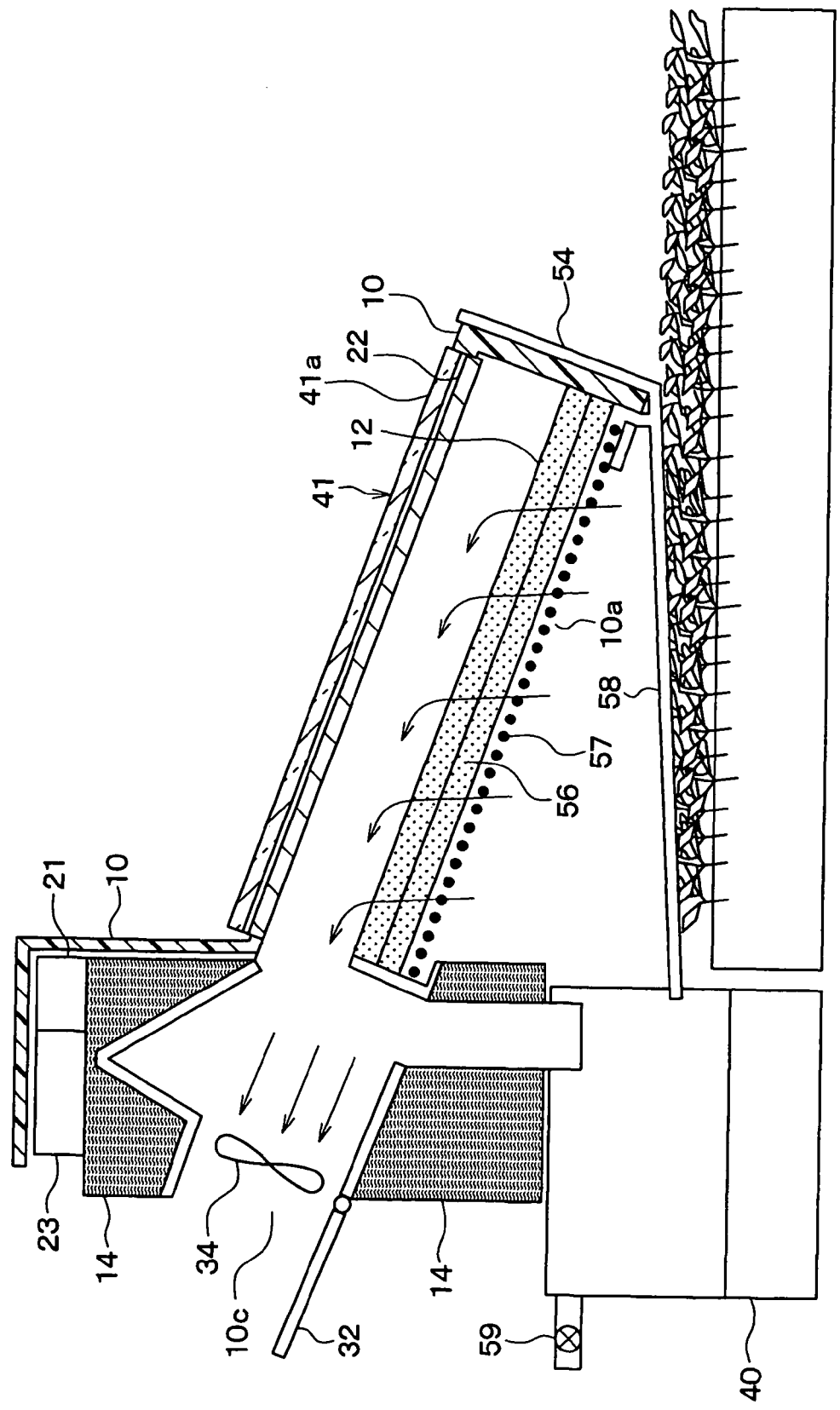
FIG. 25 is a schematic view illustrating a water droplet generating system according to a fifteenth embodiment.

FIG. 25 is a schematic view illustrating a water droplet generating system according to the present embodiment. As illustrated in FIG. 25, the upper-side member 41 of the present embodiment has, therebelow, a plate-like solar battery 22 instead of the lower-side plate-like member 41b. Sunlight which has passed through the plate-like member 41a reaches the solar battery 22. The solar battery 22 has preferably a structure resistant to humidity because the solar battery 22 is used under a high humidity environment. The power generated by the solar battery 22 is charged in the secondary battery 21 and usable for driving the blower fan 34 at night.

As the solar battery 22, a single-crystal Si solar battery, a polycrystalline Si solar battery, an amorphous Si solar battery, a GaAs solar battery, and the like are usable. A $TiO_2$ solar battery formed on glass or a film-like solar battery is also usable. The $TiO_2$ solar battery formed on glass is available by forming ITO (transparent conductive film) on the surface of glass, applying $TiO_2$ powder onto the resulting film, firing the film, and then applying a pigment. The film-like solar battery is available by placing ITO on a PET film, plating the surface of the film with zinc oxide, and then applying Eosin Y as an organic pigment to the surface.

Figure 26:
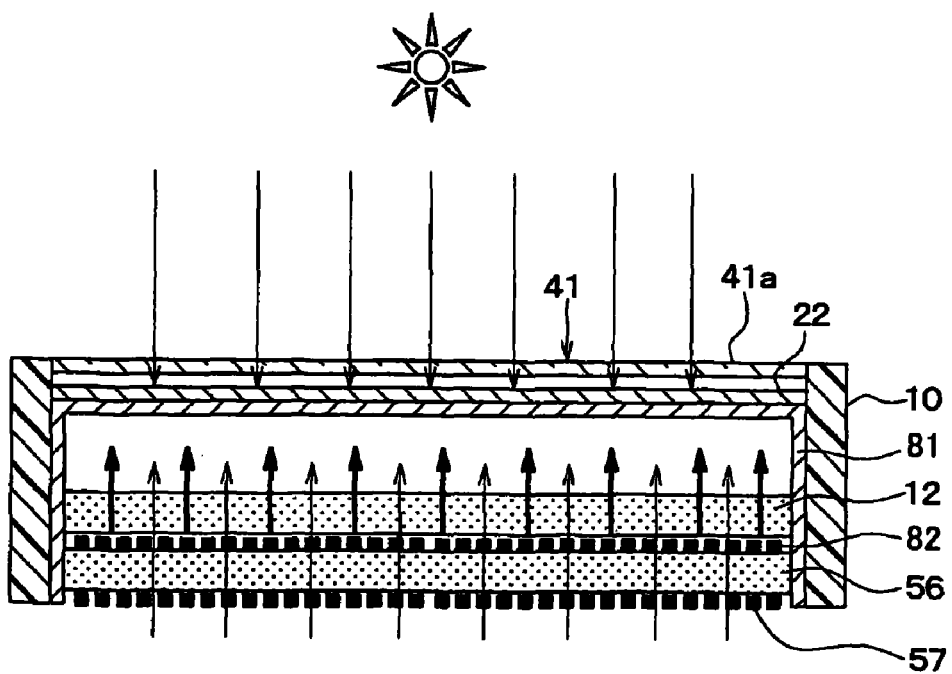
FIG. 26 is a cross-sectional view illustrating a vessel in the fifteenth embodiment.

FIG. 26 illustrates the cross-sectional constitution of the vessel 10. The solar battery 22 converts from about several to 25% of solar energy into electricity, but the remaining energy is released as heat. The apparatus of the present embodiment therefore has heat transfer members 58 and 59 for transferring, to the moisture absorbent member 12 and the water absorbent member 56, heat energy released from the solar battery 22. The first heat transfer member 81 thermally connects the lower surface of the solar battery 22 with the side surface of each of the moisture absorbent member 12 and the water absorbent member 56. The second heat transfer member 82 is disposed between the moisture absorbent member 12 and the water absorbent member 56 and transfers the heat of the first heat transfer member 81 to the whole surface of each of the moisture absorbent member 12 and the water absorbent member 56. The second heat transfer member 82 has a net shape in order not to prevent air circulation of the moisture absorbent member 12 and the water absorbent member 56.

The apparatus having the above-described composition can convert solar energy to electric energy by using the solar battery 22 and at the same time, can raise the temperature of each of the moisture absorbent member 12 and the water absorbent member 56 by using the remaining solar energy as heat energy.

Sixteenth Embodiment

The sixteenth embodiment of the present invention will next be described.

Figure 27:
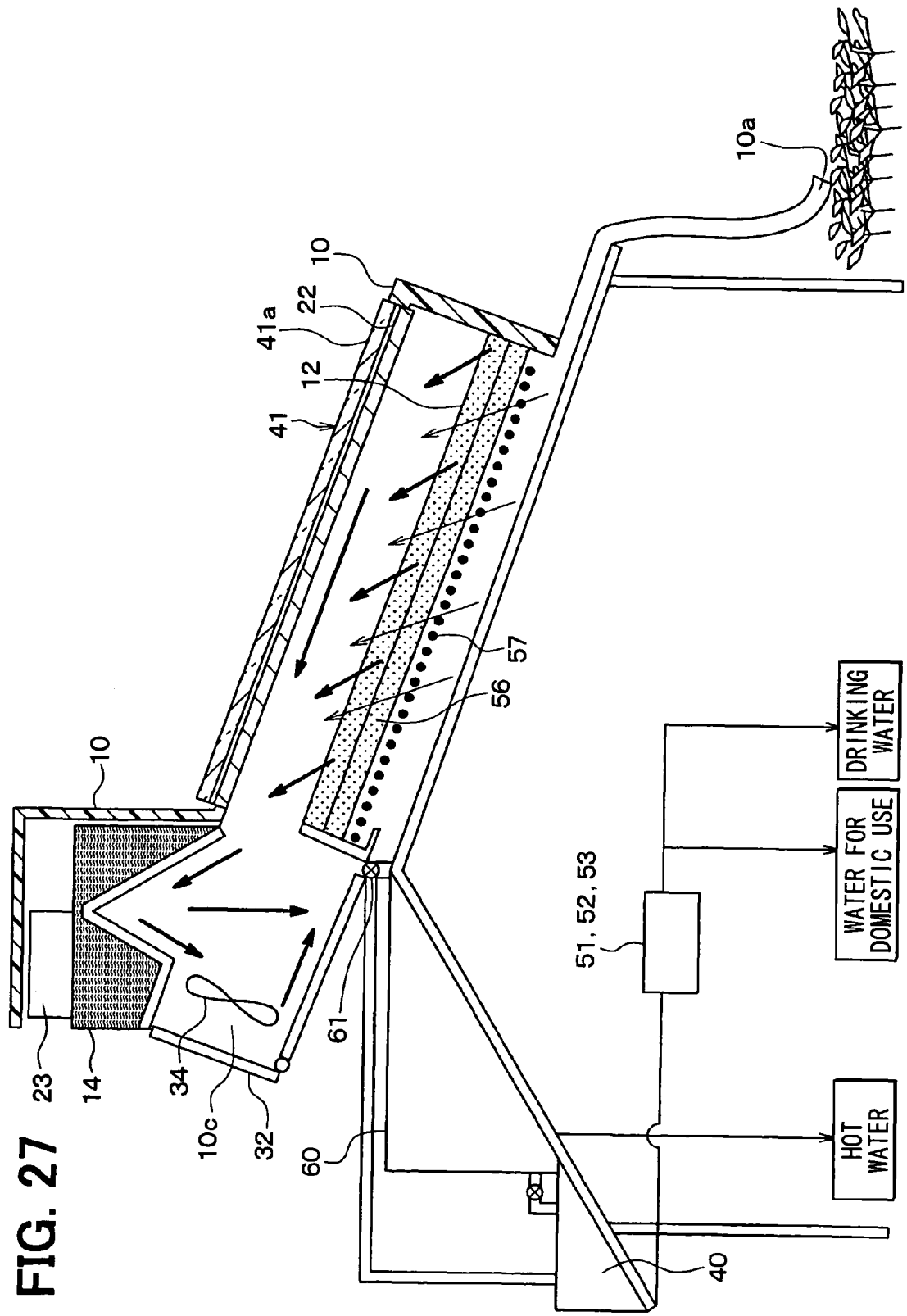
FIG. 27 is a schematic view illustrating a water droplet generating system according to a sixteenth embodiment.

FIG. 27 is a schematic view illustrating a water droplet generating system of the present embodiment. As illustrated in FIG. 27, the water droplet generating system according to the present embodiment is placed on a house roof. The house roof exists at a position higher than the ground surface so that the humidity near the house roof is presumed to be lower than that near the ground surface. The atmosphere having a relatively high humidity near the ground surface can be introduced into the vessel 10 by placing the opening portion 10a of the vessel 10 near the ground surface.

The temperature in the vessel 10 is high due to solar energy so that water droplets obtained by condensation in the condenser portion 14 are presumed to have high temperature. In the present embodiment, the apparatus has a hot-water reservoir 60 for storing high-temperature water droplets, which has been obtained by condensation in the condenser portion 14, without cooling. The hot-water reservoir 60 is made of a heat insulating member and water droplets obtained by condensation in the condenser portion 14 can be kept warm. The condenser portion 14 has, at the lower portion thereof, a three-way valve 61 and water droplets obtained by condensation in the condenser portion 14 can be sorted into the hot-water reservoir 60 and the water reservoir 40. The hot water stored in the hot-water reservoir 60 can be used for shower and bath. The water stored in the water reservoir 40 can be used as water for domestic use or drinking water after sterilization by the ozone generator 51 and the UV generator 52 and filteration through the microfilter 53 to remove fine foreign matter contained in the water.

Seventeenth Embodiment

The seventeenth embodiment of the present invention will next be described. In the present embodiment, air in a room is dehumidified using a water droplet generating system.

Figure 28:
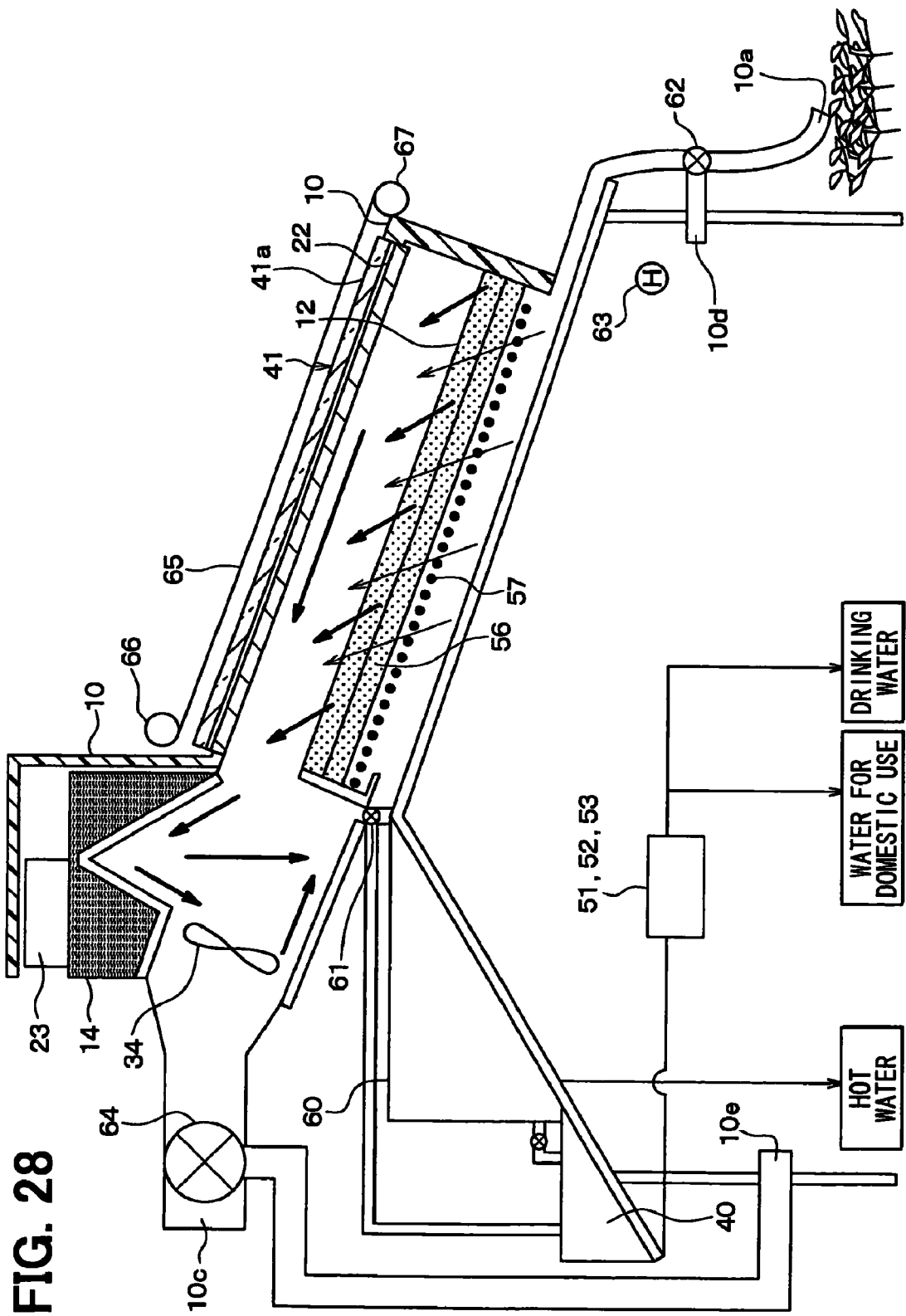
FIG. 28 is a schematic view illustrating a water droplet generating system according to a seventeenth embodiment.

FIG. 28 is a schematic view illustrating the water droplet generating system of the present embodiment. As illustrated in FIG. 28, the vessel 10 of the present embodiment is equipped with a first opening portion 10a for introducing the atmosphere into the vessel 10, and a third opening portion 10d for introducing the indoor air into the vessel 10. The first opening portion 10a and the third opening portion 10d are switched by a first channel selector valve 62. The switching between the opening portions 10a and 10d by the first channel selector valve 62 is performed by the controller portion 23.

In the present embodiment, water vapor contained in the indoor air is absorbed by the moisture absorbent member 12 so that use of a material capable of releasing and absorbing water vapor at a relative humidity of from about 30 to 40% is preferred as the moisture absorbent member 12. As the moisture absorbent member 12, the material capable of releasing and absorbing water vapor at a relative humidity of from about 30 to 40% may be mixed with a material capable of absorbing water vapor at a higher humidity range.

The vessel 10 of the present embodiment is equipped further with a second opening portion 10c for discharging the air in the vessel 10 to the outside and a fourth opening portion 10e for discharging the air in the vessel 10 into the room of the house. The second opening portion 10c and the fourth opening portion 10e are switched by a second channel selector valve 64. The switching between the opening portions 10c and 10e by the second channel selector valve 64 is performed by the controller portion 23.

As illustrated in FIG. 28, the vessel 10 has, on the upper surface side thereof, a shielding member 65 for covering the upper surface of the vessel 10. The shielding member 65 is formed as a sheet member having a light shielding property. The vessel 10 has, at both ends of the upper surface thereof, a pair of rolls 66 and 67 capable of taking up the shielding member 65. By these rolls 66 and 67, a shielded state with the shielding member 65 and an open state without the shielding member 65 can be switched back and forth as needed. The rolls 66 and 67 are driven for rotation by an unillustrated rotor.

The water droplet generating system according to the present embodiment operates in the following manner.

When the humidity in the room is a predetermined value or greater in the day time, the first channel selector valve 62 is switched to the third opening portion 10d and the second channel selector valve 64 is switched to the fourth opening portion 10e. The air in the room is thereby supplied to the vessel 10. At this time, the vessel is blocked from sunlight by selecting the shielded state with the shielding member 65 and the temperature of each of the moisture absorbent member 12 and the water absorbent member 56 is reduced. The moisture contained in the indoor air is absorbed by the moisture absorbent member 12, and the water absorbent member 56 and dehumidified air is supplied into the room. When the humidity in the room is less than the predetermined value, the open state without the shielding member 65 is selected. The moisture absorbent member 12 is exposed to sunlight and moisture absorbed by the moisture absorbent member 12 is released. At this time, the second channel selector valve 64 is switched to the second opening portion 10c to prevent circulation of released moisture in the room.

When the humidity in the room is at a predetermined value or greater at night, the channel selector valve 62 is switched to the third opening portion 10d and the second channel selector valve 64 is switched to the fourth opening portion 10e. The indoor air is thereby supplied into the vessel 10. The shielding member 65 may be either in the shielded state or the open state. Moisture contained in the indoor air is absorbed by the moisture absorbent member 12 and the water absorbent member 56 and humidity in the room is removed. When the humidity in the room is less than the predetermined value, the channel selector valve 62 is switched to the first opening portion 10a, and the second channel selector valve 64 is switched to the second opening portion 10c, and thereby the atmosphere is supplied into the vessel 10. This enables absorption of the moisture from the atmosphere by both the moisture absorbent member 12 and the water absorbent member 56.

The humidity in the room can be removed by using the water droplet generating system having the above-described constitution. In the present embodiment, humidity control in the room is performed using solar energy so that environmental-friendly air conditioning can be carried out.

Eighteenth Embodiment

The eighteenth embodiment of the present invention will next be described. In the present embodiment, water generated by the water droplet generating system is applied to a greening apparatus. The greening apparatus is used for greening a rooftop or a parking area.

Figure 29:
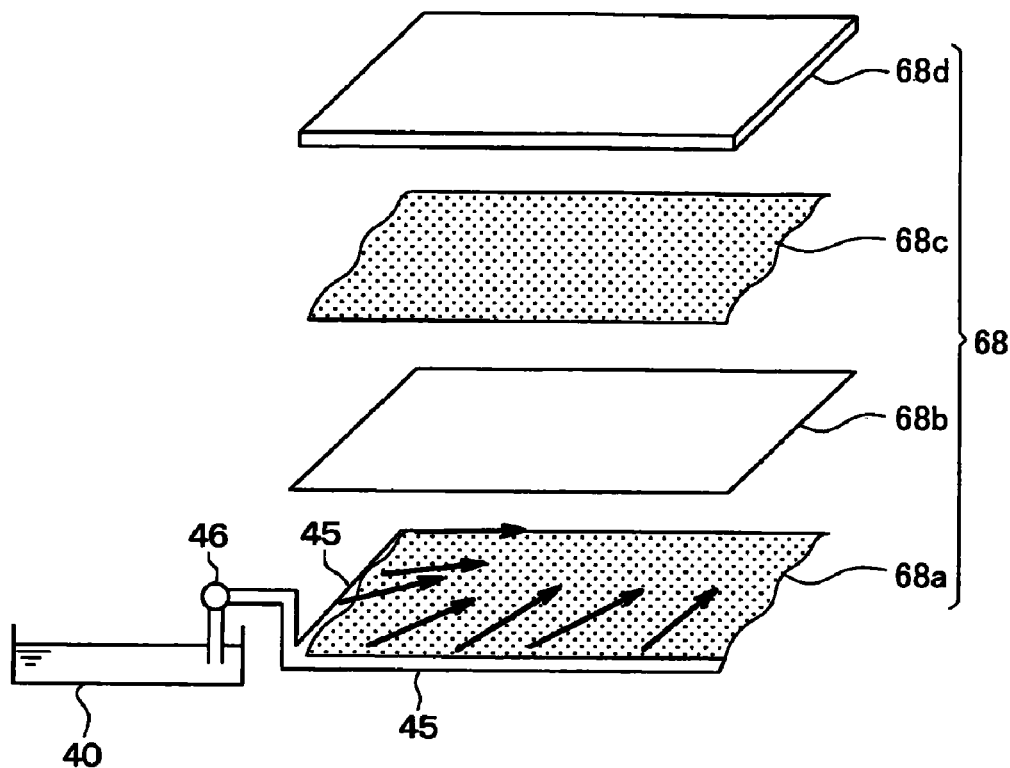
FIG. 29 is a schematic view illustrating a greening apparatus according to an eighteenth embodiment.

FIG. 29 is a schematic view illustrating a greening apparatus 68. The greening apparatus 68 has a structure obtained by stacking a first water supply sheet 68a, a root preventing sheet 68b, and a second water supply sheet 68c in the order of mention. A plant 68d such as turf is placed over the second water absorbent sheet 68c. The first water supply sheet 68a is made of a water absorbent material. Water stored in the water reservoir 40 of the water droplet generating system is supplied via the water supply channel 45. The root preventing sheet 68b prevents the root of the plant 68d from transferring downward and facilitates a partial transplanting work. The second water absorbent sheet 68c is made of a water absorbent material and it retains water just below the plant 68d and accelerates rooting at the initial stage of planting. Evaporation of moisture from the surface of the plant 68d can be prevented by laying Towada pumice on the surface of the plant 68d. The water absorbent material constituting the first water absorbent sheet 68a and the second water absorbent sheet 68c can be obtained using a nonwoven fabric as a base and also using a material similar to the water absorbent member 56 as described in the above fourteenth embodiment.

The water droplet generating system can produce a large amount of moisture during day time when sunlight is strong so that moisture can be supplied to the greening apparatus 68 adequately. Moreover, a moisture sensor (not illustrated) is installed on the first water supply sheet 68a or the like and by detecting a water content of the greening apparatus 68 with the moisture sensor, water can be supplied to the greening apparatus 68 sufficiently.

Another Embodiment

In the above embodiments, the condenser portion 14 is located in the soil S or on the ground. No limitation is however imposed on the place provided that the water vapor released from the moisture absorbent member 12 falls to be below its dew point. For example, because the temperature in water is, similar to that in the ground, stable irrespective of a change in the ambient temperature, the condenser portion 14 can be placed in water. Water may be either fresh water or seawater. It is difficult to get drinking water in an oceangoing ship, but by using a water droplet generating system whose condenser portion 14 is set in seawater, drinking water is stably available from the water vapor in the atmosphere.

In the third embodiment, the drive portion 11b of the opening/closing valve 11 is driven using the electricity produced by the solar battery 22. The electricity is not limited to that available from the solar battery. When the water droplet generating system is used at a place where a household power source is available, the drive portion 11b may be driven using the household power source.

In the above-described embodiments, moisture generated by the water droplet generating system is utilized as water for growing plants, water for domestic use, or drinking water. It is also usable for another purpose. For example, moisture generated by the water droplet generating system is distilled water so that by removing foreign matter from the distilled water by UV sterilization and filtration, ultrapure water necessary for semiconductor manufacturing process can be supplied.

In the fourteenth embodiment, the moisture absorbent member 12 and the water absorbent member 56 are stacked to place the member 56 below the member 12, but the moisture absorbent member 12 may be placed below the water absorbent member 56. Alternatively, the water absorbent member 56 may be placed on the air distribution surface of the condenser portion 14.

The material constituting the moisture absorbent member 12 and the material constituting the water absorbent member 56 may be used as a mixture. In this case, the mixture of the materials constituting the moisture absorbent member 12 and the water absorbent member 56 may be supported by the same monolith or the mixture of the materials may be formed into a monolith. In addition to the material constituting the moisture absorbent member 12 and the material constituting the water absorbent member 56, silver iodide capable of preventing supercooling of water vapor may be mixed.

In the above-described embodiments, mesoporous silica is used as the moisture absorbent member 12. Not only it but also materials (1) to (15) shown below are usable as the moisture absorbent member 12.

(1) Sepiolite

Sepiolite is usable as the moisture absorbent member 12. The chemical formula of sepiolite is $Mg_8Si_{12}O_{30}(OH_2)_4(OH)_4 \cdot 6$ to $8H_2O$. It is a clay mineral composed mainly of hydrated magnesium silicate. Sepiolite is typically composed of 52.5% of silicic acid ($SiO_2$), 22.8% of magnesium oxide (MgO), 1.7% of aluminum oxide ($Al_2O_3$), 0.8% of iron oxide ($Fe_2O_3$), 0.8% of calcium oxide (CaO), 0.4% of potassium oxide ($K_2O$), 0.3% of sodium oxide ($Na_2O$), 11.0% of $H_2O^-$ (scatters at 110° C. or less), and 10.5% of $H_2O^+$ (scatters at 110° C. or greater).

Figure 30:
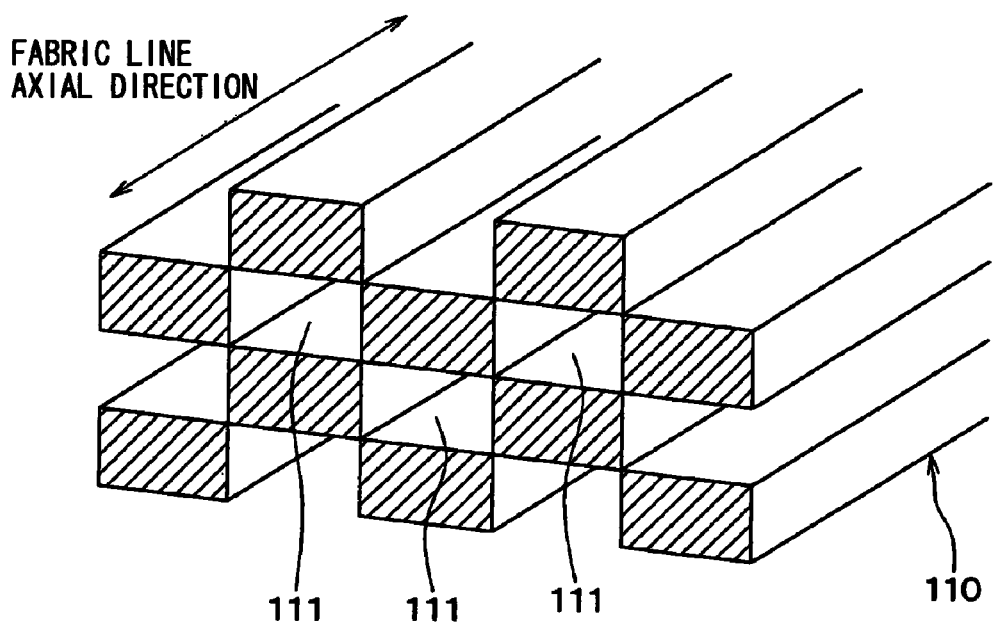
FIG. 30 is an enlarged view illustrating the molecular structure of sepiolite to be used as the water absorption member 12.

The structure of sepiolite 110 is illustrated in FIG. 30. As illustrated in FIG. 30, the sepiolite 110 is fibrous with many pores 111 inside the crystal lattice. Moisture can be absorbed in the pores 111 extending in the direction of a fiber axis. Sepiolite can also absorb moisture in its pores formed in the voids between fibers. The diameter of the pore 111 inside the crystal lattice is approximately 10Å and this pore can absorb mainly water vapor. The opening diameter of the pore formed in the void between fibers is approximately 200Å and this pore can absorb water droplets mainly.

Figure 31:
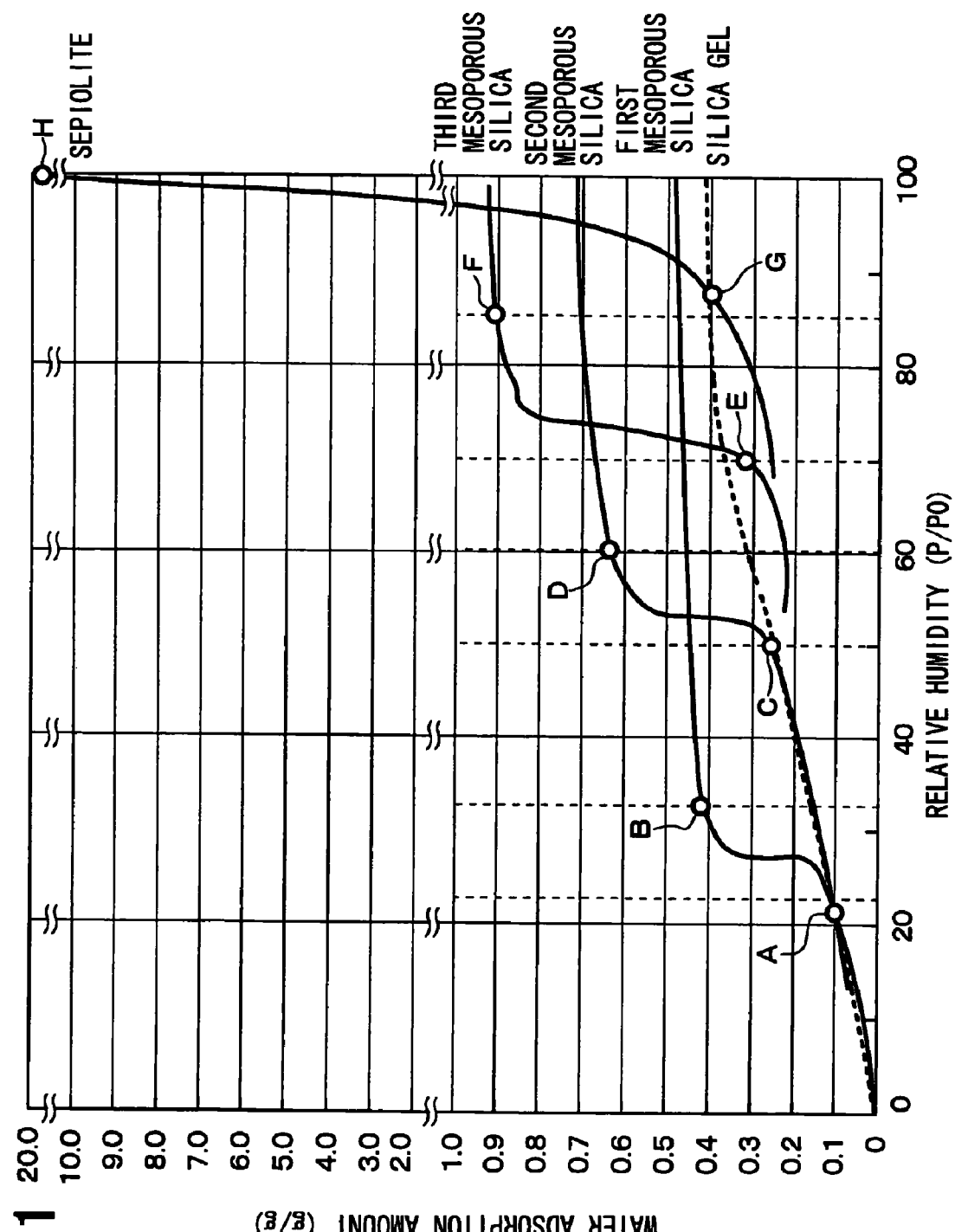
FIG. 31 is a graph showing the moisture absorption/release characteristics of sepiolite when a relative humidity is changed.

FIG. 31 is a graph showing the moisture absorption characteristic of sepiolite and it also includes, for comparison, those of mesoporous silica and silica gel described in the first embodiment. As illustrated in FIG. 31, sepiolite is different from the mesoporous silica of the first embodiment because it absorbs much water vapor at a relative humidity of 60% or greater. In particular, the moisture absorption amount drastically increases at a relative humidity of 80% or greater. Sepiolite is therefore suited for use under high humidity environment. Water vapor (in the gas form) absorbed in the crystal structure of sepiolite is condensed and collected as water droplets in the crystal structure and the moisture absorption amount of sepiolite is large even at a relative humidity of 100%. In this case, sepiolite collects moisture not in the form of water vapor but in the form of water droplets and its collects moisture in voids between particles or voids between fibers.

The water-vapor absorption characteristic of sepiolite differs slightly, depending on its locality, but sepiolite shows a relatively large absorption characteristic. Major producing countries of sepiolite are Spain, Turkey, U.S.A., China, and the like. A small amount of sepiolite can be produced in Japan.

Turkish sepiolite contains 57.0% of silicic acid ($SiO_2$), 23.0% of magnesium oxide (MgO), 1.0% of aluminum oxide ($Al_2O_3$), 0.5% of iron oxide ($Fe_2O_3$), 3.0% of calcium oxide (CaO), 0.3% of potassium oxide ($K_2O$), 0.2% of sodium oxide ($Na_2O$), and 14.5% of a calcination residue, 99.5% in total. It contains, in addition, 15.5% of water (additional percentage). It has a bulk specific gravity of 0.35 g/cc, a specific surface area of 320 $m^2$/g (as measured by the BET method), and a pore size distribution of from 0.5 nm to several μm. Pores having a pore size of several nm are predominant.

Turkish sepiolite can absorb from 0.3 to about 1 g of water vapor (in the gas form) per gram of it and can absorb from about 0.5 to 5 g of water droplets.

American sepiolite contains 50.8% of silicic acid ($SiO_2$), 16.8% of magnesium oxide (MgO), 1.8% of aluminum oxide ($Al_2O_3$), 1.8% of iron oxide ($Fe_2O_3$), 10.0% of calcium oxide (CaO), 0.4% of potassium oxide ($K_2O$), 0.4% of sodium oxide ($Na_2O$), and 17.5% of a calcination residue, 99.5% in total. It contains, in addition, 9.4% of water (percentage not included in the above). It has a bulk specific gravity of 0.75 g/cc, a specific surface area of 180 $m^2$/g (as measured by the BET method), and a pore size distribution of from 0.5 nm to several μm. Pores having a pore size of several nm are predominant. American sepiolite can absorb from 0.2 to about 0.8 g of water vapor per gram of the sepiolite and can absorb from about 0.4 to 3 g of water droplets.

Chinese sepiolite contains 49.0% of silicic acid ($SiO_2$), 16.7% of magnesium oxide (MgO), 0.7% of aluminum oxide ($Al_2O_3$), 1.0% of iron oxide ($Fe_2O_3$), 13.2% of calcium oxide (CaO), 0.1% of potassium oxide ($K_2O$), 0.0% of sodium oxide ($Na_2O$), and 19.0% of a calcination residue, 99.7% in total. It contains, in addition, 5.5% of water (percentage not included in the above). It has a bulk specific gravity of 0.20 g/cc, a specific surface area of 100 $m^2$/g (as measured by the BET method), and a pore size distribution of from 0.5 nm to several μm. Pores having a pore size of several nm are predominant. Chinese sepiolite can absorb from 0.15 to about 0.6 g of water vapor per gram of the sepiolite and can absorb from about 0.3 to 2 g of water droplets.

Release of water absorbed by sepiolite will next be described. Water vapor absorbed by sepiolite is usually retained mainly as water droplets obtained by condensation on the surface in the crystal lattice. For the release of water vapor (water droplets) absorbed by sepiolite, energy for vaporizing the water droplets is necessary. The water droplets are released as water vapor with about 530 calories of heat per gram of moisture. The water droplets absorbed by sepiolite are retained mainly between fibers or between particles and these water droplets can be released with less than about 530 calories of heat per gram of moisture (from about several to 50 calories per gram of water). Moisture can be released even by a humidity reduction around the moisture absorbent member 12.

The energy for releasing water vapor (water droplets) absorbed by sepiolite is available from solar energy. Moisture absorbed by sepiolite is released in proportion to the solar energy (heat energy) so that the greater the solar energy, the greater amount of water vapor (water droplets) can be released. For example, when sunlight is intense in the vicinity of the equator, a large amount of water vapor can be released and therefore a large amount of water droplets can be generated.

(2) Attapulgite

Attapulgite (also known as palygorskite) is usable as the moisture absorbent member 12. The chemical formula of attapulgite is $Mg_8Al_2Si_8O_{20}(OH_2)\cdot 8H_2O$. It is typically composed of 53.64% of silicic acid ($SiO_2$), 0.60% of titanium oxide ($TiO_2$), 9.05% of magnesium oxide (MgO), 8.76% of aluminum oxide ($Al_2O_3$), 3.36% of iron oxide ($Fe_2O_3$), 2.02% of calcium oxide (CaO), 0.75% of potassium oxide ($K_2O$), 0.83% of sodium oxide ($Na_2O$), 0.23% of iron oxide (FeO), 0.79% of phosphoric acid ($P_2O_5$), 9.12% of $H_2O^-$ (scatters at 110° C. or less), and 10.89% of $H_2O^+$ (scatters at 110° C. or greater).

Attapulgite is, similar to sepiolite, excellent in water absorption property under a high humidity environment. With regard to the moisture absorption region of attapulgite, it has an increased moisture absorption amount at a relative humidity of about 60% or greater and a further greater moisture absorption amount at a relative humidity of about 80% or greater. It also shows a large moisture absorption amount even at a humidity of 100%. Attapulgite can absorb from 0.25 to about 1 g of water vapor per gram and from about 0.5 to 5 g of water droplets per gram.

(3) Imogolite

Imogolite can be used as the moisture absorbent member 12. Imogolite has a chemical formula of $SiO_2\cdot Al_2O_3\cdot 2H_2O$ and it is composed as a nanotube-like aluminum silicate. Imogolite is not a mineral but is available by the synthesis in the following manner. Imogolite can be synthesized by mixing sodium orthosilicate ($Na_4SiO_4$) with aluminum chloride hexahydrate, adding an aqueous NaOH solution to the resulting mixture, adjusting the pH of the mixture, adding hydrochloric acid, and heating the mixture at about 100° C. for about 2 days.

Imogolite is, similar to the sepiolite, excellent in moisture absorption property under a high humidity environment. Imogolite has a capacity of absorbing water vapor at a relative humidity of about 90% or greater and releasing water vapor at a relative humidity of about 90% or less. It can absorb and release of water vapor stably. Imogolite can absorb a large amount of water vapor and a moisture absorption amount is from 2 to 2.5 times of the weight of it. The crystalline imogolite obtained by drying at normal temperature after synthesis shows a hygroscopic performance at a relative humidity of about 40% or greater and its hygroscopic performance is about 0.8 g per gram at the maximum. The crystalline imogolite obtained by lyophilization after synthesis shows a great hygroscopic performance at a relative humidity of about 80% or greater and its hygroscopic performance is about 1 g per gram at the maximum.

(4) Kanuma-soil

Kanuma-soil can be used as the moisture absorbent member 12. Kanuma-soil is a generic name of pumice used for agriculture or horticulture produced in Kanuma city of Tochigi Prefecture. Kanuma-soil has moisture absorption/release characteristics similar to those of the sepiolite. Kanuma-soil has an increased moisture absorption amount at a relative humidity of about 60% or greater and has a further increased moisture absorption amount at a relative humidity of about 80% or greater. It also has a large moisture absorption amount at a relative humidity of 100%. Kanuma-soil can absorb from about 0.1 to 0.2 g of water vapor and from about 0.3 to 0.6 g of water droplets, each per gram of it.

(5) Montmorillonite

Montmorillonite can be used as the moisture absorbent member 12. Montmorillonite which is a main component of bentonite is a clay mineral classified into smectite which is a kind of a laminar silicate mineral. It has a crystal structure in which three layers, that is, a silicic acid tetrahedral layer, an alumina octahedral layer, and a silicic acid tetrahedral layer are stacked one after another. Montmorillonite has moisture absorption/release characteristics similar to those of the sepiolite. Montmorillonite has an increased moisture absorption amount at a relative humidity of about 60% or greater and has a further increased moisture absorption amount at a relative humidity of about 80% or greater. It also has a large moisture absorption amount even at a relative humidity of 100%. Montmorillonite can absorb from about 0.1 to 0.2 g of water vapor and from about 0.3 to 0.5 g of water droplets, each per gram of it.

(6) Vermiculite

Vermiculite can be used as the moisture absorbent member 12. The vermiculite has a chemical formula of $(Mg, Fe, Al)_3$ $(Al,Si)_4O_{10}(OH)_2 \cdot 4H_2O$ and it is available by grinding raw stone and heating the ground product rapidly in a heating furnace to expand it. Vermiculite has an increased moisture absorption amount at a relative humidity of about 60% or greater and has a further increased moisture absorption amount at a relative humidity of about 80% or greater. It also has a large moisture absorption amount even at a relative humidity of 100%. Vermiculite can absorb from 0.05 to about 0.1 g of water vapor and from about 0.1 to 0.3 g of water droplets, each per gram of vermiculite.

(7) Towada Pumice

Towada pumice can be used as the moisture absorbent member 12. Towada pumice is pumice produced at Towada Lake and it is composed of 70% of silicic acid ($SiO_2$), 15.1% of aluminum oxide ($Al_2O_2$), 3.7% of calcium oxide (CaO), 3.0% of sodium oxide ($Na_2O$), and 2.1% of potassium oxide ($K_2O$). Towada pumice has moisture absorption/release characteristics similar to those of sepiolite. Towada pumice has an increased moisture absorption amount at a relative humidity of about 60% or greater and has a further increased moisture absorption amount at a relative humidity of about 80% or greater. It also has a large moisture absorption amount even at a relative humidity of 100%. Towada pumice can absorb from about 0.2 to 0.7 g of water vapor and from about 0.5 to 1 g of water droplets, each per gram of the pumice.

(8) Zeolite

Zeolite can be used as the moisture absorbent member 12. Zeolite is a generic name of aluminosilicates having, in the crystal thereof, micropores. Zeolite has moisture absorption/release characteristics similar to those of sepiolite. Zeolite has an increased moisture absorption amount at a relative humidity of from about 5 to 10% or greater and has a further increased moisture absorption amount at a relative humidity of about 80% or greater. It also has a large moisture absorption amount even at a relative humidity of 100%. Zeolite can absorb from about 0.3 to 0.5 g of water vapor per gram and from about 0.4 to 1 g of water droplets per gram.

(9) Allophane

Allophane can be used as the moisture absorbent member 12. Allophane is a hollow spherical aluminum silicate and it contains $SiO_2$ and $Al_2O_3$ at a ratio of from 1 to 2 and contains Si and Al at a ratio of from 0.5 to 1. Allophane has moisture absorption/release characteristics similar to those of sepiolite. Allophane has an increased moisture absorption amount at a relative humidity of 60% or greater and shows a relatively great absorption amount. Allophane can absorb from about 0.2 to 0.3 g of water vapor per gram of it.

(10) Organic Hygroscopic Material

An organic hygroscopic material disclosed in JP-A-2001-219063 can be used as the moisture absorbent member 12. This organic hygroscopic agent is made of a water absorbent resin formed by polymerization in a polyol or a dispersion of a water absorbent resin in which a water absorbent gel has been dispersed. The organic hygroscopic agent can be used by attaching it to a ceramic monolith or nonwoven fibers. Alternatively, another polyol is reacted with polyisocyanate and the reaction product can be used in the form made of a polyurethane resin. The organic hygroscopic material can absorb about 1 g of water vapor per gram of the material at a relative humidity ranging from about 40 to 100%.

(11) Porous Powder

The porous powder disclosed in JP-A-2006-272295 can be used as the moisture absorbent member 12. This porous powder is available by reacting sludge incineration ash with an aqueous acid solution, followed by neutralization treatment. The material can absorb about 0.5 g of water vapor per gram of it.

(12) Carbonated Solid

A carbonated solid can be used as the moisture absorbent member 12. As the carbonated solid, usable is the material disclosed in JP-A-2006-27999 and obtained by carbonating, into a solid, a hydrous formation product composed of a powder mixture of from 10 to 50 wt. % of calcium hydroxide, from 30 to 70 wt. % of an inorganic waste powder, and from 10 to 30 wt. % of a naturally produced inorganic powder (such as Kanuma-soil, natural zeolite, calcined diatomaceous earth, dry diatomaceous earth, or the like) with a high specific surface area or an inorganic powder having a high specific surface area and prepared by calcining a waste composed mainly of aluminum hydroxide at from 100 to 500° C. The resulting carbonated solid can absorb from about 0.1 to 0.4 g of water vapor per gram of it.

As the carbonated solid, it is also possible to use the material disclosed in JP-A-2006-27998 and prepared by carbonating, into a solid, a hydrous formation product composed of a powder mixture of from 10 to 70 wt. % of calcium hydroxide and from 30 to 90 wt. % of stoneware clay such as clay roofing tiles or bricks which are inexpensive raw materials. The resulting carbonated solid can absorb from about 0.1 to 0.3 g of water vapor per gram of it.

(13) Aluminum Hydroxide Material

An aluminum hydroxide material can be used as the moisture absorbent member 12. The aluminum hydroxide material is available by the process disclosed in JP-A-H11-11939 which comprises heat-treating aluminum hydroxide powder for reduced pressure (0.9 atm or less) at from 300 to 800° C. The aluminum hydroxide material thus obtained can absorb from about 0.1 g to 0.3 g of water vapor per gram of the material.

Alternatively, the aluminum hydroxide material disclosed in JP-A-2004-261702 and obtained by heat treating aluminum hydroxide to make it porous can also be used. The resulting porous aluminum hydroxide material can be used at a relative humidity of from 30 to 40% and can absorb from about 0.1 g to 0.2 g of water vapor per gram of the material.

(14) Humidity Controlling Material Using Allophane- or Imogolite-Containing Composition The humidity controlling material using allophane- or imogolite-containing composition as disclosed in JP-A-2004-115278 can be used as the moisture absorbent member 12. The humidity controlling material can be obtained by adding an allophane- or imogolite-containing composition to a calcium hydroxide curing agent, molding or forming the resulting mixture, and then carbonizing the molded or formed product with a carbon-dioxide-containing gas. The resulting humidity controlling material can absorb from about 0.1 to 0.4 g of water vapor per gram of it.

(15) A humidity Controlling Material Composed of a Composition of a Porous Material A humidity controlling material (for example, a hexadecyltrimethyl ammonium material) composed of a composition of a porous material disclosed in JP-A-H9-294931 can be used as the moisture absorbent member 12. This humidity controlling material is available by enclosing a surfactant or an organic substance having a long-chain alkyl group with silicon dioxide or fibrous metal oxide, polymerizing the resulting organic substance, and then burning or extracting to remove the organic substance. The resulting humidity controlling material has a pore diameter of from 2 to 6 nm on average and has a function of absorbing/releasing water vapor at a relative humidity ranging from 40 to 70%. It can absorb from about 0.1 to 0.4 g of water vapor per gram of the material.

Additional advantages and modifications will readily occur to those skilled in the art. The invention in its broader terms is therefore not limited to the specific details, representative apparatus, and illustrative examples shown and described.

What is claimed is:

1. A water droplet generating system comprising:
   a vessel, which is placed in an atmosphere, and which has an opening portion;
   a first opening/closing valve, which opens the opening portion when an ambient temperature is lower than a predetermined temperature or when humidity is higher than a predetermined humidity, the first opening/closing valve closing the opening portion when the ambient temperature is higher than the predetermined temperature or when the humidity is lower than the predetermined humidity;
   a moisture absorbent member, housed in the vessel, the moisture absorbent material constructed to absorb and release water vapor depending on a change of humidity; and
   a condenser portion disposed to communicate with an inside of the vessel, the condenser portion being constructed to cool the water vapor, which is released form the moisture absorbent member, to a dew point of the water vapor or less; wherein:
   when the first opening/closing valve opens the opening portion, the moisture absorbent member absorbs water vapor in the atmosphere,
   when the first opening/closing valve closes the opening portion, the moisture absorbent member releases the water vapor, and the condenser portion condenses the water vapor, which is released from the moisture absorbent member, to generate a water droplet; and
   the vessel and the condenser portion are connected by a connector that is constructed to permit the water vapor, which is released from the moisture absorbent member, to pass from the vessel to the condenser portion, the connector being made of a material having a heat conductivity lower than a heat conductivity of the vessel and lower than a heat conductivity of the condenser portion.

2. The water droplet generating system according to claim 1, wherein the first opening/closing valve opens and closes the opening portion by using a wax, a volume of the wax changing depending on a change of temperature.

3. The water droplet generating system according to claim 1, wherein the first opening/closing valve opens and closes the opening portion by using a motor powered by a solar battery.

4. The water droplet generating system according to claim 3, further comprising means for switching ON and OFF of a power supply to the motor at a predetermined opening time, at which the ambient temperature rises in a day, and at a predetermined closing time, at which the ambient temperature falls in the day, wherein:
   the first opening/closing valve is constructed to open at the predetermined opening time and to close at the predetermined closing time.

5. The water droplet generating system according to claim 1, further comprising a water reservoir that stores the water droplet generated in the condenser portion.

6. The water droplet generating system according to claim 1, further comprising:
   an air introduction channel that communicates the condenser portion with the atmosphere,
   a humidity sensor that detects humidity in a vicinity of the air introduction channel,
   a pump that supplies the atmosphere, which is introduced through the air introduction channel, to the condenser portion,
   a second opening/closing valve that opens and closes the air introduction channel, and
   a controller portion that operates an opening/closing control of the second opening/closing valve and an activation of the pump; wherein:
   when humidity detected by the humidity sensor exceeds a predetermined value, the controller portion opens the second opening/closing valve and activates the pump.

7. The water droplet generating system according to claim 1, wherein the condenser portion is a heat exchanger, which is placed in soil, and which is constructed to perform heat exchange between the soil and the water vapor released from the moisture absorbent member.

8. The water droplet generating system according to claim 1, wherein the condenser portion is a heat exchanger constructed to perform heat exchange between the atmosphere and the water vapor released from the moisture absorbent member.

9. The water droplet generating system according to claim 1, wherein the condenser portion is a heat exchanger placed in water and constructed to perform heat exchange between the water and the water vapor released from the moisture absorbent member.

10. The water droplet generating system according to claim 1, wherein the moisture absorbent member is made of mesoporous silica.

11. The water droplet generating system according to claim 10, wherein the mesoporous silica has a pore size ranging from 1 nm to 7 nm.

12. The water droplet generating system according to claim 1, further comprising a moisture transfer member that diffuses the water droplet, which is generated in the condenser portion, in soil.

13. The water droplet generating system according to claim 1, wherein the vessel has an upper surface that is made of an upper-side member having translucency.

14. The water droplet generating system according to claim 13, wherein the upper-side member includes two plate-like members that define a hermetically sealed space therebetween.

15. The water droplet generating system according to claim 1, further comprising means for clarifying the water droplet generated in the condenser portion.

16. The water droplet generating system according to claim 1, wherein the condenser portion is disposed outside of the vessel.

17. The water droplet generating system according to claim 1, wherein the condenser portion is separate from the vessel.

18. The water droplet generating system according to claim 1, wherein the water vapor which is released from the moisture absorbent material passes through the connector.

* * * * *